US006426975B1

(12) United States Patent
Nishi et al.

(10) Patent No.: US 6,426,975 B1
(45) Date of Patent: Jul. 30, 2002

(54) IMAGE PROCESSING METHOD, IMAGE PROCESSING APPARATUS AND DATA RECORDING MEDIUM

(75) Inventors: Takahiro Nishi, Neyagawashi; Toshiya Takahashi, Ibarakishi; Choong Seng Boon, Moriguchishi; Shinya Kadono, Kobeshi, all of (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/118,991

(22) Filed: Jul. 20, 1998

(30) Foreign Application Priority Data

| | | |
|---|---|---|
| Jul. 25, 1997 | (JP) | 9-200499 |
| Sep. 18, 1997 | (JP) | 9-253765 |
| May 22, 1998 | (JP) | 10-141919 |

(51) Int. Cl.[7] .......... H04B 7/66
(52) U.S. Cl. .......... 375/240.13
(58) Field of Search .......... 375/240.13, 240.01, 375/240.02, 240.15, 240.16, 240.17, 240.2, 240.21, 240.28; 348/405.1, 406.1, 409.1, 416.1, 423, 426, 845, 845.1, 845.3; 382/232, 230; 345/58; 708/402; H04B 7/66

(56) References Cited

U.S. PATENT DOCUMENTS 5,510,840 A 4/1996 Yonemitsu et al. .......... 348/402
5,920,353 A * 7/1999 Diaz et al. .......... 348/402
6,002,801 A * 12/1999 Strongin et al. .......... 382/233
6,151,075 A * 11/2000 Shin et al. .......... 348/459
6,233,280 B1 * 5/2001 Kim et al. .......... 375/240.21

* cited by examiner

*Primary Examiner*—Chris Kelley
*Assistant Examiner*—Tung Vo
(74) *Attorney, Agent, or Firm*—Parkhurst & Wendel, L.L.P.

(57) ABSTRACT

An image processing method for dividing a digital image signal into plural image signals corresponding to plural blocks constituting a single display screen, and performing block-by-block coding of the image signals of the respective blocks, comprises transforming an image signal of a coding target block to be subjected to coding into frequency components by frame-by-frame frequency transformation on a frame basis or field-by-field frequency transformation on a field basis; setting a processing order for coding the frequency components corresponding to the image signal of the coding target block, according as the image signal of the coding target block has been subjected to the frame-by-frame frequency transformation or the field-by-field frequency transformation; and successively coding the frequency components corresponding to the image signal of the coding target block according to the order which has been set. Therefore, in coding of an interlaced image or a specific progressive image in which frame DCT blocks and field DCT blocks coexist, a run length is increased, thereby improving coding efficiency.

5 Claims, 37 Drawing Sheets

Fig.31 (a)

| | | | | | | | |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

Fig.31 (b)

| | | | | | | | |
|---|---|---|---|---|---|---|---|
| 0 | 1 | 2 | 3 | 10 | 11 | 12 | 13 |
| 4 | 5 | 8 | 9 | 17 | 16 | 15 | 14 |
| 6 | 7 | 19 | 18 | 26 | 27 | 28 | 29 |
| 20 | 21 | 24 | 25 | 30 | 31 | 32 | 33 |
| 22 | 23 | 34 | 35 | 42 | 43 | 44 | 45 |
| 36 | 37 | 40 | 41 | 46 | 47 | 48 | 49 |
| 38 | 39 | 50 | 51 | 56 | 57 | 58 | 59 |
| 52 | 53 | 54 | 55 | 60 | 61 | 62 | 63 |

Fig.31 (c)

| | | | | | | | |
|---|---|---|---|---|---|---|---|
| 0 | 4 | 6 | 20 | 22 | 36 | 38 | 52 |
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

IMAGE PROCESSING METHOD, IMAGE PROCESSING APPARATUS AND DATA RECORDING MEDIUM

FIELD OF THE INVENTION

The present invention relates to image processing methods, image processing apparatuses, and data recording media and, more particularly, to image processing methods, image processing apparatuses, and data recording media in which, in variable-length coding of frequency components of an interlaced image signal, a sequence of the frequency components is adaptively rearranged, thereby improving coding efficiency.

BACKGROUND OF THE INVENTION

In recent years, discrete cosine transformation (DCT) has been widely utilized in image coding processing. In MPEG as a representative image coding method, an input image signal is divided correspondingly to plural rectangular blocks constituting a single display screen as units of DCT processing, and DCT processing is performed block by block to the blocked image signal.

A specific description is given of image coding in MPEG.

FIG. 26 is a block diagram illustrating a construction of a conventional image processing apparatus which performs the above-mentioned image coding. In FIG. 26, reference numeral 200*a* designates a conventional image processing apparatus (image coding apparatus), which performs coding including DCT processing to an image signal. This image coding apparatus 200*a* consists of a blocking unit 102 for dividing an input image signal 101 correspondingly to plural blocks constituting a single display screen to generate an image signal (plural pixel values) 103 corresponding to each block, a DCT unit 104 for performing DCT processing to the image signal (pixel values) 103 to transform the image signal (pixel values) 103 into frequency components (DCT coefficients) 105, and a quantization unit 106 for quantizing the output 105 of the DCT unit 104 to generate quantized values 107 corresponding to each block. Herein, the DCT unit 104 and the quantization unit 106 constitute an information source coding unit 200*a*1.

Further, the image coding apparatus 200*a* consists of a scanner 109 for setting the processing order for coding the quantized values 107, and a variable-length coding unit (hereinafter referred to as a VLC unit) 112 for performing variable-length coding to quantized values 111 to which the processing order has been set, according to the set order, to generate a bit stream 113 corresponding to the image signal of each block.

A description is given of the operation.

Initially, the blocking unit 102 blocks an input image signal 101 correspondingly to rectangular blocks each comprising 8×8 pixels, and outputs an image signal (plural pixel values) 103 corresponding to each block. The DCT unit 104 transforms the image signal (pixel values) 103 into plural frequency components (DCT coefficients) 105 by DCT. The quantization unit 106 converts the DCT coefficients 105 into quantized values 107 by quantization.

Then, the scanner 109 performs rearrangement of the quantized values 107 so as to improve the efficiency of variable-length coding. That is, the scanner 109 sets the processing order for coding. Thereafter, the VLC unit 112 performs variable-length coding to the quantized values which have been rearranged, according to the set order. In addition, run length coding is used in variable-length coding processing. Therefore, when a scan is performed so that coefficients of about the same size are consecutive, the efficiency of variable-length coding is improved.

In coding an interlaced image signal, when correlations between adjacent scan lines are strong, frame DCT processing, i.e., DCT using a frame as a unit, is carried out. When correlations between scan lines in a field are strong, field DCT processing, i.e., DCT using a field as a unit, is carried out.

More specifically, as shown in FIG. 27, in frame DCT processing of an interlaced image signal, scan lines of a first field and scan lines of a second field are alternately arranged to form one frame-screen. This frame screen is divided into plural macroblocks each comprising 16×16 pixels. Each macroblock is divided into four subblocks-each comprising 8×8 pixels. Thereby, the image signal is subjected to DCT processing subblock by subblock. Meanwhile, in field DCT processing of an interlaced image signal, Each of macroblocks constituting one frame screen is formed by two first subblocks comprising only scan lines of a first field and two second subblocks comprising only scan lines of a second field. Thereby, the image signal is subjected to DCT processing subblock by subblock.

In MPEG, frame DCT or field DCT is adaptively selected for each macroblock. Accordingly, in order to perform accurate decoding to an input image signal, the blocking unit 102 in the image coding apparatus 200*a* outputs DCT processing information 114 indicating a unit of DCT processing for each macroblock (that is, information indicating whether each macroblock has been subjected to frame DCT or field DCT), together with the blocked image signal. Since a subblock which has been subjected to field DCT (a field DCT block) comprises only odd scan lines or only even scan lines among scan lines constituting one frame screen, a DCT coefficient group corresponding to the field DCT block includes more DCT coefficients indicating that the rate of change of pixel values in a vertical direction of a display screen is higher, as compared with a DCT coefficient group corresponding to a subblock which has been subjected to frame DCT (a field DCT block).

FIG. 28 is a block diagram illustrating a construction of an image decoding apparatus corresponding to the image coding apparatus shown in FIG. 26. In FIG. 28, reference numeral 200*b* designates an image processing apparatus (image decoding apparatus), which decodes the coded image signal 113 which has been coded by the image coding apparatus 200*a*. This image decoding apparatus 200*b* consists of a variable-length decoding unit (hereinafter referred to as a VLD unit) 201 for performing variable-length decoding to the coded image signal 113, and an inverse scanner 202 for performing an inverse scan to quantized values 111 which are obtained by decoding so that the order of the quantized values 111 is returned to the order before rearrangement in coding. Further, the image decoding apparatus 200*b* consists of an inverse quantization unit 203 for inverse-quantizing quantized values 107 which have been subjected to inverse scanning, to generate DCT coefficients (frequency components) 105 corresponding to a decoding target block to be subjected to decoding, an inverse DCT unit 204 for performing inverse DCT processing to the DCT coefficients 105 to generate an image signal (pixel values) 103 corresponding to the decoding target block, and an inverse blocking unit 205 for inverse-blocking the image signals 103 on the basis of the DCT processing information 114 from the image coding apparatus 200*a,* thereby regenerating an image signal 101 corresponding to one frame screen. Herein, the inverse quantization unit 203 and the inverse DCT unit 204 constitute an information source decoding unit 200*b*1.

In the image decoding apparatus 200*b*, inverse converting processes corresponding to the respective converting processes in the image coding apparatus 200*a* are carried out to a coded image signal, in the reverse order of the order in coding, thereby accurately decoding the coded image signal.

FIG. 29 is a block diagram illustrating a construction of another conventional image coding apparatus.

In FIG. 29, reference numeral 200*c* designates an image processing apparatus (image coding apparatus), which performs intra-frame predictive coding processing comprising generating predicted values of quantized values of a coding target block using information in a frame, and coding difference values between the predicted values and the quantized values of the coding target block.

This image coding apparatus 200*c* includes the image coding apparatus 200*a*, a prediction unit 200*c*2 for generating predicted values, and a scanning unit 200*c*1 for changing a scan method using a parameter concerning generation of the predicted values. The prediction unit 200*c*2 consists of a predictor 305 for generating predicted values 303, and outputting first prediction information 309*a* and second prediction information 309*b* concerning generation of the predicted values, an adder 301 for subtracting the output (predicted values) 303 of the predictor 305 from the output 107 of the quantization unit 106, and an adder 304 for adding the output 303 of the predictor 305 to an output 302 of the adder 301.

The scanning unit 200*c*1 consists of three scanners 109*s*1~109*s*3 having different scan methods, for scanning the output 302 of the prediction unit 200*c*2, a first switch 108*c* for selecting one of the three scanners on the basis of a control signal 116 and supplying the output 302 of the prediction unit 200*c*2 to the selected scanner, a second switch 110*c* for selecting one of the three scanners on the basis of the control signal 116 and supplying an output of the selected scanner to the VLC unit 112, and a scan control unit 1401*c* for generating the control signal 116 on the basis of the first prediction information 309*a*. In addition, the second prediction information 309*b* is output from the image coding apparatus 200*c*.

In the image coding apparatus 200*c* thus constructed, a scan method is changed using the parameter concerning generation of predicted values (prediction information) 309, whereby the efficiency of variable-length coding is enhanced.

A description is given of a method for generating predicted values with reference to FIG. 30.

FIG. 30 shows a macroblock comprising 16×16 pixels. This macroblock comprises four subblocks (hereinafter simply referred to as blocks) R0, R1, R2 and X each comprising 8×8 pixels. The block X is a coding target block, and the blocks R0, R1 and R2 are already coded blocks which are adjacent to the coding target block X. Either block R1 or block R2 is referred in generating predicted values (quantized values) of the coding target block X. The block to be referred is decided using DC coefficients of the blocks R0, R1 and R2 (quantized values at the left upper ends of these blocks). Specifically, the absolute value of the difference between the DC coefficients of the blocks R0 and R1 is compared with the absolute value of the difference between the DC coefficients of the blocks R0 and R2. When the absolute value of the difference between the DC coefficients of the blocks R0 and R1 is larger, the block R1 is referred (reference in a vertical direction). When it is smaller, the block R2 is referred (reference in a horizontal direction).

When the block R1 is referred, the DC coefficient (the quantized value at the left upper end) of the block R1 and AC coefficients (quantized values at the uppermost line, except the DC coefficient) of the block R1 are used as predicted values of the coefficients of the block X at the same positions. When the block R2 is referred, the DC coefficient (the quantized value at the left upper end) of the block R2 and AC coefficients (quantized values at the leftmost line, except the DC coefficient) of the block R2 are used as predicted values of the coefficients of the block X at the same positions. In addition, in a case where the efficiency of variable-length coding is degraded by predicting AC coefficients, no AC prediction may be carried out.

A scan method is changed according to ON/OFF of Ac prediction (whether AC prediction is performed or not) in intra-frame prediction. Further, when AC prediction is in the ON state, a scan method is changed according to a reference direction of prediction. The first prediction information 309*a* supplied to the scan control unit 1401*c* includes ON/OFF information indicating ON/OFF of AC prediction, and prediction direction information indicating a reference direction for AC prediction, and the second prediction information 309*b* includes only the ON/OFF information of AC prediction.

When Ac prediction is in the OFF state, a scan of quantized values is executed in the order shown in FIG. 31(*a*). Thereby, the processing order for coding is set to the quantized values. In this case, in a group of quantized values corresponding to a subblock, high-frequency components uniformly distribute in vertical and horizontal directions very often. Therefore, the quantized values are uniformly scanned in the order from low-frequency components to high-frequency components. When AC prediction is performed and a vertical direction is referred, a scan of quantized values is executed in the order shown in FIG. 31(*b*). In this case, a group of quantized values corresponding to a subblock has a distribution in which high-frequency components in a horizontal direction are reduced by the prediction. Therefore, the quantized values are scanned with a priority given to a horizontal direction, thereby improving the efficiency of variable-length coding. When AC prediction is performed and a horizontal direction is referred, a scan of quantized values is executed in the order shown in FIG. 31(*c*). In this case, a group of quantized values corresponding to a subblock has a distribution in which high-frequency components in a vertical direction are reduced by the prediction. Therefore, the quantized values are scanned with a priority given to a vertical direction, thereby improving the efficiency of variable-length coding.

FIG. 32 is a block diagram illustrating a construction of an image decoding apparatus corresponding to the image coding apparatus shown in FIG. 29. In FIG. 32, reference numeral 200*d* designates an image processing apparatus (image decoding apparatus), which decodes the coded image signal 308 that has been coded in the image coding apparatus 200*c*.

This image decoding apparatus 200*d* has an inverse scanning unit 200*d*1 for performing an inverse scan to quantized values which are obtained by variable-length decoding of the coded image signal 308 so that the order of the quantized values is returned to the order before scanning in coding, and changing an inverse scan method on the basis of the prediction information (parameter) concerning generation of predicted values in the image coding apparatus 200*c*, and a prediction unit 200*d*2 for adding quantized values (predicted values) of a decoding target block which are predicted from quantized values of an already decoded block in the vicinity of the decoding target block, to the quantized values corresponding to the decoding target block which have been subjected to inverse scanning.

The inverse scanning unit **200*d*1 consists of three inverse scanners 202*s*1~202*s*3 having different inverse scan methods, for inverse-scanning the output of the VLD unit 201, a first switch 108*d* for selecting one of the three inverse scanners on the basis of a control signal 116 and supplying the output of the VLD unit 201 to the selected inverse scanner, a second switch 110*d* for selecting one of the three inverse scanners on the basis of the control signal 116 and supplying the output of the selected inverse scanner to the prediction unit 200*d*2, and an inverse scan control unit 1401*d* for generating the control signal 116 on the basis of the first prediction information 309*a*.**

In addition, the inverse scanner **202*s*1 performs an inverse scan corresponding to the scan by the scanner 109*s*1 in the image coding apparatus 200*c*, the inverse scanner 202*s*2 performs an inverse scan corresponding to the scan by the scanner 109*s*2 in the image coding apparatus 200*c*, and the inverse scanner 202*s*3 performs an inverse scan corresponding to the scan by the scanner 109*s*3 in the image coding apparatus 200*c*.**

The prediction unit **200*d*2 consists of a predictor 401 for generating predicted values 303 on the basis of the second prediction information 309*b* output from the image coding apparatus 200*c* and values 107*d* corresponding to the quantized values 107 in the image coding apparatus 200*c*, and generating control prediction information 309*a*' corresponding to the first prediction information 309*a* in the image coding apparatus 200*c*, and an adder 304 for adding the predicted values 303 to the output 302 of the inverse scanning unit 200*d*1. In addition, like the first prediction information 309*a*, the control prediction information 309*a*'** includes ON/OFF information of AC prediction and prediction direction information of AC prediction.

In the image decoding apparatus **200*d* thus constructed, inverse converting processes corresponding to the respective converting processes in the image coding apparatus 200*c* shown in FIG. 29** are carried out to a coded image signal, in the reverse order of the order in coding, thereby accurately decoding the coded image signal.

FIG. 33 is a block diagram illustrating a construction of still another conventional image coding apparatus. In FIG. 33, reference numeral **200*e*** designates an image processing apparatus (image coding apparatus), which performs inter-frame predictive coding processing comprising generating predicted values of an image signal (pixel values) of a coding target frame from another frame, and coding difference values between the image signal (pixel values) of the coding target frame and the predicted values.

This image coding apparatus **200*e* has an information source coding unit 200*e*2 for performing information source coding to difference values 1002 between an image signal (pixel values) 103 obtained by blocking and predicted values 1008 of the image signal 103, in place of the information source coding unit 200*a*1 in the image coding apparatus 200*a* shown in FIG. 26, which performs information source coding to the image signal 103. Further, the image coding apparatus 200*e* has a scanning unit 200*e*1 for changing a scan method, i.e., the processing order for coding, according to a parameter 1015 concerning generation of the predicted values 1008, in place of the scanner 109 in the image coding apparatus 200*a*.**

The information source coding unit **200*e*2 consists of an adder 1001, a DCT unit 104*e*, a quantization unit 106*e*, an inverse quantization unit 203*e*, an inverse DCT unit 204*e*, an adder 1010, a frame memory 1014, and a predictor 1012**.

The adder 1001 is for subtracting predicted values 1008 from an image signal (pixel values) 103 corresponding to a coding target block. The DCT unit **104*e* is for transforming difference values 1002 between the image signal (pixel values) 103 and the predicted values 1008 into frequency components (DCT coefficients) 1003 by DCT. The quantization unit 106*e* is for quantizing the DCT coefficients 1003 to generate quantized values 1004** corresponding to the coding target block.

Further, the inverse quantization unit **203*e* is for inverse-quantizing the quantized values 1004 output from the quantization unit 106*e* to output DCT coefficients 1007 corresponding to the DCT coefficients 1003. The inverse DCT unit 204*e* is for performing inverse DCT to the DCT coefficients 1007 to output difference signals 1009 corresponding to the difference values 1002. The adder 1010 is for adding the predicted values 1008 to the difference signals 1009 to output an already coded image signal 1011** corresponding to the coding target block.

Furthermore, the frame memory 1014 is for temporarily storing already coded image signals 1011 corresponding to one frame or corresponding to frames of a prescribed number. The predictor 1012 is for generating the predicted values 1008 on the basis of an already coded image signal 1013 corresponding to a reference block in the memory 1014 and the image signal 103 corresponding to the coding target block.

The scanning unit **200*e*1 consists of two scanners 129*s*1 and 129*s*2 having different scan methods, for scanning the output of the information source coding unit 200*e*2, a first switch 108*e* for selecting one of the two scanners on the basis of a control signal 116*e* and supplying the output 1004 of the information source coding unit 200*e*2 to the selected scanner, a second switch 110*e* for selecting one of the two scanners on the basis of the control signal 116*e* and supplying an output of the selected scanner to the VLC unit 112, and a scan control unit 1016*e* for generating the control signal 116*e* on the basis of a parameter 1015 from the predictor 1012**.

Herein, the scanner **129*s*1 performs a scan of quantized values in the order shown in FIG. 31**(*a*). The scanner **129*s*2 is constituted by the respective elements 301, 304 and 305 in the prediction unit 200*c*2 shown in FIG. 29, and the respective elements 108*c*, 110*c*, 109*s*1~109*s*3 and 1401*c* in the scanning unit 200*c*1 shown in FIG. 29. That is, the scanner 129*s*2 performs intra-frame prediction to a block to which no inter-frame prediction has been performed in coding (hereinafter referred to as an intra-coded block) and selects one of the scanners 109*s*1~109*s*3 constituting the scanner 129*s*2 on the basis of prediction information concerning generation of predicted values. In addition, one of the scanners 109*s*1~109*s*3 constituting the scanner 129*s*2 performs a scan of quantized values in the order shown in FIG. 31**(*a*). The coding processing by the image coding apparatus **200*e* is fundamentally identical to that by the image coding apparatus 200*c* shown in FIG. 29**, except that difference values between an image signal which is obtained by blocking and predicted values of the image signal are coded.

That is, in inter-frame predictive coding by the image coding apparatus **200*e*, predicted values 1008 are set to 0 when prediction efficiency is low, whereby an image signal 103 corresponding to a coding target block is subjected to DCT processing as it is (intra-coding). Switching between inter-coding and intra-coding is performed for each macroblock, and information indicating either inter-coding or intra-coding is added to a parameter 1015** concerning prediction.

Further, when a coding target block is an inter-coded macroblock, the scanner 129s1 is selected. When the coding target block is an intra-coded macroblock, the scanner 129s2 is selected. Thereby, a scan method suitable for each coding is executed.

Specifically, quantized values corresponding to an intra-coded macroblock are supplied to the scanner 129s2 comprising the prediction unit 200c2 and the scanning unit 200c1 shown in FIG. 29. In the scanner 129s2, predicted values of the quantized values are generated by intra-frame prediction, and an adaptive scan is performed to difference values between the quantized values of the coding target block and the predicted values, on the basis of prediction information concerning generation of the predicted values.

Meanwhile, quantized values corresponding to an inter-coded macroblock are supplied to the scanner 129s1, and a scan in the order shown in FIG. 31(*a*) is performed in the scanner 129s1.

In the image coding apparatus 200e thus constructed, since the difference values are coded, many DCT coefficients become 0 by quantization, whereby the efficiency of variable-length coding is improved.

In addition, in the image coding apparatus 200e, no intra-frame prediction may be carried out to an intra-coded macroblock. In this case, one of the scanners 109s1~109s3 constituting the scanner 129s2 performs a scan in the order shown in FIG. 31(*a*) to quantized values of the intra-coded macroblock.

FIG. 34 is a block diagram illustrating a construction of an image decoding apparatus corresponding to the image coding apparatus 200e shown in FIG. 33. In FIG. 34, reference numeral 200f designates an image processing apparatus (image decoding apparatus), which decodes the coded image signal 1006 that has been coded in the image coding apparatus 200e.

This image decoding apparatus 200f has an inverse scanning unit 200f1 for performing an inverse scan to quantized values 1005 which are obtained by variable-length decoding of the coded image signal 1006 so that the order of the quantized values is returned to the order before scanning in coding, and changing an inverse scan method on the basis of the parameter 1015 concerning generation of predicted values in the image coding apparatus 200e, in place of the inverse scanner 202 in the image decoding apparatus 200b shown in FIG. 28. Further, the image decoding apparatus 200f has an information source decoding unit 200f2 for performing information source decoding to quantized values 1004 corresponding to a decoding target block which have been subjected to inverse scanning, in place of the information source de-coding unit 200b1 in the image decoding apparatus 200b.

The inverse scanning unit 200f1 consists of two inverse scanners 222s1 and 222s2 having different inverse scan methods, for inverse-scanning the output 1005 of the VLD unit 201, a first switch 108f for selecting one of the two inverse scanners on the basis of a control signal 116f and supplying the output 1005 of the VLD unit 201 to the selected inverse scanner, a second switch 110f for selecting one of the two inverse scanners on the basis of the control signal 116f and supplying the output of the selected inverse scanner to the information source decoding unit 200f2, and an inverse scan control unit 1016f for generating the control signal 116f on the basis of the prediction parameter 1015. Herein, the inverse scanners 222s1 and 222s2 correspond to the scanners 129s1 and 129s2 in the image coding apparatus 200e.

That is, the inverse scanner 222s1 performs an inverse scan corresponding to a scan in the order shown in FIG. 31(*a*), and the inverse scanner 222s2 is constituted by the respective elements 108d, 110d, 202s1~202s3 and 1401d in the inverse scanning unit 200d1 shown in FIG. 32, and the respective elements 304 and 401 in the prediction unit 200d2 shown in FIG. 32.

The information source decoding unit 200f2 consists of an inverse quantization unit 203f for inverse-quantizing the output 1004 of the inverse scanning unit 200f1, an inverse DCT unit 204f for performing inverse DCT processing to an output 1003 of the inverse quantization unit 203f, an adder 1101f for adding predicted values 1008f of the decoding target block to an output 1002 of the inverse DCT unit 204f.

Further, the information source decoding unit 200f2 consists of a frame memory 1014f for temporarily storing already decoded image signals 103 corresponding to one frame or frames of a prescribed number, and a predictor 1102f for generating the predicted values 1008f of the decoding target block on the basis of an already decoded image signal 1013f corresponding to a reference block in the memory 1014f and the parameter 1015 concerning prediction in coding.

In the image decoding apparatus 200f thus constructed, inverse converting processes corresponding to the respective converting processes in the image coding apparatus 200e shown in FIG. 33 are carried out to a coded image signal, in the reverse order of the order in coding, thereby accurately decoding the coded image signal.

The scan changing method in any of the conventional image processing apparatuses is available for progressive image coding in which all blocks are frame DCT blocks. However, in interlaced image coding in which frame DCT blocks and field DCT blocks coexist, since a field DCT block and a frame DCT block have different distributions of DCT coefficients, coefficients of about the same size are not consecutive when the same scan changing method is used, so that the efficiency of variable-length coding is degraded.

That is, in interlaced image coding in which either frame DCT processing or field DCT processing is adaptively selected for each macroblock and macroblocks having different DCT types coexist, when a scan method is changed using a parameter concerning generation of predicted values, since a field DCT block and a frame DCT block have different distributions of DCT coefficients, coefficients of about the same size are not consecutive, so that the efficiency of variable-length coding is degraded.

Further, also in inter-frame predictive coding of an interlaced image in any of the conventional image processing apparatuses, the above-mentioned problem arises because macroblocks having different DCT types coexist.

Furthermore, also in coding of a progressive image, when switching is performed between frame DCT processing and field DCT processing according to the content of the image, for example, in a case where frame DCT processing is executed when correlations between adjacent scan lines are strong and field DCT processing is executed when correlations between adjacent scan lines are weak, the efficiency of variable-length coding is degraded as in the interlaced image coding.

SUMMARY OF THE INVENTION

It is an object of the present invention to provide image processing apparatuses and image processing methods in which, in coding of an interlaced image in which macroblocks having different DCT types coexist, or in coding of a specific progressive image, a scan method that improves the efficiency of variable-length coding can be adaptively selected, thereby realizing highly efficient coding.

Another object of the present invention is to provide data recording media in which image processing programs for implementing the above-mentioned image processing methods are recorded.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

According to a first aspect of the present invention, an image processing method for dividing a digital image signal into plural image signals corresponding to plural blocks constituting a single display screen, and performing block-by-block coding of the image signals of the respective blocks, comprises transforming an image signal of a coding target block to be subjected to coding into frequency components by one of frame-by-frame frequency transformation on a frame basis and field-by-field frequency transformation on a field basis; setting a processing order for coding the frequency components corresponding to the image signal of the coding target block, according as the image signal of the coding target block has been subjected to the frame-by-frame frequency transformation or the field-by-field frequency transformation; and successively coding the frequency components corresponding to the image signal of the coding target block according to the order which has been set.

Thus, a processing order for coding is set to frequency components corresponding to an image signal of a coding target block, according as the image signal of the coding target block has been subjected to frame-by-frame frequency transformation or field-by-field frequency transformation. Therefore, in coding of an interlaced image in which frame DCT blocks and field DCT blocks coexist, a run length is increased, thereby improving coding efficiency in the interlaced image coding. In addition, in coding of a specific progressive image in which frame DCT blocks and field DCT blocks coexist, the same effect is obtained.

According to a second aspect of the present invention, an image processing method for performing block-by-block decoding of a coded image signal that is obtained by performing a coding process including frequency transformation to a digital image signal, for each of blocks constituting a single display screen, comprises performing rearrangement to an input signal that is obtained by coding various frequency components in a prescribed order, in an order which is decided according as an image signal corresponding to a decoding target block to be subjected to decoding has been subjected to frame-by-frame frequency transformation on a frame basis or field-by-field frequency transformation on a field basis, thereby generating frequency components corresponding to the decoding target block; and performing inverse frequency transformation to the frequency components corresponding to the decoding target block to regenerate an image signal corresponding to the decoding target block.

Thus, an input signal that is obtained by coding various frequency components in a prescribed order is subjected to rearrangement in an order which is decided according as an image signal corresponding to a decoding target block to be subjected to decoding has been subjected to frame-by-frame frequency transformation on a frame basis or field-by-field frequency transformation on a field basis, thereby generating frequency components corresponding to the decoding target block. Therefore, in variable-length decoding of DCT coefficients of either a progressive image or an interlaced image, accurate and efficient decoding can be carried out to a bit stream which has been coded using an adaptive scan changing method, i.e., a method for adaptively changing a processing order for coding, thereby regenerating an image signal.

According to a third aspect of the present invention, an image processing method for dividing a digital image signal into plural image signals corresponding to plural blocks constituting a single display screen, and performing block-by-block coding of the image signals of the respective blocks, comprises transforming an image signal of a coding target block to be subjected to coding into frequency components by one of frame-by-frame frequency transformation on a frame basis and field-by-field frequency transformation on a field basis; setting a processing order for coding the frequency components corresponding to the image signal of the coding target block, according to a combination pattern of the kind of frequency transformation to which the image signal of the coding target block has been subjected and the kind of frequency transformation to which an image signal of an already coded block located in the vicinity of the coding target block has been subjected; and successively coding the frequency components corresponding to the image signal of the coding target block according to the order which has been set.

Thus, a processing order for coding is set to frequency components corresponding to an image signal of a coding target block, according to a combination pattern of the kind of frequency transformation to which the image signal of the coding target block has been subjected and the kind of frequency transformation to which an image signal of an already coded block located in the vicinity of the coding target block has been subjected. Therefore, scanning processing for setting a coding order is controlled more finely and a more suitable scan is selected. Consequently, a run length is more increased, resulting in further improved coding efficiency.

According to a fourth aspect of the present invention, an image processing method for performing block-by-block decoding of a coded image signal that is obtained by performing a coding process including frequency transformation to a digital image signal, for each of blocks constituting a single display screen, comprises performing rearrangement to an input signal that is obtained by coding various frequency components in a prescribed order, in an order which is decided according to a combination pattern of frequency transformation to which an image signal corresponding to a decoding target block to be subjected to decoding has been subjected and frequency transformation to which an image signal corresponding to an already decoded block located in the vicinity of the decoding target block has been subjected, thereby generating frequency components corresponding to the decoding target block; and performing inverse frequency transformation to the frequency components corresponding to the decoding target block to regenerate an image signal corresponding to the decoding target block.

Thus, an input signal that is obtained by coding various frequency components in a prescribed order is subjected to rearrangement in an order which is decided according to a combination pattern of frequency transformation to which an image signal corresponding to a decoding target block to be subjected to decoding has been subjected and frequency transformation to which an image signal corresponding to an already decoded block located in the vicinity of the decoding target block has been subjected, thereby generating frequency components corresponding to the decoding target block. Therefore, in variable-length decoding of DCT coefficients of either a progressive image or an interlaced image, accurate and efficient decoding can be carried out to a bit stream which has been coded using an adaptive scan changing method, i.e., a method for adaptively changing a processing order for coding, thereby regenerating an image signal.

According to a fifth aspect of the present invention, an image processing method for dividing a digital image signal into plural image signals corresponding to plural blocks constituting a single display screen, and performing block-by-block coding of the image signals of the respective blocks, comprises transforming an image signal of a coding target block to be subjected to coding into frequency components by one of frame-by-frame frequency transformation on a frame basis and field-by-field frequency transformation on a field basis; generating predicted values of the frequency components corresponding to the coding target block from frequency components corresponding to an already coded block located in the vicinity of the coding target block, by a prescribed prediction process; setting a processing order for coding difference values between the frequency components of the coding target block and the predicted values, according to a combination pattern of the kind of frequency transformation to which the image signal of the coding target block has been subjected and the kind of the prediction process; and successively coding the difference values corresponding to the coding target block according to the order which has been set.

Thus, a processing order for coding is set to difference values between frequency components of a coding target block and predicted values of the frequency components, according to a combination pattern of the kind of frequency transformation to which an image signal of the coding target block has been subjected and the kind of a prediction process. Therefore, in coding of an interlaced image in which frame DCT blocks and field DCT blocks coexist, a run length is increased, thereby improving coding efficiency.

According to a sixth aspect of the present invention, an image processing method for performing block-by-block decoding of a coded image signal that is obtained by performing a coding process including frequency transformation to a digital image signal, for each of blocks constituting a single display screen, comprises performing rearrangement to an input signal that is obtained by coding various frequency components which have been subjected to a prediction process in a prescribed order, in an order which is decided according to a combination pattern of the kind of frequency transformation to which an image signal corresponding to a decoding target block to be subjected to decoding has been subjected and the kind of the prediction process; generating predicted values of frequency components corresponding to the decoding target block from frequency components corresponding to an already decoded block located in the vicinity of the decoding target block, on the basis of the kind of the prediction process; generating frequency components corresponding to the decoding target block on the basis of the input signal after the rearrangement and the predicted values; and performing inverse frequency transformation to the frequency components corresponding to the decoding target block to regenerate an image signal corresponding to the decoding target block.

Thus, an input signal that is obtained by coding various frequency components which have been subjected to a prediction process in a prescribed order is subjected to rearrangement in an order which is decided according to a combination pattern of the kind of frequency transformation to which an image signal corresponding to a decoding target block to be subjected to decoding has been subjected and the kind of the prediction process; and predicted values of frequency components corresponding to the decoding target block are generated from frequency components corresponding to an already decoded block located in the vicinity of the decoding target block, on the basis of the kind of the prediction process. Therefore, in variable-length decoding of DCT coefficients of either a progressive image or an interlaced image, accurate and efficient decoding can be carried out to a bit stream which has been coded using a fine and adaptive scan changing method, i.e., a method for finely and adaptively changing a processing order for coding, thereby regenerating an image signal.

According to a seventh aspect of the present invention, an image processing method for dividing a digital image signal into plural image signals corresponding to plural blocks constituting a single display screen, and performing block-by-block coding of the image signals of the respective blocks, comprises transforming an image signal of a coding target block to be subjected to coding into frequency components by one of frame-by-frame frequency transformation on a frame basis and field-by-field frequency transformation on a field basis; generating predicted values of the frequency components corresponding to the coding target block from frequency components corresponding to an already coded block located in the vicinity of the coding target block, by a prescribed prediction process; setting a processing order for coding difference values between the frequency components of the coding target block and the predicted values, according to a combination pattern of the kind of frequency transformation to which the image signal of the coding target block has been subjected, the kind of frequency transformation to which an image signal of the already coded block located in the vicinity of the coding target block has been subjected, and the kind of the prediction process; and successively coding the difference values corresponding to the coding target block according to the order which has been set.

Thus, a processing order for coding is set to difference values between frequency components of a coding target block and predicted values of the frequency components, according to a combination pattern of the kind of frequency transformation to which an image signal of the coding target block has been subjected, the kind of frequency transformation to which an image signal of an already coded block located in the vicinity of the coding target block has been subjected, and the kind of a prediction process. Therefore, scanning processing for setting a coding order is controlled more finely and a more suitable scan is selected. Consequently, a run length is more increased, resulting in further improved coding efficiency.

According to an eighth aspect of the present invention, an image processing method for performing block-by-block decoding of a coded image signal that is obtained by performing a coding process including frequency transformation to a digital image signal, for each of blocks constituting a single display screen, comprises performing rearrangement to an input signal that is obtained by coding various frequency components which have been subjected to a prediction process in a prescribed order, in an order which is decided according to a combination pattern of the kind of frequency transformation to which an image signal corresponding to a decoding target block to be subjected to decoding has been subjected, the kind of frequency transformation to which an image signal corresponding to an already decoded target block located in the vicinity of the decoding target block has been subjected, and the kind of the prediction process; generating predicted values of frequency components corresponding to the decoding target block from frequency components corresponding to the already decoded block located in the vicinity of the decoding target block, on the basis of the kind of the prediction process; generating frequency components corresponding to the decoding target block on the basis of the input signal after the rearrangement and the predicted values; and performing inverse frequency transformation to the frequency components corresponding to the decoding target block to regenerate an image signal corresponding to the decoding target block.

Thus, an input signal that is obtained by coding various frequency components which have been subjected to a prediction process in a prescribed order is subjected to rearrangement in an order which is decided according to a combination pattern of the kind of frequency transformation to which an image signal corresponding to a decoding target block to be subjected to decoding has been subjected, the kind of frequency transformation to which an image signal corresponding to an already decoded block located in the vicinity of the decoding target block has been subjected, and the kind of the prediction process, and predicted values of frequency components corresponding to the decoding target block are generated from frequency components corresponding to the already decoded block located in the vicinity of the decoding target block, on the basis of the kind of the prediction process. Therefore, accurate and efficient decoding can be carried out to a bit stream which has been coded using a fine and adaptive scan changing method, i.e., a method for finely and adaptively changing a processing order for coding, thereby regenerating an image signal.

According to a ninth aspect of the present invention, an image processing apparatus for dividing an input digital image signal into plural image signals corresponding to plural blocks constituting a single display screen, and performing block-by-block coding of the image signals of the respective blocks, comprises a blocking unit for blocking the digital image signal correspondingly to the respective blocks, frame by frame or field by field, which is used as a processing unit of frequency transformation, and outputting the blocked image signal and frequency transformation type information indicating the processing unit of frequency transformation; a frequency transformation unit for performing block-by-block frequency transformation to the blocked image signal to output frequency components corresponding to the image signal of each block; a quantization unit for quantizing the frequency components to output quantized values corresponding to the image signal of each block; plural scanners having different orders of rearrangement, and each setting a prescribed processing order to the quantized values by rearranging the quantized values; a scan control unit for outputting a control signal for selecting a scanner to be used for rearranging the quantized values, according to the frequency transformation type information; and a variable-length coding unit for performing variable-length coding to the quantized values after the rearrangement.

Thus, a processing order for coding is set to frequency components corresponding to an image signal of a coding target block, according as the image signal of the coding target block has been subjected to frame-by-frame frequency transformation or field-by-field frequency transformation. Therefore, in coding of an interlaced image in which frame DCT blocks and field DCT blocks coexist, a run length is increased, thereby improving coding efficiency in the interlaced image coding. In addition, in coding of a specific progressive image in which frame DCT blocks and field DCT blocks coexist, the same effect is obtained.

According to a tenth aspect of the present invention, an image processing apparatus for performing block-by-block decoding of a coded image signal that is obtained by performing a coding process including frequency transformation on a frame basis or on a field basis to a digital image signal, for each of blocks constituting a single display screen, comprises a variable-length decoding unit for performing variable-length decoding to a coded string that is obtained by performing rearrangement and variable-length coding to quantized values of frequency components of an image signal corresponding to each block; plural inverse scanners having different orders of rearrangement, and each rearranging quantized values which have been rearranged in coding so that the order of the quantized values is returned to the order before the rearrangement, thereby outputting the quantized values; an inverse scan control unit for outputting a control signal for selecting an inverse scanner to be used for rearranging the quantized values, according to frequency transformation type information indicating whether frequency transformation in coding is performed on a frame basis or on a field basis; an inverse quantization unit for inverse-quantizing the quantized values to output frequency components of an image signal corresponding to each block; an inverse frequency transformation unit for performing inverse frequency transformation to the frequency components to output an image signal corresponding to each block; and an inverse blocking unit for inverse-blocking the image signals of the respective blocks according to the frequency transformation type information to output a digital image signal.

Thus, an input signal that is obtained by coding various frequency components in a prescribed order is subjected to rearrangement in an order which is decided according as an image signal corresponding to a decoding target block to be subjected to decoding has been subjected to frame-by-frame frequency transformation on a frame basis or field-by-field frequency transformation on a field basis, thereby generating frequency components corresponding to the decoding target block. Therefore, in variable-length decoding of DCT coefficients of either a progressive image or an interlaced image, accurate and efficient decoding can be carried out to a bit stream which has been coded using an adaptive scan changing method, i.e., a method for adaptively changing a processing order for coding, thereby regenerating an image signal.

According to an eleventh aspect of the present invention, an image processing apparatus for dividing an input digital image signal into plural image signals corresponding to plural blocks constituting a single display screen, and performing block-by-block coding of the image signals of the respective blocks, comprises a blocking unit for blocking the digital image signal correspondingly to the respective blocks, frame by frame or field by field, which is used as a processing unit of frequency transformation, and outputting the blocked image signal and frequency transformation type information indicating the processing unit of frequency transformation; a frequency transformation unit for performing block-by-block frequency transformation to the blocked image signal to output frequency components corresponding to the image signal of each block; a quantization unit for quantizing the frequency components to output quantized values corresponding to the image signal of each block; a predictor for generating predicted values of quantized values corresponding to a coding target block to be subjected to coding, from quantized values corresponding to an already coded block located in the vicinity of the coding target block, and outputting the predicted values and prediction information concerning the kind of the generating process of the predicted values; a first adder for subtracting the predicted values from the quantized values corresponding to the coding target block to output difference values; a second adder for adding the predicted values to the difference values to output the result of the addition as quantized values corresponding to an already coded block; plural scanners having different orders of rearrangement, and each rearranging the difference values; a scan control unit for outputting a control signal for selecting a scanner to be used for rearranging the difference values, according to the prediction information and the frequency transformation type information; and a variable-length coding unit for performing variable-length coding to the difference values after the rearrangement.

Thus, a processing order for coding is set to difference values between frequency components of a coding target block and predicted values of the frequency components, according to a combination pattern of the kind of frequency transformation to which an image signal of the coding target block has been subjected and the kind of a prediction process. Therefore, in coding of an interlaced image in which frame DCT blocks and field DCT blocks coexist, a run length is increased, thereby improving coding efficiency.

According to a twelfth aspect of the present invention, an image processing apparatus for performing block-by-block decoding of a coded image signal that is obtained by performing a coding process including frequency transformation to a digital image signal, for each of blocks constituting a single display screen, comprises a variable-length decoding unit for performing variable-length decoding to a coded string that is obtained by performing prediction, rearrangement, and variable-length coding to quantized values of frequency components of an image signal corresponding to each block; plural inverse scanners having different orders of rearrangement, and each rearranging quantized values which have been rearranged in coding so that the order of the quantized values is returned to the order before the rearrangement; an inverse scan control unit for outputting a control signal for selecting an inverse scanner to be used for rearranging the quantized values, according to frequency transformation type information indicating the kind of frequency transformation in coding and prediction information indicating the kind of prediction in coding; an inverse quantization unit for inverse-quantizing the quantized values to output frequency components of an image signal corresponding to each block; an inverse frequency transformation unit for performing inverse frequency transformation to the frequency components to output an image signal corresponding to each block; and an inverse blocking unit for inverse-blocking the image signals of the respective blocks according to the frequency transformation type information to output a digital image signal.

Thus, an input signal that is obtained by coding various frequency components which have been subjected to a prediction process in a prescribed order is subjected to rearrangement in an order which is decided according to a combination pattern of the kind of frequency transformation to which an image signal corresponding to a decoding target block to be subjected to decoding has been subjected and the kind of the prediction process, and predicted values of frequency components corresponding to the decoding target block are generated from frequency components corresponding to an already decoded block located in the vicinity of the decoding target block, on the basis of the kind of the prediction process. Therefore, in variable-length decoding of DCT coefficients of either a progressive image or an interlaced image, accurate and efficient decoding can be carried out to a bit stream which has been coded using a fine and adaptive scan changing method, i.e., a method for finely and adaptively changing a processing order for coding, thereby regenerating an image signal.

According to a thirteenth aspect of the present invention, an image processing method for dividing a digital image signal into plural image signals corresponding to plural blocks constituting a single display screen, and performing block-by-block coding of the image signals of the respective blocks, comprises transforming an image signal of a coding target block to be subjected to coding into frequency components by one of frame-by-frame frequency transformation on a frame basis and field-by-field frequency transformation on a field basis; setting a processing order for coding the frequency components corresponding to the image signal of the coding target block, according to a distribution of frequency components corresponding to an image signal of an already coded block; and successively coding the frequency components corresponding to the image signal of the coding target block according to the order which has been set.

Thus, a processing order for coding is set to frequency components corresponding to a coding target block, according to a processing order for coding suitable for frequency components corresponding to an already coded block. Therefore, in coding of an interlaced image in which frame DCT blocks and field DCT blocks coexist, a run length is increased, thereby improving coding efficiency. In addition, in coding of a specific progressive image in which frame DCT blocks and field DCT blocks coexist, the same effect is obtained.

According to a fourteenth aspect of the present invention, an image processing method for performing block-by-block decoding of a coded image signal that is obtained by performing a coding process including frequency transformation to a digital image signal, for each of blocks constituting a single display screen, comprises performing rearrangement to an input signal that is obtained by coding various frequency components in a prescribed order, in an order which is decided according to a distribution of frequency components of an image signal corresponding to an already decoded block, thereby generating frequency components corresponding to a decoding target block to be subjected to decoding; and performing inverse frequency transformation to the frequency components corresponding to the decoding target block to regenerate an image signal corresponding to the decoding target block.

Thus, an input signal that is obtained by coding various frequency components in a prescribed order is subjected to rearrangement in an order which is decided according to a processing order for coding suitable for frequency components corresponding to an already decoded block, thereby generating frequency components corresponding to a decoding target block to be subjected to decoding. Therefore, in variable-length decoding of DCT coefficients of either a progressive image or an interlaced image, accurate and efficient decoding can be carried out to a bit stream which has been coded using a fine and adaptive scan changing method, i.e., a method for finely and adaptively changing a processing order for coding, thereby regenerating an image signal.

According to a fifteenth aspect of the present invention, an image processing method for dividing a digital image signal into plural image signals corresponding to plural blocks constituting a single display screen, and performing block-by-block coding of the image signals of the respective blocks, comprises transforming an image signal of a coding target block to be subjected to coding into frequency components by one of frame-by-frame frequency transformation on a frame basis and field-by-field frequency transformation on a field basis; generating predicted values of the frequency components corresponding to the coding target block from frequency components corresponding to an already coded block located in the vicinity of the coding target block, by a prescribed prediction process; setting a processing order for coding difference values between the frequency components of the coding target block and the predicted values, with switching, on the basis of flag information indicating whether adaptive order setting is carried out or not, between the first order setting operation in which a processing order is adaptively set according to the kind of the prediction process, and the second order setting operation in which a specific processing order is set regardless of the kind of the prediction process; and successively coding the difference values corresponding to the coding target block according to the processing order which has been set, and transmitting/storing a resulting coded signal, together with the flag information.

Thus, in coding, an adaptive scan is switched to OFF to execute a specific scan suitable for an interlaced image or a specific progressive image when required, whereby coding of an interlaced image or a specific progressive image can be efficiently simplified.

According to a sixteenth aspect of the present invention, an image processing method for performing block-by-block decoding of a coded image signal that is obtained by performing a coding process including frequency transformation to a digital image signal, for each of blocks constituting a single display screen, comprises performing rearrangement to an input signal that is obtained by coding various frequency components which have been subjected to a prediction process in a prescribed order, with switching, on the basis of flag information indicating whether adaptive rearrangement is carried out or not, which information is input together with the input signal, between the first rearrangement operation in which the input signal is subjected to adaptive rearrangement in an order according to the kind of the prediction process, and the second rearrangement operation in which the input signal is subjected to rearrangement in a specific order, regardless of the kind of the prediction process; generating predicted values of frequency components corresponding to a decoding target block to be subjected to decoding from frequency components corresponding to an already decoded block located in the vicinity of the decoding target block, on the basis of the kind of the prediction process; generating frequency components corresponding to the decoding target block on the basis of the input signal after the rearrangement and the predicted values; and performing inverse frequency transformation to the frequency components corresponding to the decoding target block to regenerate an image signal corresponding to the decoding target block.

Thus, in decoding, an adaptive inverse scan is switched to OFF to execute a specific inverse scan suitable for an interlaced image or a specific progressive image when required, whereby accurate decoding can be carried out to an interlaced image or a specific progressive image which has been subjected to a specific scan by switching an adaptive scan to OFF in coding.

According to a seventeenth aspect of the present invention, an image processing method for dividing a digital image signal into plural image signals corresponding to plural blocks constituting a single display screen, and performing block-by-block coding of the image signals of the respective blocks, comprises generating predicted values of an image signal of a coding target block to be subjected to coding from an image signal corresponding to an already coded display screen different from a display screen including the coding target block, by a prescribed prediction process; transforming difference values between the image signal of the coding target block and the predicted values into frequency components by one of frame-by-frame frequency transformation on a frame basis and field-by-field frequency transformation on a field basis; setting a processing order for coding the frequency components of the coding target block, with switching, on the basis of flag information indicating whether adaptive order setting is carried out or not, between the first order setting operation in which a processing order is adaptively set according to the kind of the prediction process, and the second order setting operation in which a specific processing order is set regardless of the kind of the prediction process; and successively coding the frequency components corresponding to the coding target block according to the processing order which has been set, and transmitting/storing a resulting coded signal, together with the flag information.

Thus, in coding, since, for each of intra-coded macroblocks and inter-coded macroblocks, one of plural scans is selected according to a parameter concerning prediction and a scan switching signal, a scan suitable for each coding method is performed. Therefore, in inter coding of an interlaced image in which inter-coded macroblocks and intra-coded macroblocks having different frequency component distributions coexist, a run length is increased, thereby improving coding efficiency. In addition, in inter coding of a specific progressive image in which inter-coded macroblocks and intra-coded macroblocks having different frequency component distributions coexist, the same effect is obtained.

According to an eighteenth aspect of the present invention, an image processing method for performing block-by-block decoding of a coded image signal that is obtained by performing a coding process including frequency transformation to a digital image signal, for each of blocks constituting a single display screen, comprises performing rearrangement to an input signal that is obtained by coding various frequency components which have been subjected to a prediction process in a prescribed order, with switching, on the basis of flag information indicating whether adaptive rearrangement is carried out or not, which information is input together with the input signal, between the first rearrangement operation in which the input signal is subjected to adaptive rearrangement in an order according to the kind of the prediction process, and the second rearrangement operation in which the input signal is subjected to rearrangement in a specific order, regardless of the kind of the prediction process; performing inverse frequency transformation to the input signal after the rearrangement to generate a difference signal corresponding to a decoding target block to be subjected to decoding; generating predicted values of an image signal of the decoding target block from an image signal corresponding to an already decoded display screen different from a display screen including the decoding target block, on the basis of the kind of the prediction process; and regenerating an image signal corresponding to the decoding target block on the basis of the difference signal and the predicted values.

Thus, in decoding, for each of intra-coded macroblocks and inter-coded macroblocks, one of plural inverse scans is selected according to a parameter concerning prediction and a scan switching signal. Therefore, accurate and efficient decoding can be carried out to a bit stream which has been coded by selecting one of plural scans for each of intra-coded macroblocks and inter-coded macroblocks, according to the parameter concerning prediction and the scan switching signal, thereby regenerating an image signal.

According to a nineteenth aspect of the present invention, an image processing apparatus for dividing an input digital image signal into plural image signals corresponding to plural blocks constituting a single display screen, and performing block-by-block coding of the image signals of the respective blocks, comprises a blocking unit for blocking the digital image signal correspondingly to the respective blocks, frame by frame or field by field, which is used as a processing unit of frequency transformation, and outputting the blocked image signal and frequency transformation type information indicating the processing unit of frequency transformation; a frequency transformation unit for performing block-by-block frequency transformation to the blocked image signal to output frequency components corresponding to the image signal of each block; a quantization unit for quantizing the frequency components to output quantized values corresponding to the image signal of each block; plural scanners having different orders of rearrangement, and each setting a prescribed processing order to the quantized values by rearranging the quantized values; a characteristic analyzing unit for performing characteristic analysis of the output of the quantization unit to output a scan specifying signal for specifying a scanner which performs rearrangement suitable for the quantized values of each block; a memory for temporarily storing the scan specifying signals from the characteristic analyzing unit; a scan control unit for outputting a control signal for selecting a scanner to be used for rearranging quantized values of a coding target block to be subjected to coding, according to the scan specification signals which are stored in the memory; and a variable-length coding unit for performing variable-length coding to the quantized values after the rearrangement.

Thus, a processing order for coding is set to frequency components corresponding to a coding target block, according to a processing order for coding suitable for frequency components corresponding to an already coded block. Therefore, in coding of an interlaced image in which frame DCT blocks and field DCT blocks coexist, a run length is increased, thereby improving coding efficiency. In addition, in coding of a specific progressive image in which frame DCT blocks and field DCT blocks coexist, the same effect is obtained.

According to a twentieth aspect of the present invention, an image processing apparatus for performing block-by-block decoding of a coded image signal that is obtained by performing a coding process including frequency transformation on a frame basis or on a field basis to a digital image signal, for each of blocks constituting a single display screen, comprises a variable-length decoding unit for performing variable-length decoding to a coded string that is obtained by performing rearrangement and variable-length coding to quantized values of frequency components of an image signal corresponding to each block; plural inverse scanners having different orders of rearrangement, and each rearranging quantized values which have been rearranged in coding so that the order of the quantized values is returned to the order before the rearrangement; a characteristic analyzing unit for performing characteristic analysis of the output of the inverse scanner to output a scan specifying signal for specifying an inverse scanner which performs rearrangement suitable for the quantized values of each block; a memory for temporarily storing the scan specifying signals from the characteristic analyzing unit; an inverse scan control unit for outputting a control signal for selecting an inverse scanner to be used for rearranging quantized values of a decoding target block to be subjected to decoding, according to the scan specification signals which are stored in the memory; an inverse quantization unit for inverse-quantizing the quantized values output from the selected inverse scanner to output frequency components of an image signal corresponding to each block; an inverse frequency transformation unit for performing inverse frequency transformation to the frequency components to output an image signal corresponding to each block; and an inverse blocking unit for inverse-blocking the image signals of the respective blocks according to frequency transformation type information indicating whether frequency transformation in coding is performed on a frame basis or on a field basis, to output a digital image signal.

Thus, an input signal that is obtained by coding various frequency components in a prescribed order is subjected to rearrangement in an order which is decided according to a processing order for coding suitable for frequency components corresponding to an already decoded block, thereby generating frequency components corresponding to a decoding target block to be subjected to decoding. Therefore, in variable-length decoding of DCT coefficients of either a progressive image or an interlaced image, accurate and efficient decoding can be carried out to a bit stream which has been coded using a fine and adaptive scan changing method, i.e., a method for finely and adaptively changing a processing order for coding, thereby regenerating an image signal.

According to a twenty-first aspect of the present invention, an image processing apparatus for dividing an input digital image signal into plural image signals corresponding to plural blocks constituting a single display screen, and performing block-by-block coding of the image signals of the respective blocks, comprises a blocking unit for blocking the digital image signal correspondingly to the respective blocks, frame by frame or field by field, which is used as a processing unit of frequency transformation, and outputting the blocked image signal and frequency transformation type information indicating the processing unit of frequency transformation; a frequency transformation unit for performing block-by-block frequency transformation to the blocked image signal to output frequency components corresponding to the image signal of each block; a quantization unit for quantizing the frequency components to output quantized values corresponding to the image signal of each block; a predictor for generating predicted values of quantized values corresponding to a coding target block to be subjected to coding, from quantized values corresponding to an already coded block located in the vicinity of the coding target block, and outputting the predicted values and prediction information concerning the kind of the generating process of the predicted values; a first adder for subtracting the predicted values from the quantized values corresponding to the coding target block to output difference values; a second adder for adding the predicted values to the difference values to output the result of the addition as quantized values corresponding to an already coded block; plural scanners having different orders of rearrangement, and each being selected by a selecting signal and rearranging the difference values; a scan control unit for outputting a first control signal for selecting a scanner to be used for rearranging the difference values, according to the prediction information; a switch for selecting one of the first control signal and a second control signal for selecting a specific scan, according to a scan changing signal which is generated outside/inside a system, and outputting the selected control signal as the selecting signal of the scanner; and a variable-length coding unit for performing variable-length coding to the difference values after the rearrangement.

Thus, in coding, an adaptive scan is switched to OFF to execute a specific scan suitable for an interlaced image or a specific progressive image when required, whereby coding of an interlaced image or a specific progressive image can be efficiently simplified.

According to a twenty-second aspect of the present invention, an image processing apparatus for performing block-by-block decoding of a coded image signal that is obtained by performing a coding process including frequency transformation on a frame basis or on a field basis to a digital image signal, for each of blocks constituting a single display screen, comprises a variable-length decoding unit for performing variable-length decoding to a coded string that is obtained by performing prediction, rearrangement, and variable-length coding to quantized values of frequency components of an image signal corresponding to each block; plural inverse scanners having different orders of rearrangement, and each being selected by a selecting signal, and rearranging quantized values which have been rearranged in coding so that the order of the quantized values is returned to the order before the rearrangement; an inverse scan control unit for outputting a first control signal for selecting an inverse scanner to be used for rearranging the quantized values, according to prediction information indicating the kind of prediction in coding; a switch for selecting one of the first control signal and a second control signal for selecting a specific scan, according to a scan changing signal, and outputting the selected control signal as the selecting signal of the inverse scanner; a predictor for generating predicted values of quantized values corresponding to a decoding target block to be subjected to decoding, from quantized values corresponding to an already decoded block located in the vicinity of the decoding target block, according to the prediction information; an adder for adding the predicted values to the output of the inverse scanner; an inverse quantization unit for inverse-quantizing the output of the adder to output frequency components of an image signal corresponding to each block; an inverse frequency transformation unit for performing inverse frequency transformation to the frequency components to output an image signal corresponding to each block; and an inverse blocking unit for inverse-blocking the image signals of the respective blocks according to frequency transformation type information indicating whether frequency transformation in coding is performed on a frame basis or on a field basis, to output a digital image signal.

Thus, in decoding, an adaptive inverse scan is switched to OFF to execute a specific inverse scan suitable for an interlaced image or a specific progressive image when required, whereby accurate decoding can be carried out to an interlaced image or a specific progressive image which has been subjected to a specific scan by switching an adaptive scan to OFF in coding.

According to a twenty-third aspect of the present invention, an image processing apparatus for dividing an input digital image signal into plural image signals corresponding to plural blocks constituting a single display screen, and performing block-by-block coding of the image signals of the respective blocks, comprises a blocking unit for blocking the digital image signal correspondingly to the respective blocks, frame by frame or field by field, which is used as a processing unit of frequency transformation, and outputting the blocked image signal and frequency transformation type information indicating the processing unit of frequency transformation; a first adder for subtracting predicted values of the blocked image signal from the blocked image signal to output a difference signal; a frequency transformation unit for performing block-by-block frequency transformation to the difference signal to output frequency components corresponding to the difference signal of each block; a quantization unit for quantizing the frequency components to output quantized values corresponding to the image signal of each block; an inverse quantization unit for inverse-quantizing the quantized values to output the frequency components corresponding to the difference signal of each block; an inverse frequency transformation unit for performing inverse frequency transformation to the output of the inverse quantization unit to output the difference signal of each block; a second adder for adding the predicted values to the output of the inverse frequency transformation unit, and storing the result of the addition in a frame memory, as an image signal of an already coded block as a constituent of an already coded display screen; a predictor for generating the predicted values on the basis of the image signal of each block and an image signal of an already coded block which is stored in the frame memory, and outputting the predicted values and prediction information concerning the generating process of the predicted values; plural scanners having different orders of rearrangement, and each rearranging the quantized values; a scan control unit for outputting a control signal for selecting a scanner to be used for rearranging the quantized values, according to a scan changing signal which is generated outside/inside a system and the prediction information; and a variable-length coding unit for performing variable-length coding to the quantized values after the rearrangement.

Thus, in coding, since, for each of intra-coded macroblocks and inter-coded macroblocks, one of plural scans is selected according-to a parameter concerning prediction and a scan switching signal, a scan suitable for each coding method is performed. Therefore, in inter coding of an interlaced image in which inter-coded macroblocks and intra-coded macroblocks having different frequency component distributions coexist, a run length is increased, thereby improving coding efficiency. In addition, in inter coding of a specific progressive image in which inter-coded macroblocks and intra-coded macroblocks having different frequency component distributions coexist, the same effect is obtained.

According to a twenty-fourth aspect of the present invention, an image processing apparatus for performing block-by-block decoding of a coded image signal that is obtained by performing a coding process including frequency transformation on a frame basis or on a field basis to a digital image signal, for each of blocks constituting a single display screen, comprises a variable-length decoding unit for performing variable-length decoding to a coded string that is obtained by performing prediction, frequency transformation, quantization, rearrangement, and variable-length coding to an image signal corresponding to each block; plural inverse scanners having different orders of rearrangement, and each rearranging quantized values which have been rearranged in coding so that the order of the quantized values is returned to the order before the rearrangement; an inverse scan control unit for outputting a control signal for selecting an inverse scanner to be used for rearranging the quantized values, according to a scan changing signal and prediction information indicating the kind of prediction in coding; an inverse quantization unit for inverse-quantizing the output of the inverse scanner to output frequency components of a difference signal corresponding to each block; an inverse frequency transformation unit for performing inverse frequency transformation to the frequency components to output a difference signal corresponding to each block; an adder for adding predicted values of an image signal corresponding to each block to the difference signal to output an image signal corresponding to each block; a frame memory for storing the output of the adder, as an image signal of an already decoded block as a constituent of an already decoded display screen; a predictor for generating the predicted values on the basis of the prediction information and an image signal of an already coded block; and an inverse blocking unit for inverse-blocking the image signals of the respective blocks according to frequency transformation type information indicating whether frequency transformation in coding is performed on a frame basis or on a field basis, to output a digital image signal.

Thus, in decoding, for each of intra-coded macroblocks and inter-coded macroblocks, one of plural inverse scans is selected according to a parameter concerning prediction and a scan switching signal. Therefore, accurate and efficient decoding can be carried out to a bit stream which has been coded by selecting one of plural scans for each of intra-coded macroblocks and inter-coded macroblocks, according to the parameter concerning prediction and the scan switching signal, thereby regenerating an image signal.

According to a twenty-fifth aspect of the present invention, an image processing method for dividing a digital image signal into plural image signals corresponding to plural blocks constituting a single display screen, and performing block-by-block coding of the image signals of the respective blocks, comprises generating inter-frame predicted values of an image signal of a coding target block to be subjected to coding, from an image signal corresponding to an already coded display screen different from a display screen including the coding target block, by a prescribed inter-frame prediction process; transforming one of inter-frame difference values between the image signal of the coding target block and the inter-frame predicted values, and the image signal of the coding target block, into frequency components by one of frame-by-frame frequency transformation on a frame basis and field-by-field frequency transformation on a field basis; generating intra-frame predicted values of the frequency components corresponding to the coding target block from frequency components corresponding to an already coded block located in the vicinity of the coding target block, by a prescribed intra-frame prediction process; setting a processing order for coding intra-frame difference values between the frequency components of the coding target block and the intra-frame predicted values, with switching, on the basis of flag information indicating switching of order setting, between the first order setting operation in which a processing order is adaptively set according to the kinds of both the prediction processes, and the second order setting operation in which a specific processing order is set regardless of the kinds of both the prediction processes; and successively coding the intra-frame difference values corresponding to the coding target block according to the processing order which has been set, and transmitting/storing a resulting coded signal, together with the flag information.

Thus, in coding, switching is performed, on the basis of flag information indicating switching of order setting, between the first order setting operation in which a processing order for coding is adaptively set to intra-frame difference values between frequency components of a coding target block and intra-frame predicted values of the frequency components, according to the kinds of inter-frame prediction and intra-frame prediction processes, and the second order setting operation in which a specific processing order for coding is set thereto, regardless of the kinds of both the prediction processes. Therefore, in inter coding of an interlaced image in which inter-coded macroblocks and intra-coded macroblocks having different frequency component distributions coexist, a run length is still more increased, thereby improving coding efficiency. In addition, in inter coding of a specific progressive image in which inter-coded macroblocks and intra-coded macroblocks having different frequency component distributions coexist, the same effect is obtained.

Specifically, in coding of an interlaced image signal, switching is performed, according to a scan mode switching signal, between a first coding mode in which an adaptive scan is performed to quantized values of an intra-coded block and a zigzag scan is performed to quantized values of an inter-coded block, and a second coding mode in which a scan which gives a priority to a first vertical direction is performed to the quantized values of the intra-coded block and a scan which gives a priority to a second vertical direction is performed to the quantized values of the inter-coded block. Accordingly, in coding of an interlaced image signal in which inter-coded blocks and intra-coded blocks having different frequency component distributions coexist, coding efficiency can be further improved.

According to a twenty-sixth aspect of the present invention, in the image processing method as defined in the twenty-fifth aspect of the invention, an interlaced image signal is received as the digital image signal; in the first order setting operation, concerning an inter-coded block in which the frequency components obtained by the frequency transformation correspond to the inter-frame difference values of the coding target block, the processing order from the side of low-frequency components toward the side of high-frequency components is set so that the components arranged along a horizontal direction of a display screen and the components arranged along a vertical direction have uniform priorities; and concerning an intra-coded block in which the frequency components obtained by the frequency transformation correspond to the image signal of the coding target block, the processing order from the side of low-frequency components toward the side of high-frequency components is adaptively set according to the kind of the intra-frame prediction process; and in the second order setting operation, concerning both the inter-coded block and intra-coded block, the processing order from the side of low-frequency components toward the side of high-frequency components is set so that the components arranged along a vertical direction of a display screen have priority over the components arranged along a horizontal direction.

Thus, in coding, switching is performed, on the basis of flag information indicating switching of order setting, between the first order setting operation in which a processing order for coding is adaptively set to intra-frame difference values between frequency components of a coding target block and intra-frame predicted values of the frequency components, according to the kinds of inter-frame prediction and intra-frame prediction processes, and the second order setting operation in which a specific processing order for coding is set thereto, regardless of the kinds of both the prediction processes. Therefore, in inter coding of an interlaced image in which inter-coded macroblocks and intra-coded macroblocks having different frequency component distributions coexist, a run length is still more increased, thereby improving coding efficiency. In addition, in inter coding of a specific progressive image in which inter-coded macroblocks and intra-coded macroblocks having different frequency component distributions coexist, the same effect is obtained.

According to a twenty-seventh aspect of the present invention, an image processing method for performing block-by-block decoding of a coded image signal that is obtained by performing a coding process including frequency transformation to a digital image signal, for each of blocks constituting a single display screen, comprises performing rearrangement to an input signal of a decoding target block to be subjected to decoding that is obtained by coding various frequency components which have been subjected to an inter-frame prediction process and an intra-frame prediction process in a prescribed order, with switching, on the basis of flag information indicating switching of rearrangement, which information is input together with the input signal, between the first rearrangement operation in which the input signal is subjected to adaptive rearrangement in an order according to the kinds of both the prediction processes, and the second rearrangement operation in which the input signal is subjected to rearrangement in a specific order, regardless of the kinds of both the prediction processes; generating intra-frame predicted values of frequency components corresponding to the decoding target block from frequency components corresponding to an already decoded block located in the vicinity of the decoding target block, by the intra-frame prediction process; generating frequency components corresponding to the decoding target block on the basis of the input signal after the rearrangement and the intra-frame predicted values; performing inverse frequency transformation to the frequency components corresponding to the decoding target block to generate one of an image signal corresponding to the decoding target block and a difference signal corresponding to the same block; and adding, to the difference signal corresponding to the decoding target block, inter-frame predicted values of an image signal of the decoding target block, which are generated from an image signal corresponding to an already decoded display screen different from a display screen including the decoding target block by the inter-frame prediction process, thereby generating an image signal corresponding to the decoding target block.

Thus, in decoding, switching is performed, on the basis of flag information indicating switching of rearrangement, which information is input together with an input signal of a decoding target block to be subjected to decoding that is obtained by coding various frequency components which have been subjected to an inter-frame prediction process and an intra-frame prediction process in a prescribed order, between the first rearrangement operation in which the input signal is adaptively rearranged in an order according to the kinds of both the prediction processes, and the second rearrangement operation in which the input signal is rearranged in a specific order, regardless of the kinds of both the prediction processes. Therefore, accurate and efficient decoding can be carried out to a bit stream which has been coded by selecting one of plural scans for each of intra-coded macroblocks and inter-coded macroblocks, according to a parameter concerning prediction and a scan switching signal, thereby regenerating an image signal.

According to a twenty-eighth aspect of the present invention, in the image processing method as defined in the twenty-seventh aspect of the invention, a coded interlaced image signal, which is obtained by coding an interlaced image signal block by block, is received as the coded image signal to be subjected to decoding; in the first rearrangement operation, concerning an inter-coded block in which frequency components obtained by frequency transformation of the interlaced image signal correspond to inter-frame difference values of a coding target block, the frequency components to which the processing order from the side of low-frequency components toward the side of high-frequency components has been uniformly set so that the components arranged along a horizontal direction of a display screen and the components arranged along a vertical direction have uniform priorities, are rearranged according to the processing order which has been uniformly set; and concerning an intra-coded block in which frequency components obtained by frequency transformation of the interlaced image signal correspond to an image signal of a coding target block, the frequency components to which the processing order from the side of low-frequency components toward the side of high-frequency components has been adaptively set according to the kind of the intra-frame prediction process, are rearranged according to the processing order which has been adaptively set; and in the second rearrangement operation, concerning both the inter-coded block and intra-coded block, the frequency components to which the processing order from the side of low-frequency components toward the side of high-frequency components has been set so that the components arranged along a vertical direction of a display screen have priority over the components arranged along a horizontal direction, are rearranged according to the processing order which has been set with a priority given to a vertical direction.

Thus, in decoding, switching is performed, on the basis of flag information indicating switching of rearrangement, which information is input together with an input signal of a decoding target block to be subjected to decoding that is obtained by coding various frequency components which have been subjected to an inter-frame prediction process and an intra-frame prediction process in a prescribed order, between the first rearrangement operation in which the input signal is adaptively rearranged in an order according to the kinds of both the prediction processes, and the second rearrangement operation in which the input signal is rearranged in a specific order, regardless of the kinds of both the prediction processes. Therefore, accurate and efficient decoding can be carried out to a bit stream which has been coded by selecting one of plural scans for each of intra-coded macroblocks and inter-coded macroblocks, according to a parameter concerning prediction and a scan switching signal, thereby regenerating an image signal.

According to a twenty-ninth aspect of the present invention, an image processing apparatus for dividing an input digital image signal into plural image signals corresponding to plural blocks constituting a single display screen, and performing block-by-block coding of the image signals of the respective blocks, comprises a blocking unit for blocking the digital image signal correspondingly to the respective blocks, frame by frame or field by field, which is used as a processing unit of frequency transformation, and outputting the blocked image signal and frequency transformation type information indicating the processing unit of frequency transformation; inter-frame prediction means for performing inter-frame prediction to the blocked image signal to output inter-frame prediction data corresponding to inter-frame difference values between the image signal of each block and inter-frame predicted values of the image signal, and outputting inter-frame prediction information concerning the generating process of the inter-frame predicted values; intra-frame prediction means for generating intra-frame predicted values of inter-frame prediction data corresponding to a coding target block from inter-frame prediction data corresponding to an already coded block located in the vicinity of the coding target block, outputting intra-frame difference values between the inter-frame prediction data and the intra-frame predicted values, and outputting intra-frame prediction information concerning the kind of the generating process of the intra-frame predicted values; scanning means including plural scanners having different orders of rearrangement, and each being selected by a selecting signal and rearranging the intra-frame difference values, the scanning means selecting a scanner to be used for rearranging the intra-frame difference values, according to the inter-frame prediction information and a scan changing signal which is generated outside/inside a system; and a variable-length coding unit for performing variable-length coding to the intra-frame difference values after the rearrangement; and said scanning means being constructed so that switching is performed, on the basis of the scan changing signal, between the first order setting operation in which a coding order is adaptively set to the intra-frame difference values corresponding to the coding target block, according to the kinds of both the prediction processes, and the second order setting operation in which a specific coding order is set thereto, regardless of the kinds of both the prediction processes.

Thus, in coding, switching is performed, on the basis of flag information indicating switching of order setting, between the first order setting operation in which a processing order for coding is adaptively set to intra-frame difference values between frequency components of a coding target block and intra-frame predicted values of the frequency components, according to the kinds of inter-frame prediction and intra-frame prediction processes, and the second order setting operation in which a specific processing order for coding is set thereto, regardless of the kinds of both the prediction processes. Therefore, in inter coding of an interlaced image in which inter-coded macroblocks and intra-coded macroblocks having different frequency component distributions coexist, a run length is still more increased, thereby improving coding efficiency. In addition, in inter coding of a specific progressive image in which inter-coded macroblocks and intra-coded macroblocks having different frequency component distributions coexist, the same effect is obtained.

According to a thirtieth aspect of the present invention, in the image processing apparatus as defined in the twenty-ninth aspect of the invention, said inter-frame prediction means comprises a first adder for subtracting inter-frame predicted values of the blocked image signal from the blocked image signal to output a difference signal; a frequency transformation unit for performing block-by-block frequency transformation to the difference signal to output frequency components corresponding to the difference signal of each block; a quantization unit for quantizing the frequency components to output quantized values corresponding to the difference signal of each block as the inter-frame prediction data; an inverse quantization unit for inverse-quantizing the quantized values to output the frequency components corresponding to the difference signal of each block; an inverse frequency transformation unit for performing inverse frequency transformation to the output of the inverse quantization unit to output the difference signal of each block; a second adder for adding the inter-frame predicted values to the output of the inverse frequency transformation unit, and storing the result of the addition in a frame memory, as an image signal of an already coded block as a constituent of an already coded display screen; and an inter-frame predictor for generating the inter-frame predicted values on the basis of the image signal of each block and an image signal of an already coded block which is stored in the frame memory, and outputting the inter-frame predicted values and inter-frame prediction information concerning the generating process of the inter-frame predicted values; and said intra-frame prediction means comprises an intra-frame predictor for generating intra-frame predicted values of quantized values corresponding to a coding target block from quantized values corresponding to an already coded block located in the vicinity of the coding target block, and outputting the intra-frame predicted values and intra-frame prediction information concerning the kind of the generating process of the intra-frame predicted values; a third adder for subtracting the intra-frame predicted values from the quantized values corresponding to the coding target block to output intra-frame difference values; and a fourth adder for adding the intra-frame predicted values to the difference values to output the result of the addition as quantized values corresponding to an already coded block.

Thus, in coding, switching is performed, on the basis of flag information indicating switching of order setting, between the first order setting operation in which a processing order for coding is adaptively set to intra-frame difference values between frequency components of a coding target block and intra-frame predicted values of the frequency components, according to the kinds of inter-frame prediction and intra-frame prediction processes, and the second order setting operation in which a specific processing order for coding is set thereto, regardless of the kinds of both the prediction processes. Therefore, in inter coding of an interlaced image in which inter-coded macroblocks and intra-coded macroblocks having different frequency component distributions coexist, a run length is still more increased, thereby improving coding efficiency. In addition, in inter coding of a specific progressive image in which inter-coded macroblocks and intra-coded macroblocks having different frequency component distributions coexist, the same effect is obtained.

According to a thirty-first aspect of the present invention, an image processing apparatus for performing block-by-block decoding of a coded image signal that is obtained by performing a coding process including frequency transformation to a digital image signal, for each of blocks constituting a single display screen, comprises a variable-length decoding unit for performing variable-length decoding to a coded string that is obtained by performing inter-frame prediction, intra-frame prediction, frequency transformation, quantization, rearrangement, and variable-length coding to an image signal corresponding to each block; inverse scanning means including plural inverse scanners having different orders of rearrangement, and each rearranging quantized values which have been rearranged in coding so that the order of the quantized values is returned to the order before the rearrangement, the inverse scanning means selecting an inverse scanner to be used for rearranging the quantized values, according to a scan changing signal which is generated outside/inside a system, and inter-frame prediction information indicating the kind of inter-frame prediction and intra-frame prediction information indicating the kind of intra-frame prediction in coding; intra-frame prediction means for generating intra-frame predicted values of quantized values corresponding to a decoding target block from quantized values corresponding to an already decoded block located in the vicinity of the decoding target block, according to the intra-frame prediction information, and outputting the result of addition between the output of the inverse scanning means and the intra-frame predicted values; inter-frame prediction means for performing inter-frame prediction to the output of the intra-frame prediction means on the basis of the inter-frame prediction information, to generate an image signal corresponding to each block; and an inverse blocking unit for inverse-blocking the image signals of the respective blocks according to frequency transformation type information indicating a processing unit of frequency transformation in coding, to output a digital image signal; and said inverse scanning means being constructed so that switching is performed, on the basis of flag information indicating switching of rearrangement, which information is input together with an input signal of the decoding target block that is obtained by coding various frequency components which have been subjected to the inter-frame prediction process and the intra-frame prediction process in a prescribed order, between the first rearrangement operation in which the input signal is subjected to adaptive rearrangement in an order according to the kinds of both the prediction processes, and the second rearrangement operation in which the input signal is subjected to rearrangement in a specific order, regardless of the kinds of both the prediction processes.

Thus, in decoding, switching is performed, on the basis of flag information indicating switching of rearrangement, which information is input together with an input signal of a decoding target block to be subjected to decoding that is obtained by coding various frequency components which have been subjected to an inter-frame prediction process and an intra-frame prediction process in a prescribed order, between the first rearrangement operation in which the input signal is adaptively rearranged in an order according to the kinds of both the prediction processes, and the second rearrangement operation in which the input signal is rearranged in a specific order, regardless of the kinds of both the prediction processes. Therefore, accurate and efficient decoding can be carried out to a bit stream which has been coded by selecting one of plural scans for each of intra-coded macroblocks and inter-coded macroblocks, according to a parameter concerning prediction and a scan switching signal, thereby regenerating an image signal.

According to a thirty-second aspect of the present invention, in the image processing apparatus as defined in the thirty-first aspect of the invention, said intra-frame prediction means comprises an intra-frame predictor for generating intra-frame predicted values of quantized values corresponding to a decoding target block from quantized values corresponding to an already decoded block located in the vicinity of the decoding target block, according to intra-frame prediction information; and a first adder for adding the intra-frame predicted values to the output of the selected inverse scanner; and said inter-frame prediction means comprises an inverse quantization unit for inverse-quantizing the output of the first adder to output frequency components of a difference signal corresponding to each block; an inverse frequency transformation unit for performing inverse frequency transformation to the frequency components to output a difference signal corresponding to each block; a second adder for adding inter-frame predicted values of an image signal corresponding to each block to the difference signal to output an image signal corresponding to each block; a frame memory for storing the output of the second adder, as an image signal of an already decoded block as a constituent of an already decoded display screen; and an inter-frame predictor for generating the inter-frame predicted values on the basis of inter-frame prediction information and an image signal of an already coded block.

Thus, in decoding, switching is performed, on the basis of flag information indicating switching of rearrangement, which information is input together with an input signal of a decoding target block to be subjected to decoding that is obtained by coding various frequency components which have been subjected to an inter-frame prediction process and an intra-frame prediction process in a prescribed order, between the first rearrangement operation in which the input signal is adaptively rearranged in an order according to the kinds of both the prediction processes, and the second rearrangement operation in which the input signal is rearranged in a specific order, regardless of the kinds of both the prediction processes. Therefore, accurate and efficient decoding can be carried out to a bit stream which has been coded by selecting one of plural scans for each of intra-coded macroblocks and inter-coded macroblocks, according to a parameter concerning prediction and a scan switching signal, thereby regenerating an image signal.

According to a thirty-third aspect of the present invention, a data recording medium contains an image processing program, which makes a computer execute image processing in the image processing method defined in any of the first to eighth, thirteenth to eighteenth, twenty-fifth and twenty-seventh aspects. Therefore, the same effect as in any of these aspects is obtained.

BRIEF DESCRIPTION OF THE DRAWINGS

FIGS. 31(*a*)~31(*c*) are diagrams each illustrating the scanning order in a scan which is selected in a scan changing method.

DETAILED DESCRIPTION OF THE PREFERRED EMBODIMENTS

A description will be given of embodiments of the present invention with reference to drawings.

[Embodiment 1]

Figure 1:
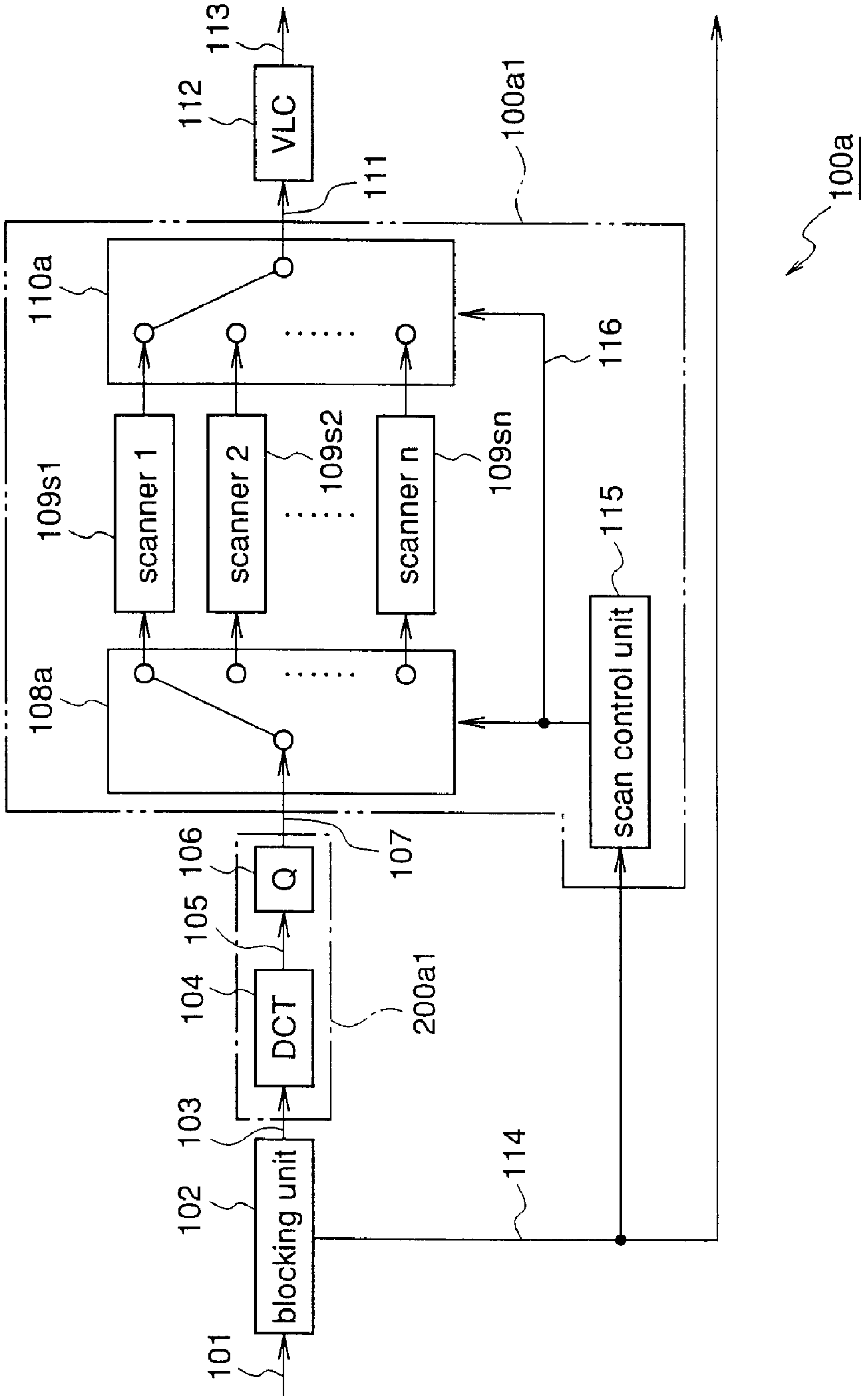
FIG. 1 is a block diagram illustrating a construction of an image coding apparatus as an image processing apparatus in accordance with a first embodiment of the present invention.
Figure 26:
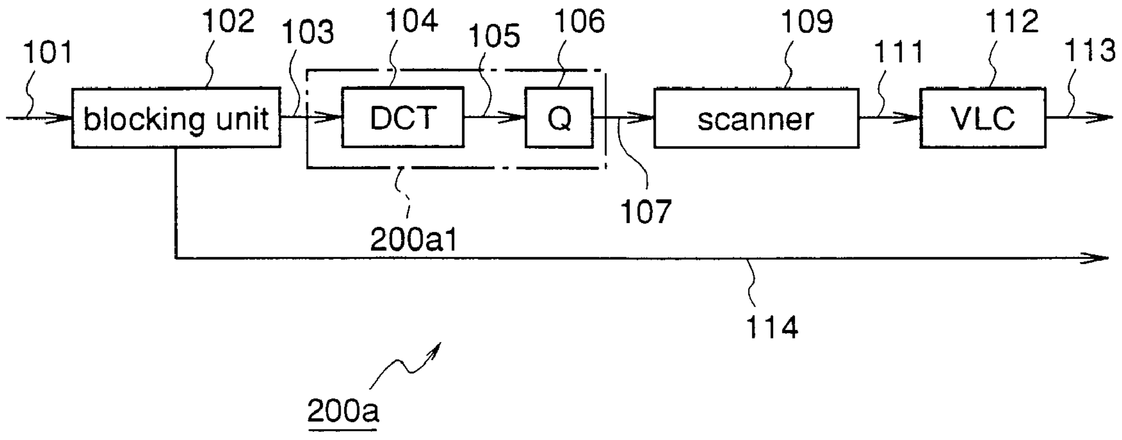
FIG. 26 is a block diagram illustrating a construction of an image coding apparatus as a conventional image processing apparatus.
Figure 27:
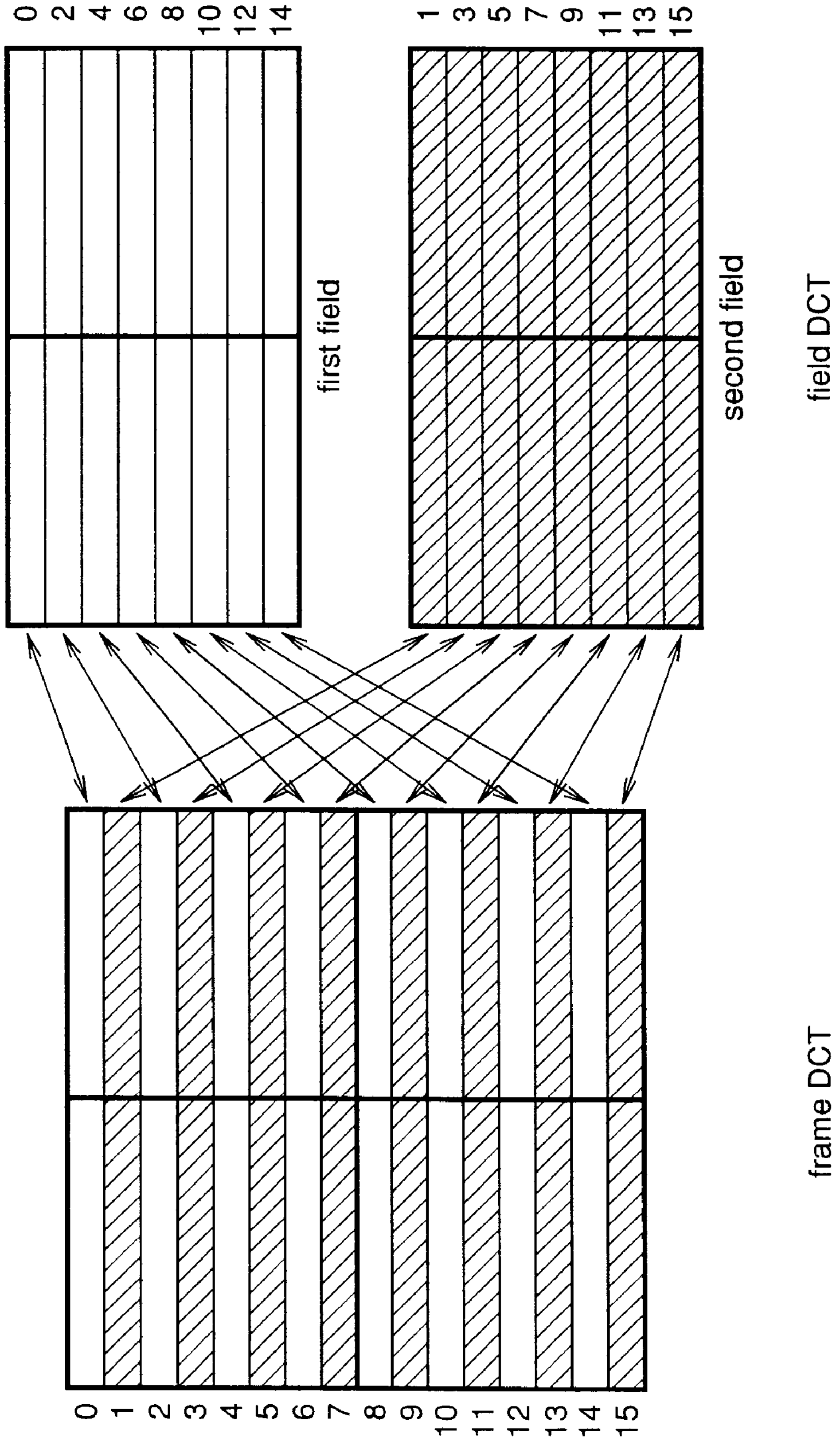
FIG. 27 is a diagram for explaining blocking of an image signal for each unit of DCT processing.

FIG. 1 is a block diagram illustrating a construction of an image processing apparatus according to a first embodiment of the present invention. In FIG. 1, reference numeral 100*a* designates the image processing apparatus (image coding apparatus) according to the first embodiment of the invention. This image coding apparatus 100*a* includes the construction. of the conventional image coding apparatus 200*a* shown in FIG. 26, and a circuit construction for performing adaptive scan changing processing in which a scan method is changed according to a DCT (discrete cosine transformation) type of a coding target block. Herein, the DCT type represents a signal indicating whether the coding target block has been subjected to frame DCT processing or field DCT processing.

That is, the image coding apparatus 100*a* according to the first embodiment of the invention has a scanning unit 100*a*1 for performing the above-mentioned adaptive scan changing processing, in place of the scanner 109 in the conventional image coding apparatus 200*a*, and the other construction of the image coding apparatus 100*a* is the same as the image coding apparatus 200*a*.

This scanning unit 100*a*1 consists of n pieces of scanners 109*s*1~109*sn* having different scan methods, i.e., each setting the different processing order to quantized values, a first switch 108*a* for selecting one of the scanners 109*s*1~109*sn* on the basis of a control signal 116 and supplying an output 107 of the quantization unit 106 to the selected scanner, a second switch 110*a* for selecting one of the scanners 109*s*1~109*sn* on the basis of the control signal 116 and supplying an output 111 of the selected scanner to the variable-length coding unit (hereinafter referred to as VLC unit) 112, and a scan control unit 115 for generating the control signal 116 on the basis of DCT type information 114 which is output from the blocking unit 102.

A description is given of the operation.

When an interlaced image signal 101 is input to the image coding apparatus 100*a*, the blocking unit 102 blocks the interlaced image signal 101 frame by frame or field by field, and outputs an image signal (plural pixel values) 103 corresponding to each block. Further, the blocking unit 102 outputs a DCT type signal 114 indicating a blocking unit of the image signal 103. The DCT unit 104 transforms the image signal 103 into DCT coefficients 105 by DCT, and outputs the DCT coefficients 105 corresponding to each block. The quantization unit 106 converts the DCT coefficients 105 into quantized values 107 by quantization.

At this time, the scan control unit 115 outputs a control signal 116 for controlling the switches 108*a* and 110*a*, according to the DCT type signal 114. In the scanning unit 100*a*1, one of the scanners 109*s*1~109*sn* is selected on the basis of the control signal 116, and the quantized values 107 are scanned by the selected scanner. Thereby, the processing order for coding is set to the quantized values 107. Then, the quantized values 111 to which the processing order has been set are output to the VLC unit 112. The VLC unit 112 performs variable-length coding to the quantized values 111 according to the set order, and outputs the coded quantized values as a bit stream 113.

Figure 2:
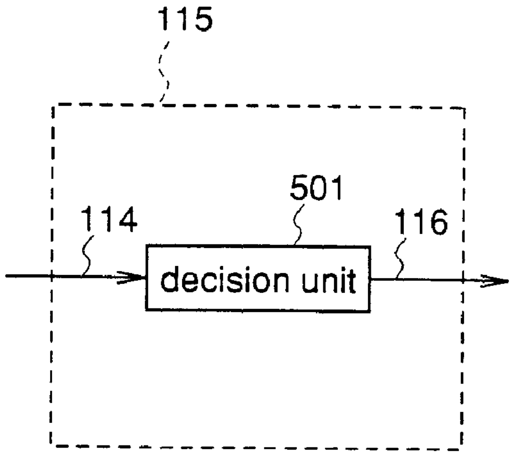
FIGS. 2(*a*)–2(*d*) are diagrams illustrating constructions of scan control units which are used in the first and third embodiments of the invention.
Figure 2:
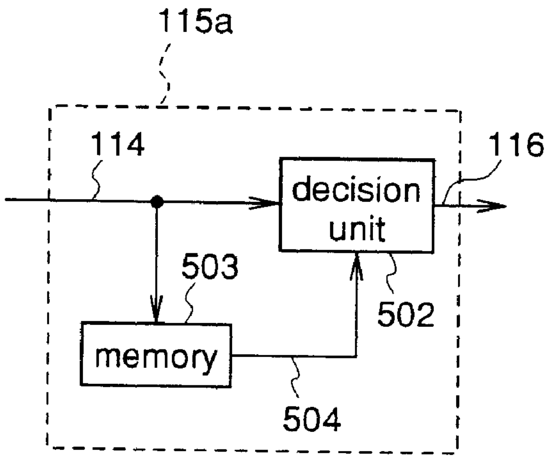
Figure 2:
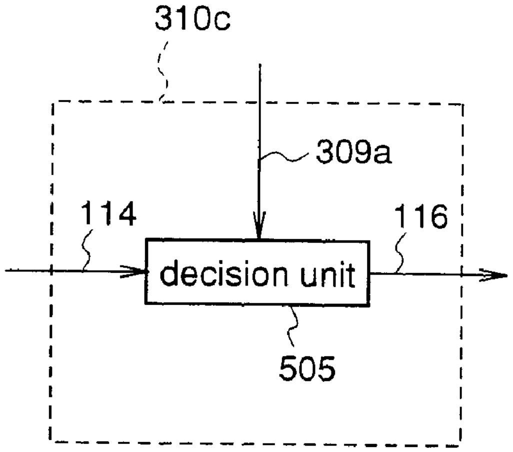
Figure 2:
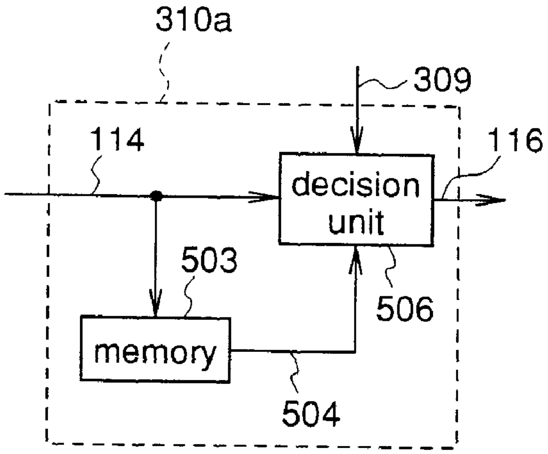

FIG. 2(*a*) shows a circuit construction of the scan control unit 115 in the image coding apparatus 100*a*.

In this case, the scan control unit 115 consists of a decision unit 501, which receives the DCT type signal 114 and outputs the control signal 116 to the switches 108*a* and 110*a* so that the switches select a scanner which is to perform a scan suitable for the DCT type of the coding target block.

Figure 3:
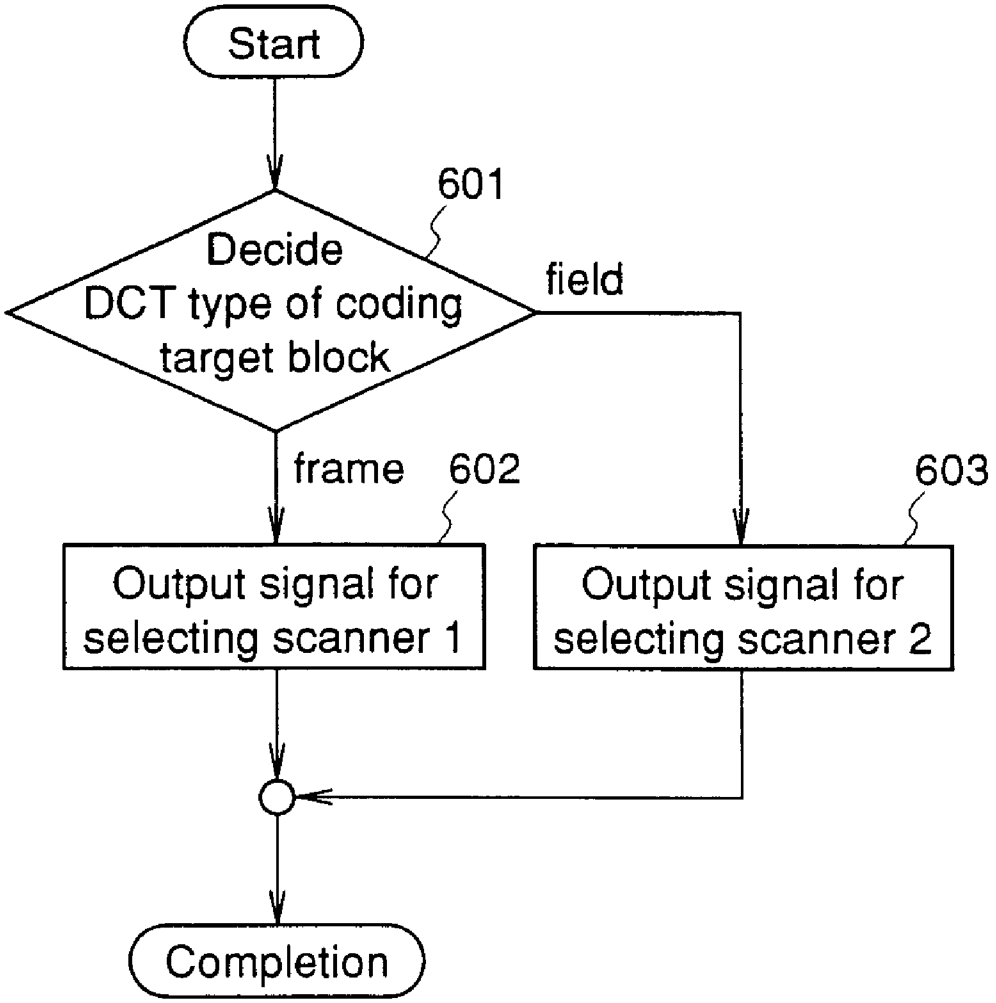
FIG. 3 is a flowchart showing a flow of an adaptive scan changing method according to any of the first and second embodiments of the invention.

A processing method by the decision unit 501 is described using a flowchart shown in FIG. 3.

In step 601, the decision unit 501 decides the DCT type of the coding target block on the basis of the DCT type signal 114. As the result of the decision, when the coding target block is a frame DCT block, the decision unit 501 outputs the control signal 116 for selecting the scanner 109*s*1 (1) (step 602). Meanwhile, when the coding target block is a field DCT block, the decision unit 501 outputs the control signal 116 for selecting the scanner 109*s*2 (2) (step 603).

The scanner (1) performs a scan for setting the processing order for coding quantized values, which scan is suitable for a frame DCT block. For example, a scan in the order shown in FIG. 31(*a*) is executed. The scanner (2) performs a scan which is suitable for a field DCT block. For example, a scan in the order shown in FIG. 31(*c*) is executed.

In the above-mentioned construction, a suitable scan is selected according to a DCT type of a coding target block. Therefore, in interlaced image coding in which frame DCT blocks and field DCT blocks coexist, a run length is increased, thereby improving coding efficiency.

In addition, although in the first embodiment of the invention, the construction of the scan control unit in FIG. 2(*a*) is described, a circuit construction shown in FIG. 2(*b*) may be employed.

A scan control unit 115*a* shown in FIG. 2(*b*) consists of a decision unit 502 and a memory 503 for storing DCT type signals of already coded blocks.

In this scan control unit 115*a*, the decision unit 502 selects a scan suitable for the coding target block on the basis of the DCT type signal 114 of the coding target block and a DCT type signal 504 of an already coded block, and outputs the control signal 116 to the switches 108*a* and 110*a* so that the selected scan is performed to the quantized values of the coding target block.

Figure 4:
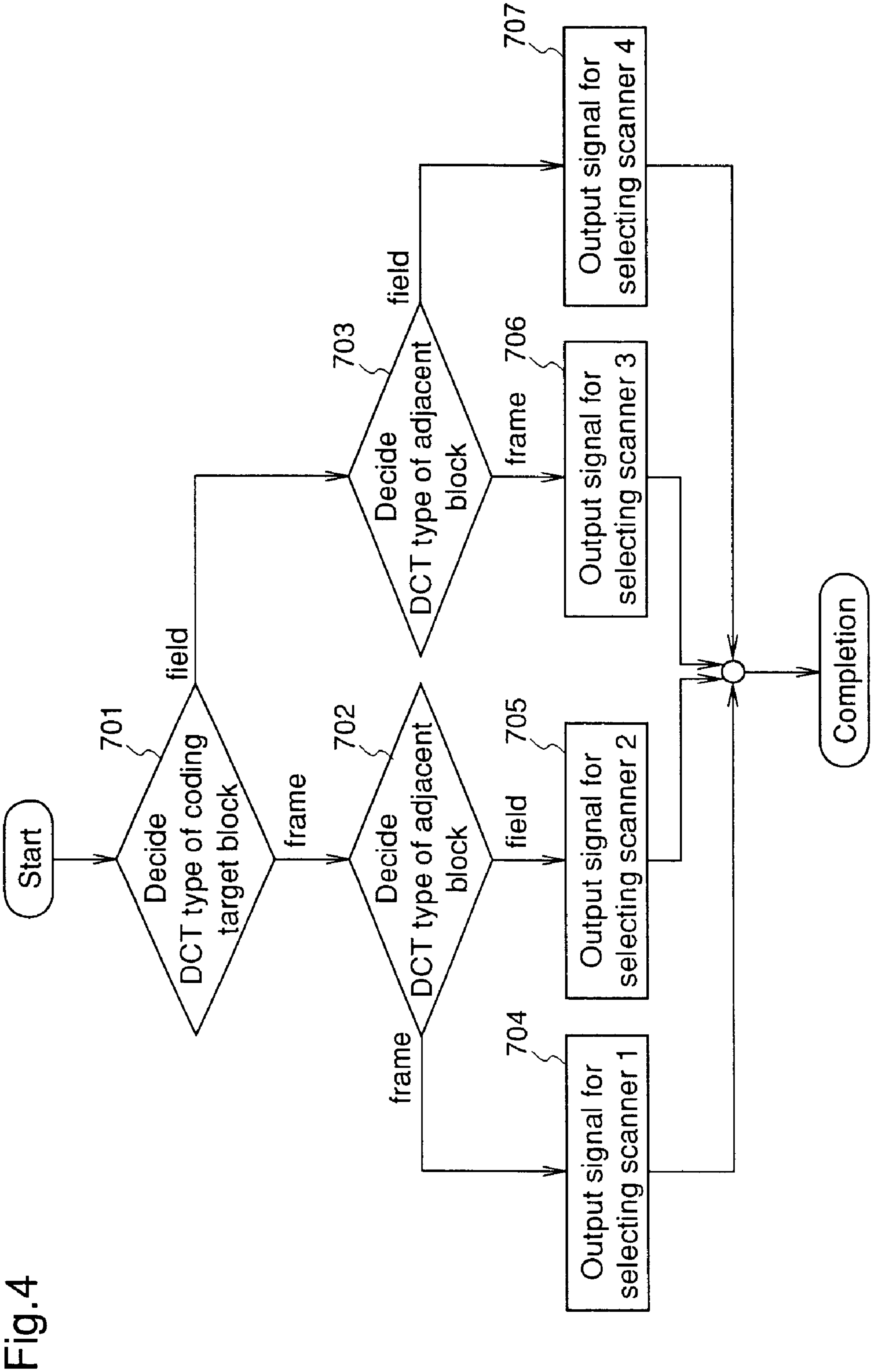
FIG. 4 is a flowchart showing a flow of another adaptive scan changing method according to any of the first and second embodiments of the invention.

A processing method by the decision unit 502 is described using a flowchart shown in FIG. 4.

In step 701, the decision unit 502 decides the DCT type of the coding target block on the basis of the DCT type signal 114. As the result of the decision, when the coding target block is a frame DCT block, the decision unit 502 decides a DCT type of an adjacent block which has been already coded, on the basis of the DCT type signal 504 of the already coded block (step 702). Meanwhile, when the coding target block is a field DCT block, the decision unit 502 decides a DCT type of an adjacent block which has been already coded, on the basis of the DCT type signal 504 of the already coded block (step 703).

As the result of the decision at step 702, when the already coded block is a frame DCT block, the decision unit 502 outputs the control signal 116 for selecting the scanner 109*s*1 (1) (step 704). On the other hand, when the already coded block is a field DCT block, the decision unit 502 outputs the control signal 116 for selecting the scanner 109*s*2 (2) (step 705).

As the result of the decision at step 703, when the already coded block is a frame DCT block, the decision unit 502 outputs the control signal 116 for selecting the scanner 109*s*3 (3) (step 706). On the other hand, when the already coded block is a field DCT block, the decision unit 502 outputs the control signal 116 for selecting the scanner 109*s*4 (4) (step 707).

In this way, by combining the DCT types of the coding target block and the adjacent block, four scans are respectively selected at steps 704, 705, 706 and 707.

More specifically, when both the coding target block and the adjacent block have been subjected to field DCT processing, it is thought that the image signal of the coding target block includes more high-frequency components. Therefore, a scan which gives a priority to quantized values corresponding to its high-frequency components is selected at step 704. When either the coding target block or the adjacent block has been subjected to field DCT processing, it is thought that the image signal of the coding target block includes slightly more high-frequency components. Therefore, scans which slightly give a priority to quantized values corresponding to its high-frequency components are selected at steps 705 and 706.

When both the coding target block and the adjacent block have been subjected to frame DCT processing, it is thought that the image signal of the coding target block includes fewer high-frequency components. Therefore, a scan which gives a priority to quantized values corresponding to low-frequency components is selected at step 707.

In the above-mentioned construction, both a DCT type of a coding target block and a DCT type of an adjacent block are used for decision. Accordingly, scanning processing is controlled more finely and a more suitable scan is selected, as compared with the case of the method shown in FIG. 3 (refer to FIG. 2(*a*)). Consequently, a run length is more increased, resulting in further improved coding efficiency.

In addition, although in the first embodiment of the invention, the adaptive scan operation is always performed in coding, the coding may be switched between the operation of carrying out the adaptive scan and the operation of carrying out no adaptive scan, according to prescribed control signals.

Figure 5:
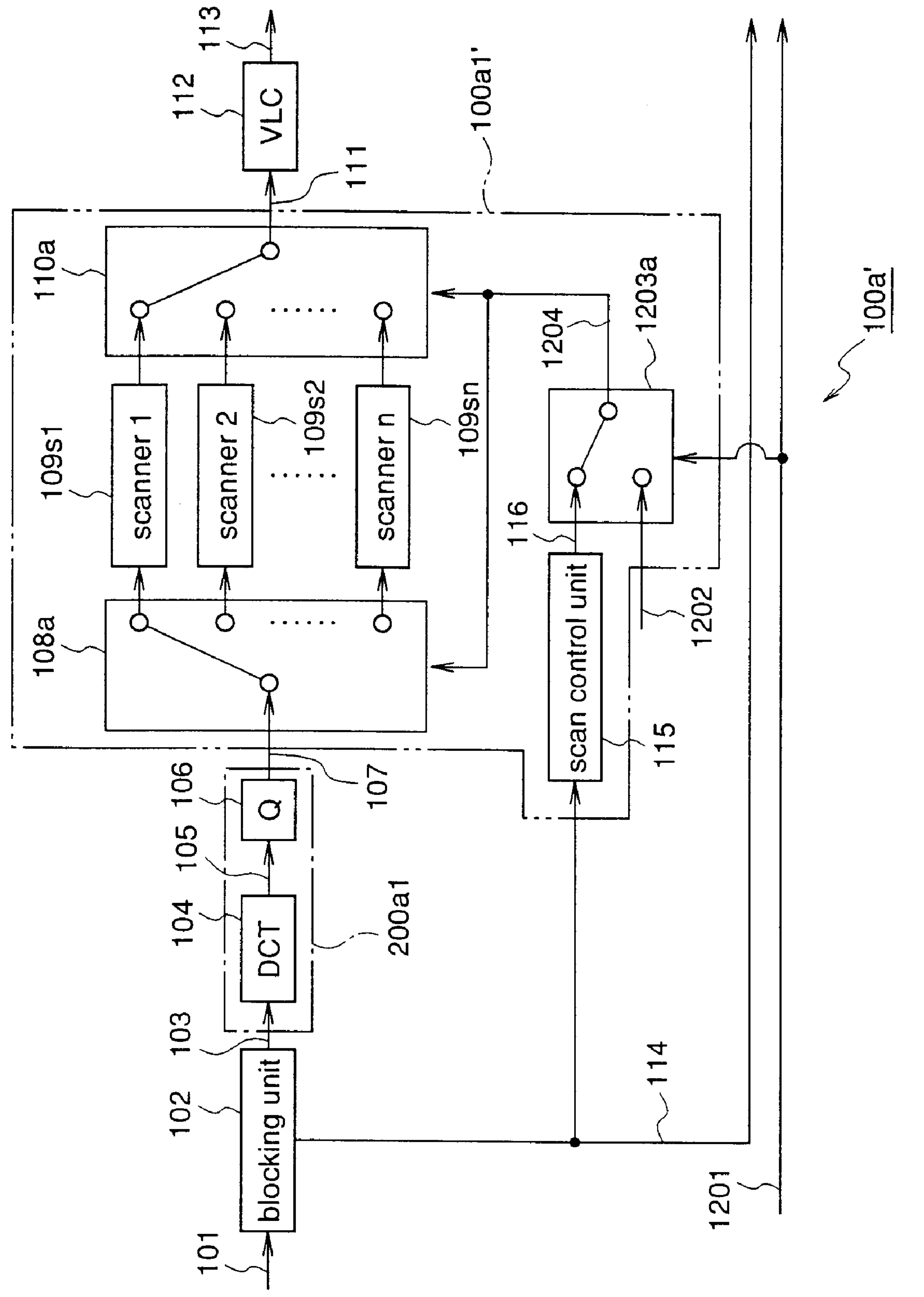
FIG. 5 is a block diagram illustrating a construction of an image coding apparatus as an image processing apparatus according to a modification of the first embodiment of the invention.

FIG. 5 is a block diagram illustrating an image coding apparatus according to a modification of the first embodiment of the invention. In FIG. 5, reference numeral 100*a*' designates the image coding apparatus according to the modification of the first embodiment. This image coding apparatus 100*a*' has a scanning unit 100*a*1' which performs switching between a scan mode for performing the adaptive scan operation and a scan mode for performing no adaptive scan operation according to a scan mode switching signal 1201, in place of the scanning unit 100*a*1 which always performs the adaptive scan operation, in the image coding apparatus 100*a* according to the first embodiment.

The scanning unit 100*a*1' includes the scanning unit 100*a*1 according to the first embodiment, and a mode switch 1203*a* which selects one of the control signal 116 from the scan control unit 115 and a preset scan selecting signal 1202 for selecting a specific one from among plural scanners, according to the scan mode switching signal 1201, and outputs the selected signal as a control signal 1204 for the switches 108*a* and 110*a*.

Herein, the scan mode switching signal 1201 is supplied, by manual operation, from the outside of the system (image coding apparatus). The scan selecting signal 1202 selects a specific scan suitable for an interlaced image, for example, a scan in the order shown in FIG. 31(*c*). In addition, the scan mode switching signal 1201 may be output according to the result which is obtained by monitoring the coding efficiency on the basis of the output 113 of the VLC unit 112.

In the construction according to the modification of the first embodiment, an adaptive scan is switched to OFF to execute a specific scan when required, whereby coding can be efficiently simplified.

In any of the first embodiment and its modification, a description is given of the image coding apparatus which performs switching between frame DCT processing and field DCT processing in coding of an interlaced image signal. However, the image coding apparatus may have a construction for performing, in coding a progressive image, switching between frame DCT and field DCT according to the content of the image.

In this case, in coding of a specific progressive image, in which switching between frame DCT and field DCT is performed according to the content of the image, the efficiency of variable-length coding can be improved.

[Embodiment 2]

Figure 6:
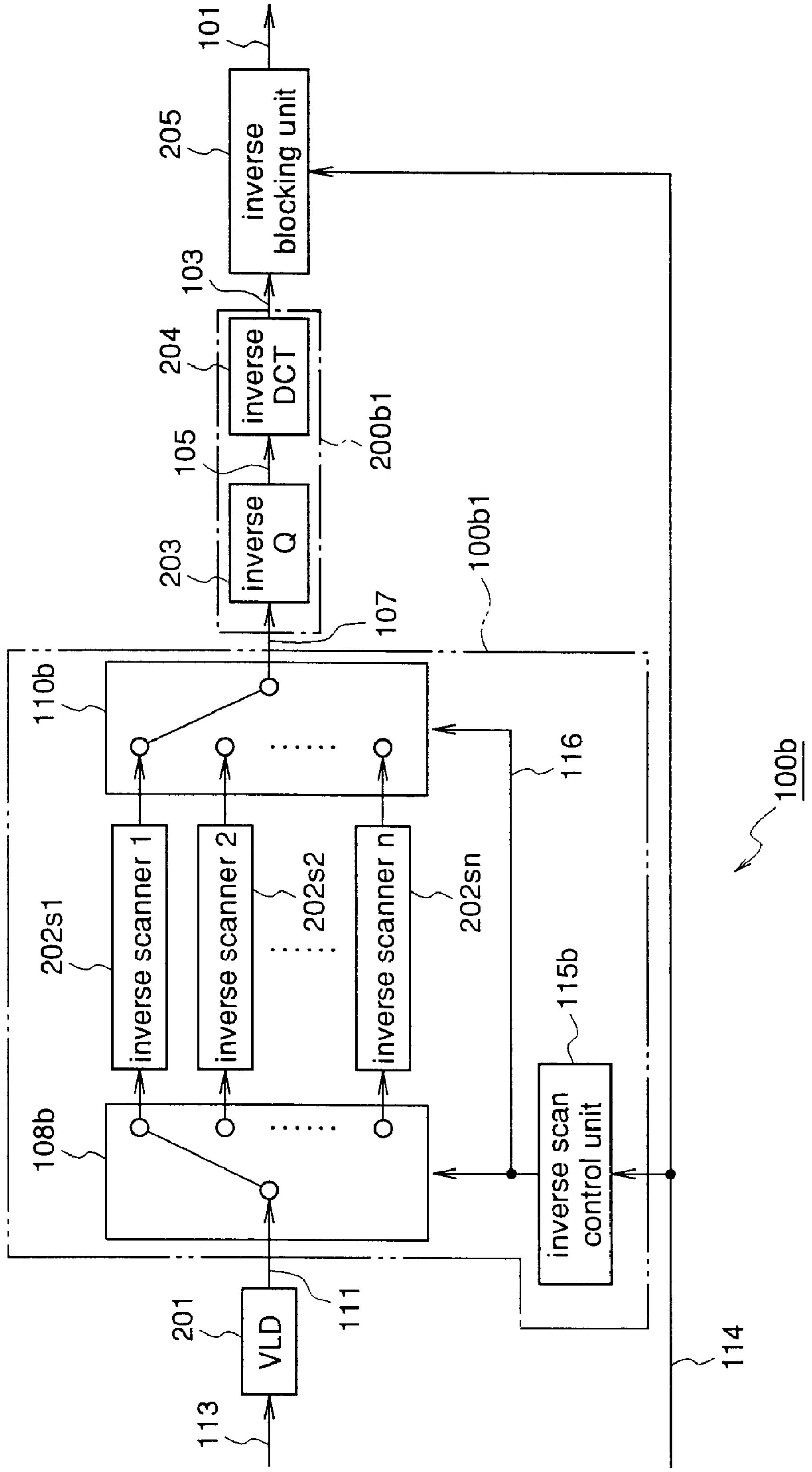
FIG. 6 is a block diagram illustrating a construction of an image decoding apparatus as an image processing apparatus in accordance with a second embodiment of the present invention.
Figure 28:
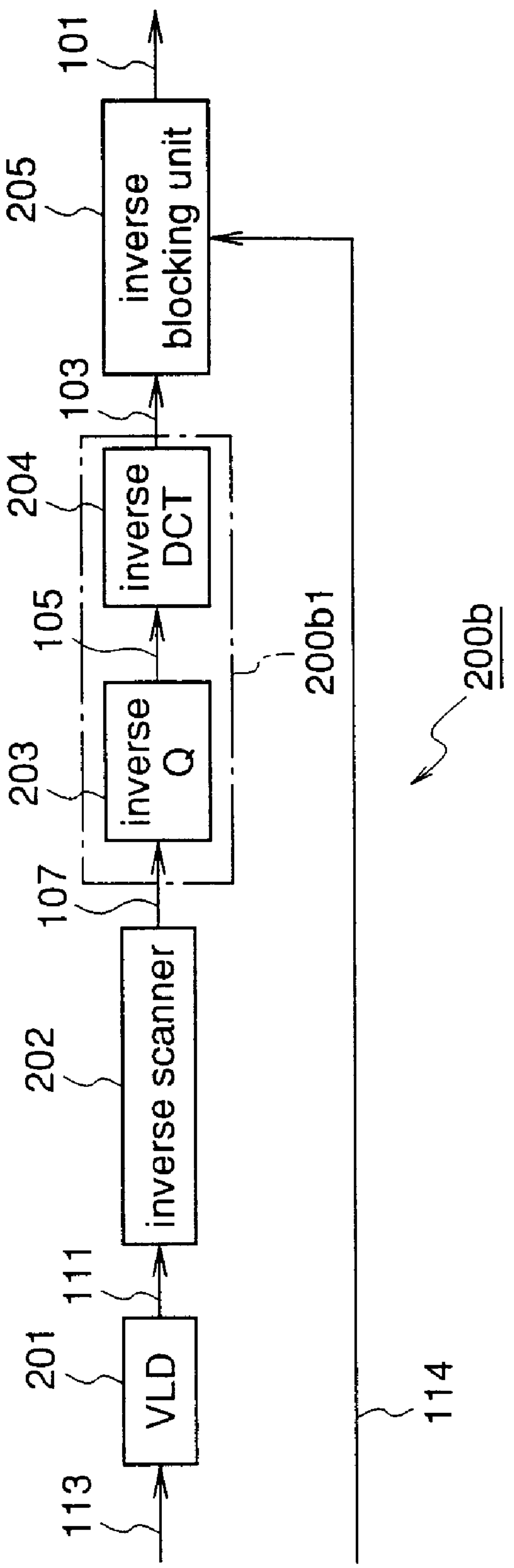
FIG. 28 is a block diagram illustrating a construction of an image decoding apparatus as a conventional image processing apparatus.

FIG. 6 is a block diagram illustrating a construction of an image processing apparatus according to a second embodiment of the present invention. In FIG. 6, reference numeral 100*b* designates the image processing apparatus (image decoding apparatus) according to the second embodiment of the invention. This image decoding apparatus 100*b* includes the construction of the conventional image decoding apparatus 200*b* shown in FIG. 28, and a circuit construction for performing adaptive inverse scan changing processing in which an inverse scan method is changed according to a DCT type of a decoding target block. Herein, the DCT type represents a signal indicating whether a coded block corresponding to the decoding target block has been subjected to frame DCT processing or field DCT processing.

That is, the image decoding apparatus 100*b* according to the second embodiment of the invention has an inverse scanning unit 100*b*1 for performing the above-mentioned adaptive inverse scan changing processing, in place of the inverse scanner 202 in the conventional image decoding apparatus 200*b*, and the other construction of the image decoding apparatus 100*b* is the same as the image decoding apparatus 200*b*.

This inverse scanning unit 100*b*1 consists of n pieces of inverse scanners 202*s*1~202*sn* having different inverse scan methods, i.e., each performing different rearrangement for returning quantized values which have been rearranged to the original order, a first switch 108*b* for selecting one of the inverse scanners 202*s*1~202*sn* on the basis of a control signal 116 and supplying an output 111 of the variable-length decoding unit (hereinafter referred to as VLD unit) 201 to the selected inverse scanner, a second switch 110*b* for selecting one of the inverse scanners 202*s*1~202*sn* on the basis of the control signal 116 and supplying an output 107 of the selected inverse scanner to the inverse quantization unit 203, and an inverse scan control unit 115*b* for generating the control signal 116 on the basis of the DCT type information 114 which is output from the blocking unit 102 in the image coding apparatus 100*a*.

A description is given of the operation.

When a bit stream 113 output from the image coding apparatus 100*a* is input to the image decoding apparatus 110*b*, the VLD unit 201 performs variable-length decoding to the bit stream 113 to convert the bit stream 113 into quantized values 111, and outputs the quantized values 111. At this time, the inverse scan control unit 115*b* outputs a control signal 116 for selecting an inverse scanner to the switches 108*b* and 110*b*, on the basis of a DCT type signal 114 from the image coding apparatus 100*a*.

The quantized values 111 are inverse-scanned by the inverse scanner which is selected on the basis of the control signal 116, thereby outputting quantized values 107 in the order before rearrangement in coding. Then, the inverse quantization unit 203 inverse-quantizes the quantized values 107, and outputs DCT coefficients 105 corresponding to a decoding target block. The inverse DCT unit 204 transforms the DCT coefficients 105 into an image signal (plural pixel values) 103 corresponding to the decoding target block by inverse DCT. The inverse blocking unit 205 inverse-blocks the image signals 103 according to the DCT type signal 114, thereby outputting an image signal 101 corresponding to a single display screen.

In the image decoding apparatus 100*b* thus constructed, decoding using an adaptive inverse scan changing method is performed. Therefore, in variable-length decoding of DCT coefficients of a progressive image or an interlaced image, accurate and efficient decoding can be carried out to a bit stream which has been coded using the adaptive scan changing method according to the first embodiment, thereby regenerating an image signal.

In addition, in the second embodiment of the invention, an inverse scanner is selected on the basis of a DCT type signal of a decoding target block. As described in the first embodiment, however, an inverse scanner may be selected on the basis of both a DCT type signal of a decoding target block and a DCT type signal of an already decoded block adjacent to the decoding target block.

Although in the second embodiment of the invention, the adaptive inverse scan operation is always performed in decoding, the decoding may be switched between the operation of carrying out the adaptive inverse scan and the operation of carrying out no adaptive inverse scan, according to prescribed control signals.

Figure 7:
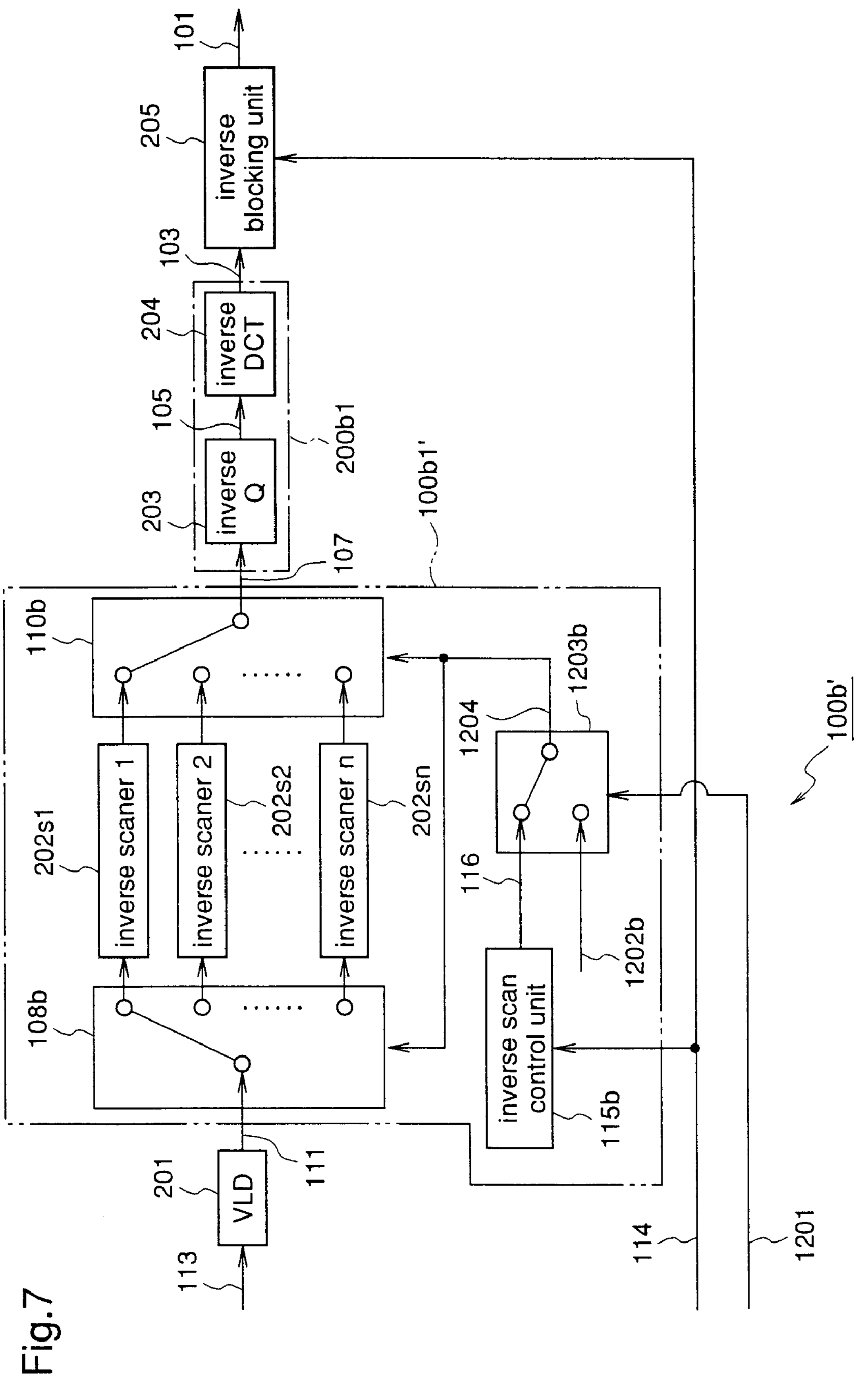
FIG. 7 is a block diagram illustrating a construction of an image decoding apparatus as an image processing apparatus according to a modification of the second embodiment of the invention.

FIG. 7 is a block diagram illustrating an image decoding apparatus according to a modification of the second embodiment of the invention. In FIG. 7, reference numeral 100*b*' designates the image decoding apparatus according to the modification of the second embodiment. This image decoding apparatus 100*b*' has an inverse scanning unit 100*b*1' which performs switching between a scan mode for performing the adaptive inverse scan operation and a scan mode for performing no adaptive inverse scan operation according to a scan mode switching signal 1201, in place of the inverse scanning unit 100*b*1 which always performs the adaptive inverse scan operation in decoding, in the image decoding apparatus 100*b* according to the second embodiment.

The inverse scanning unit 100*b*1' includes the inverse scanning unit 100*b*1 according to the second embodiment, and a mode switch 1203*b* which selects one of the control signal 116 from the inverse scan control unit 115*b* and a preset inverse scan selecting signal 1202*b* for selecting a specific one from among plural inverse scanners, according to the scan mode switching signal 1201, and outputs the selected signal as a control signal 1204 for the switches 108*b* and 110*b*.

Herein, like the scan selecting signal 1202 in the image coding apparatus 100*a*', the inverse scan selecting signal 1202*b* selects a specific inverse scan suitable for an interlaced image, for example, an inverse scan corresponding to a scan shown in FIG. 31(*c*).

In the construction according to the modification of the second embodiment, in decoding, an adaptive inverse scan is switched to OFF to execute a specific inverse scan when required. Therefore, when an adaptive scan is switched to OFF to execute a specific scan in the image coding apparatus, a coded image signal can be accurately decoded.

In any of the second embodiment and its modification, a description is given of the image decoding apparatus corresponding to the image coding apparatus which performs switching between frame DCT processing and field DCT processing in coding of an interlaced image signal. However, the image decoding apparatus may have a construction corresponding to an image coding apparatus which performs, in coding a-progressive image, switching between frame DCT and field DCT according to the content of the image.

In this case, a coded image signal obtained by coding of a specific progressive image, in which switching between frame DCT and field DCT is performed according to the content of the image, can be accurately decoded.

[Embodiment 3]

Figure 8:
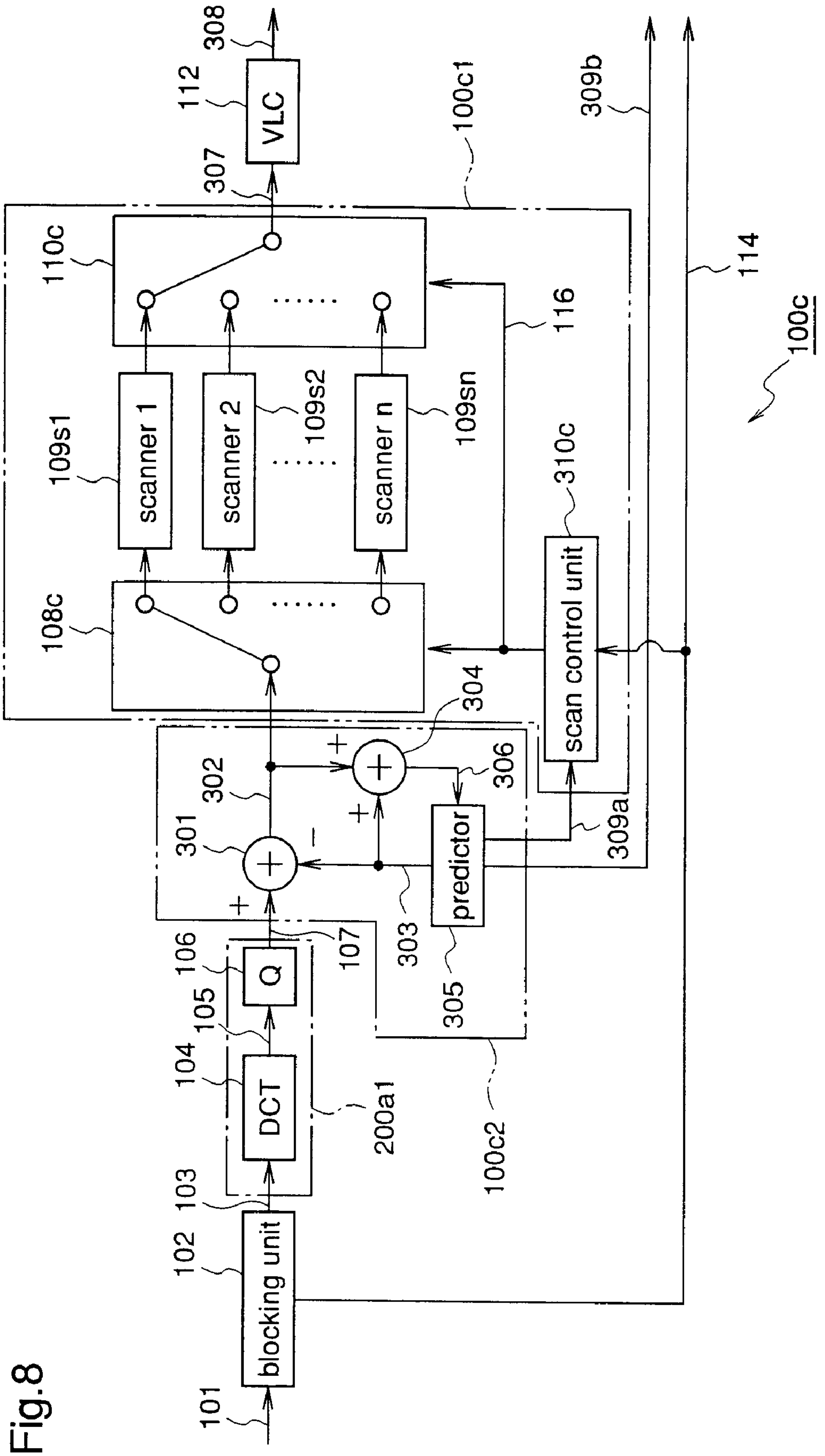
FIG. 8 is a block diagram illustrating a construction of an image coding apparatus as an image processing apparatus in accordance with a third embodiment of the present invention.

FIG. 8 is a block diagram illustrating a construction of an image processing apparatus according to a third embodiment of the present invention. In FIG. 8, reference numeral 100*c* designates the image processing apparatus (image coding apparatus) according to the third embodiment of the invention. This image coding apparatus 100*c* has a scan control unit 310*c* for generating a control signal 116 on the basis of both first prediction information (a first parameter concerning intra-frame prediction) 309*a* and DCT type information 114 of a coding target block, in place of the scan control unit 1401*c* in the conventional image coding apparatus 200*c* shown in FIG. 29.

Herein, as in the conventional image coding apparatus 200*c*, the first parameter 309*a* concerning intra-frame prediction includes ON/OFF information and prediction direction information of AC prediction, and second prediction information (a second parameter) 309*b* includes only ON/OFF information of AC prediction.

As mentioned above, unlike the first prediction information 309*a* used for scan control in the image coding apparatus, the second prediction information 309*b* transmitted to the decoding side includes no prediction direction information. Accordingly, even when a prediction method is changed, it is not required to change the content of the second prediction information 309*b* to be output to the decoding side, thereby easily dealing with the changed prediction method. However, the second prediction information 309*b* may include not only the ON/OFF information of AC prediction but the prediction direction information, like the first prediction information 309*a*.

That is, the image coding apparatus 100*c* according to the third embodiment of the invention is different from the image coding apparatus according to the first embodiment, in that a prediction unit 100*c*2 for performing intra-frame prediction is added, and that the first parameter 309*a* concerning intra-frame prediction is used for scan control and the second parameter 309*b* is output to the decoding side.

In addition, in the image coding apparatus 100*c*, switches 108*c* and 110*c* and n pieces of scanners 109*s*1~109*sn* of a scanning unit 100*c*1 have the same constructions as those of the scanning unit 100*a*1 according to the. first embodiment, which are shown in FIG. 1.

A description is given of the operation. The same operation as in the image coding apparatus 100*a* according to the first embodiment is not described.

The predictor 305 generates predicted values of quantized values 107 of a coding target block from quantized values 306 of an already coded block, and outputs these predicted values 303. Further, the predictor 305 outputs first and second parameters 309*a* and 309*b* concerning generation of the predicted values 303. Then, the adder 301 performs subtraction of the predicted values 303 from the quantized values 107, and outputs resulting difference values 302. The scan control unit 310*c* outputs a control signal 116 to the switches 108*c* and 110*c*, according to a DCT type signal 114 and the first parameter 309*a*. One of the scanners 109*s*1~109*sn* is selected on the basis of the control signal 116, and the difference values 302 are scanned by the selected scanner, thereby outputting difference values 307. The VLC unit 112 performs variable-length coding to the difference values 307, and outputs a resulting bit stream 308. In addition, the adder 304 performs adding of the predicted values 303 to the difference values 302, and outputs the result of the addition as quantized values 306 of an already coded block.

FIG. 2(*c*) shows a circuit construction of the scan control unit 310*c*.

In FIG. 2(*c*), the scan control unit 310*c* consists of a decision unit 505, which receives the DCT type signal 114 and the first parameter 309*a* concerning intra-frame prediction and outputs the control signal 116 to the switches 108*c* and 110*c* so that the switches select a scanner suitable for the DCT type of the coding target block and a scan by the selected scanner is performed to the quantized DCT coefficients.

Figure 9:
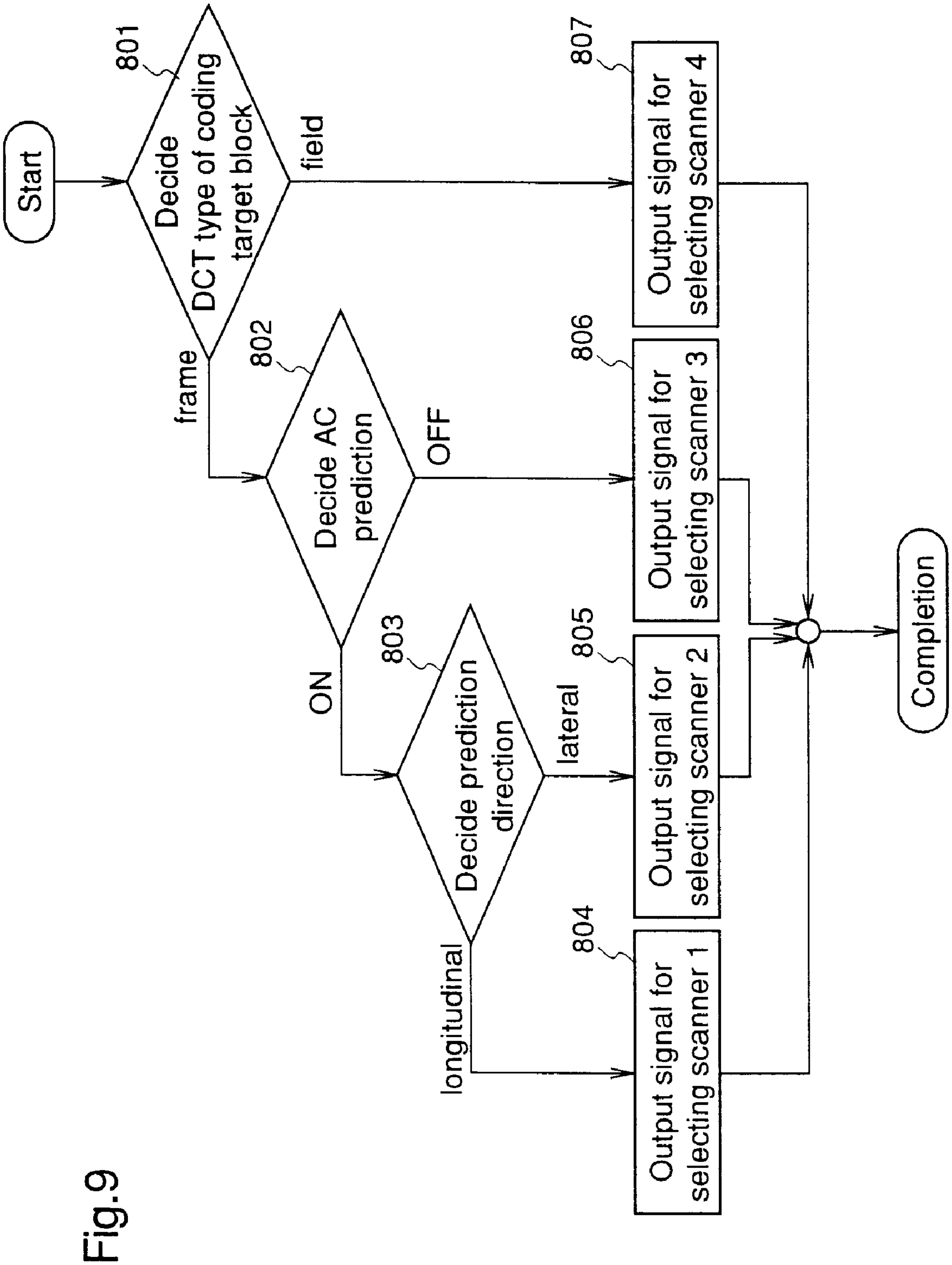
FIG. 9 is a flowchart showing a flow of an adaptive scan changing method according to any of the third and fourth embodiments of the invention.

A processing method by the decision unit 505 is described using a flowchart shown in FIG. 9.

In step 801, the decision unit 505 decides the DCT type of the coding target block on the basis of the DCT type signal 114. As the result of the decision, when the coding target block is a field DCT block, the decision unit 505 outputs the control signal 116 for selecting the scanner (4) (step 807).

Meanwhile, when the coding target block is a frame DCT block, ON/OFF decision of AC prediction is executed in step 802. As the result of the decision at step 802, when the AC prediction is in the OFF state, the decision unit 505 outputs the control signal 116 for selecting the scanner (3) (step 806).

When the AC prediction is in the ON state, decision of a reference direction for prediction is executed in step 803. As the result of the decision at step 803, when the reference direction is horizontal, the decision unit 505 outputs the control signal 116 for selecting the scanner (2) (step 805). When the reference direction is vertical, the decision unit 505 outputs the control signal 116 for selecting the scanner (1) (step 804).

The scanner (1) performs a scan suitable for a frame DCT block when vertical prediction is performed. For example, a scan in the order shown in FIG. 31(*b*) applies to the scan by the scanner (1). The scanner (2) performs a scan suitable for a frame DCT block when horizontal prediction is performed. For example, a scan in the order shown in FIG. 31(*c*) applies to the scan by the scanner (2). The scanner (3) performs a scan suitable for a frame DCT block when AC prediction is not performed. For example, a scan in the order shown in FIG. 31(*a*) applies to the scan by the scanner (3). The scanner (4) performs a scan suitable for a field DCT block. For example, a scan in the order shown in FIG. 31(*c*) applies to the scan by the scanner (4).

In the above-mentioned construction according to the third embodiment of the invention, a suitable scan is selected according to not only a first parameter concerning intra-frame prediction, i.e., ON/OFF information and reference direction information of AC prediction, but a DCT type of a coding target block. Therefore, in interlaced image coding in which frame DCT blocks and field DCT blocks coexist, a run length is increased, thereby improving coding efficiency.

In addition, although in the third embodiment of the invention, the construction of the scan control unit in FIG. 2(*c*) is described, a circuit construction shown in FIG. 2(*d*) may be employed.

A scan control unit 310*a* shown in FIG. 2(*d*) consists of a decision unit 506 and a memory 503 for storing DCT type signals of already coded blocks.

In this scan control unit 310*a*, a DCT type signal 504 of an already coded block is stored in the memory 503. The decision unit 506 selects a scanner suitable for the coding target block on the basis of the DCT type signal 114 of the coding target block, the DCT type signal 504 of the already coded block, and the first parameter 309*a* concerning intra-frame prediction, and outputs the control signal 116 to the switches 108*c* and 110*c* so that a scan by the selected scanner is performed to the output of the prediction unit.

Figure 10:
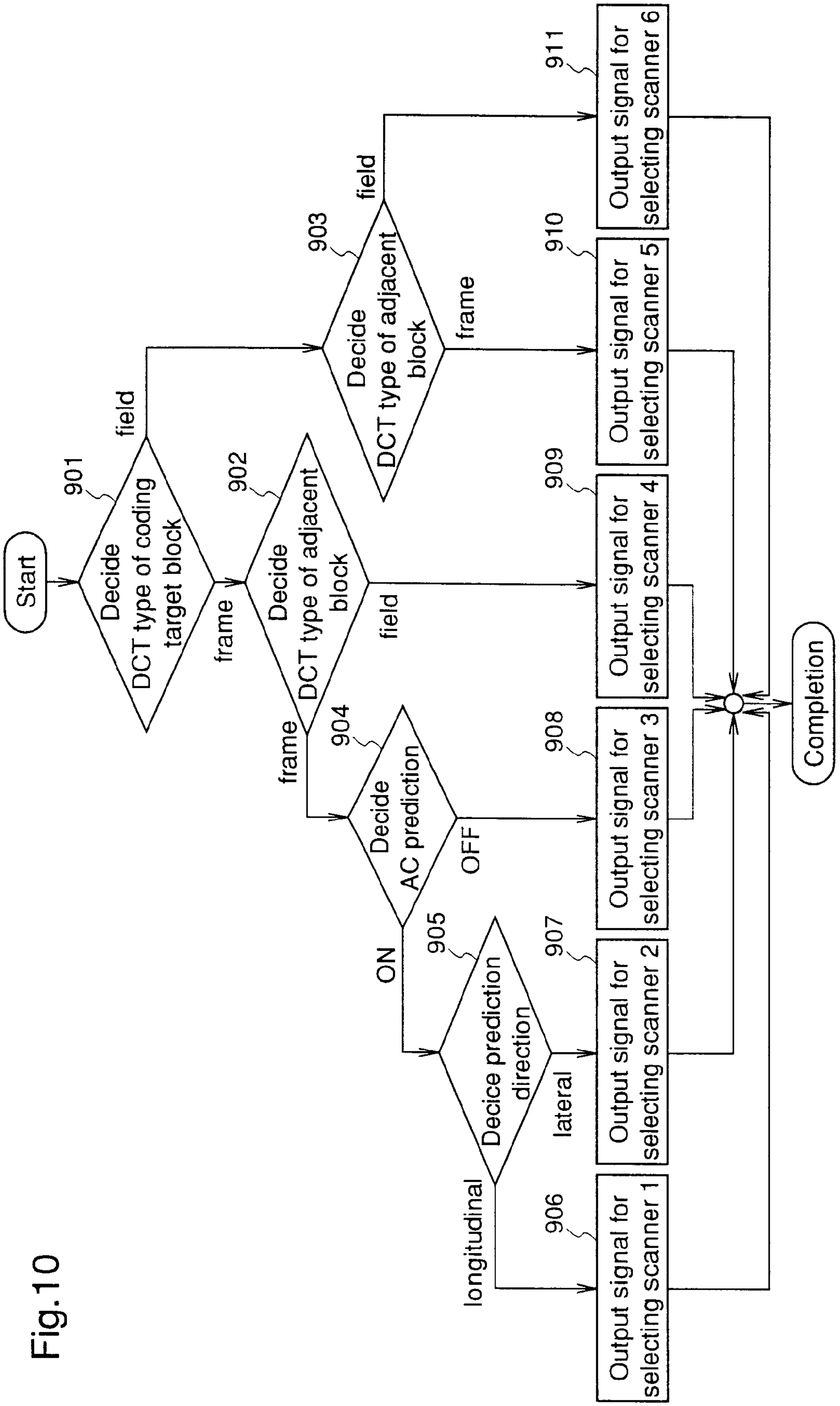
FIG. 10 is a flowchart showing a flow of another adaptive scan changing method according to any of the third and fourth embodiments of the invention.

A processing method by the decision unit 506 is described using a flowchart shown in FIG. 10. This processing method comprises a combination of the methods shown in FIGS. 4 and 9.

In step 901, the decision unit 506 decides the DCT type of the coding target block on the basis of the DCT type signal 114. As the result of the decision, when the coding target block is a field DCT block, the decision unit 506 decides a DCT type of an adjacent block which has been already coded, on the basis of the DCT type signal 504 of the adjacent block (step 903). As the result of the decision at step 903, when the adjacent block is a field DCT block, the decision unit 506 outputs the control signal 116 for selecting the scanner (6) (step 911).

On the other hand, when the adjacent block is a frame DCT block, the decision unit 506 outputs the control signal 116 for selecting the scanner (5) (step 910).

As the result of the decision at step 901, when the coding target block is a frame DCT block, the decision unit 506 decides a DCT type of an adjacent block which has been already coded, on the basis of the DCT type signal 504 of the adjacent block (step 902).

As the result of the decision at step 902, when the already coded block is a field DCT block, the decision unit 506 outputs the control signal 116 for selecting the scanner (4) (step 909). Meanwhile, when the already coded block is a frame DCT block, ON/OFF decision of AC prediction is executed in step 904. As the result of the decision at step 904, when the AC prediction is in the OFF state, the decision unit 506 outputs the control signal 116 for selecting the scanner (3) (step 908).

When the AC prediction is in the ON state, decision of a reference direction for prediction is executed in step 905. As the result of the decision at step 905, when the reference direction is horizontal, the decision unit 506 outputs the control signal 116 for selecting the scanner (2) (step 907). When the reference direction is vertical, the decision unit 506 outputs the control signal 116 for selecting the scanner (1) (step 906).

In the above-mentioned construction, a suitable scan is selected according to not only a first parameter concerning intra-frame prediction and a DCT type of a coding target block but a DCT type of an adjacent block. Accordingly, scanning processing is controlled more finely and a more suitable scan is selected, as compared with the case of the scan control method by the scan control unit shown in FIG. 2(*c*). Consequently, a run length is more increased, resulting in further improved coding efficiency.

In addition, although in the third embodiment of the invention, the adaptive scan operation is always performed in coding, the coding may be switched between the operation of carrying out the adaptive scan and the operation of carrying out no adaptive scan, according to prescribed control signals.

Figure 11:
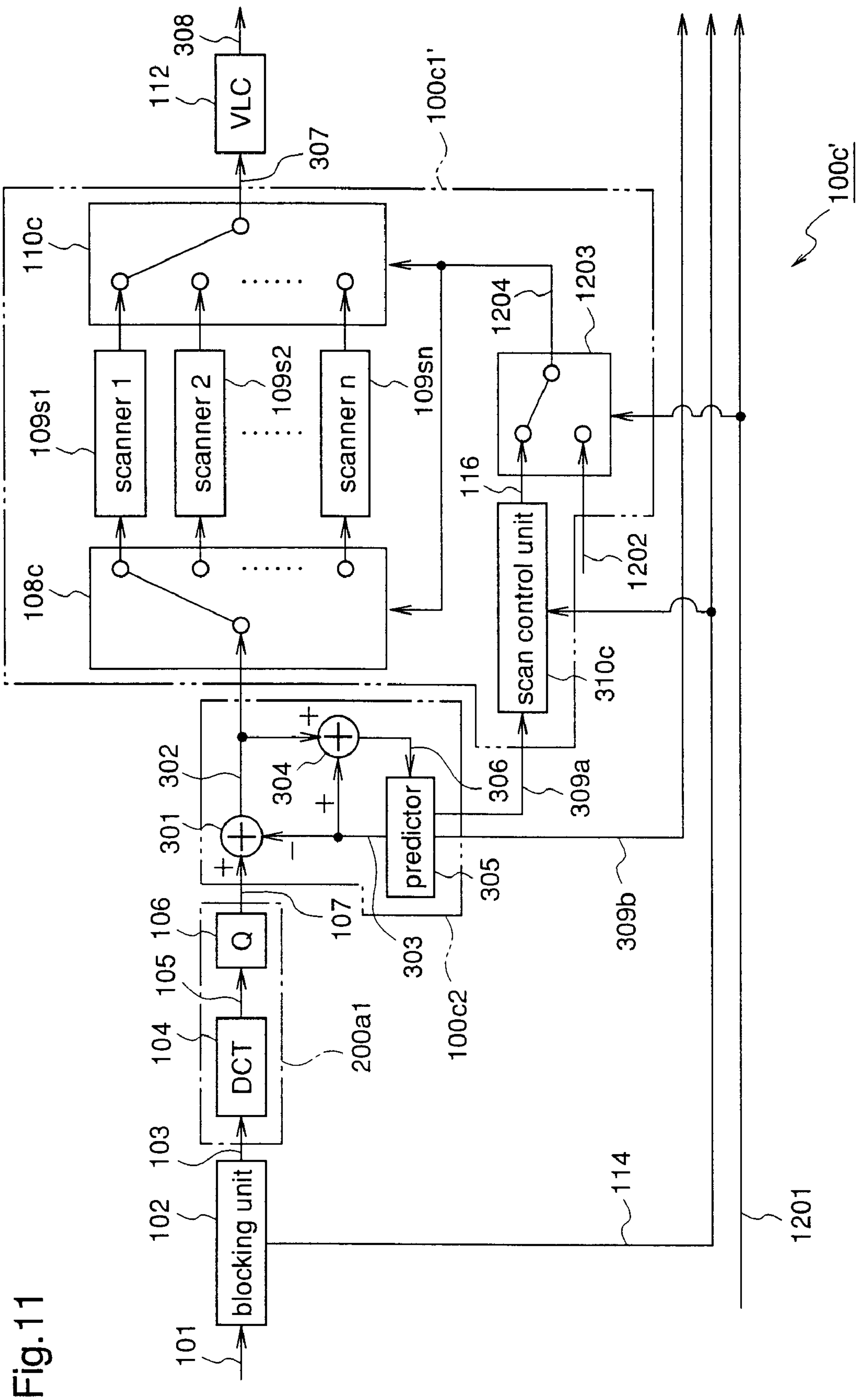
FIG. 11 is a block diagram illustrating a construction of an image-coding apparatus as an image processing apparatus according to a modification of the third embodiment of the invention.

FIG. 11 is a block diagram illustrating an image coding apparatus according to a modification of the third embodiment of the invention. In FIG. 11, reference numeral 100*c*' designates the image coding apparatus according to the modification of the third embodiment. This image coding apparatus 100*c*' has a scanning unit 100*c*1' which performs switching between a scan mode for performing the adaptive scan operation and a scan mode for performing no adaptive scan operation according to a scan mode switching signal 1201, in place of the scanning unit 100*c*1 which always performs the adaptive scan operation, in the image coding apparatus 100*c* according to the third embodiment.

The scanning unit 100*c*1' includes the scanning unit 100*c*1 according to the third embodiment, and a mode switch 1203 which selects one of the control signal 116 from the scan control unit 310*c* and a preset scan selecting signal 1202 for selecting a specific one from among plural scanners, according to the scan mode switching signal 1201, and outputs the selected signal as a control signal 1204 for the switches 108*c* and 110*c*.

Herein, the scan mode switching signal 1201 is supplied, by manual operation, from the outside of the system (image coding apparatus). The scan selecting signal 1202 selects a specific scan suitable for an interlaced image, for example, a scan in the order shown in FIG. 31(*c*). In addition, the scan mode switching signal 1201 may be output according to the result which is obtained by monitoring the coding efficiency on the basis of the output 308 of the VLC unit 112.

In the construction according to the modification of the third embodiment, an adaptive scan is switched to OFF to execute a specific scan when required, whereby coding can be efficiently simplified.

In any of the third embodiment and its modification, a description is given of the image coding apparatus which performs switching between frame DCT processing and field DCT processing in coding of an interlaced image signal. However, the image coding apparatus may have a construction for performing, in coding a progressive image, switching between frame DCT and field DCT according to the content of the image.

In this case, in coding of a specific progressive image, in which switching between frame DCT and field DCT is performed according to the content of the image, the efficiency of variable-length coding can be improved.

[Embodiment 4]

Figure 12:
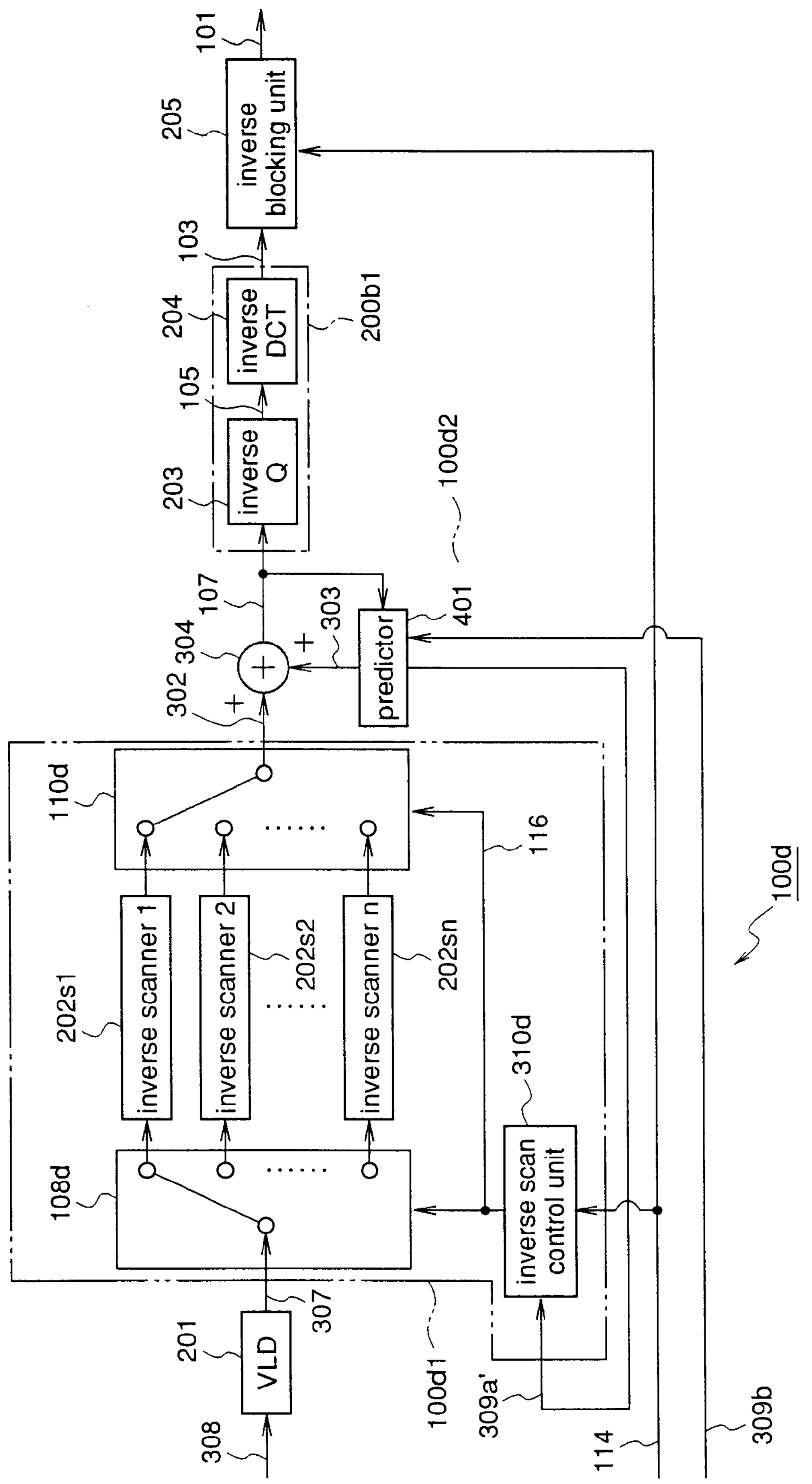
FIG. 12 is a block diagram illustrating a construction of an image decoding apparatus as an image processing apparatus in accordance with a fourth embodiment of the present invention.

FIG. 12 is a block diagram illustrating a construction of an image processing apparatus according to a fourth embodiment of the present invention. In FIG. 12, reference numeral 100*d* designates the image processing apparatus (image decoding apparatus) according to the fourth embodiment of the invention. This image decoding apparatus 100*d* has an inverse scan control unit 310*d* for generating a control signal 116 on the basis of both control prediction information 309*a*' corresponding to first prediction information (a first parameter concerning intra-frame prediction) 309*a* and DCT type information 114 of a decoding target block, in place of the inverse scan control unit 1401*d* in the conventional image decoding apparatus 200*d* shown in FIG. 32.

That is, the image decoding apparatus 100*d* according to the fourth embodiment of the invention is different from the image decoding apparatus 100*b* according to the second embodiment, in that a prediction unit 100*d*2 for performing intra-frame prediction is added, and that the control prediction information 309*a*' corresponding to the first parameter 309*a* concerning intra-frame prediction is used for inverse scan control.

In addition, in the image decoding apparatus 10*d,* switches 108*d* and 110*d* and n pieces.of inverse scanners 202*s*1~202*sn* of an inverse scanning unit 100*d*1 have the same constructions as those according to the second embodiment, which are shown in FIG. 6.

A description is given of the operation.

When a bit stream 308 output from the image coding apparatus 100*c* is input to the image decoding apparatus 100*d,* the VLD unit 201 performs variable-length decoding to the bit stream 308 to convert the bit stream 308 into difference values 307, and outputs the difference values 307. At this time, the inverse scan control unit 310*d* outputs a control signal 116 for selecting an inverse scanner to the switches 108*d* and 110*d,* on the basis of a DCT type signal 114 from the image coding apparatus 100*c* and control prediction information 309*a*' from the prediction unit 100*d*2.

The difference values 307 are inverse-scanned by the inverse scanner which is selected on the basis of the control signal 116, thereby outputting difference values 302 in the order before rearrangement in coding. Then, the prediction unit 100*d*2 converts the difference values 302 into corresponding quantized values 107. The inverse quantization unit 203 inverse-quantizes the quantized values 107, and outputs DCT coefficients 105. The inverse DCT unit 204 transforms the DCT coefficients 105 into an image signal (plural pixel values) 103 by inverse DCT. The inverse blocking unit 205 inverse-blocks the image signals 103 according to the DCT type signal 114, thereby outputting an interlaced image signal 101 corresponding to a single display screen.

In the image decoding apparatus 100*d* thus constructed, decoding is performed using an adaptive inverse scan changing method according to not only control prediction information which is generated on the basis of second prediction information from the image coding apparatus 100*c* but DCT type information of a decoding target block. Therefore, in variable-length decoding of DCT coefficients of a progressive image or an interlaced image, accurate and efficient decoding can be carried out to a bit stream which has been coded using the adaptive scan changing method according to the third embodiment, thereby regenerating an image signal.

In addition, in the fourth embodiment of the invention, an inverse scanner is selected on the basis of a DCT type signal of a decoding target block. As described in the third embodiment, however, an inverse scanner may be selected on the basis of both a DCT type signal of a decoding target block and a DCT type signal of an already decoded block adjacent to the decoding target block.

Although in the fourth embodiment of the invention, the adaptive inverse scan operation is always performed in decoding, the decoding may be switched between the operation of carrying out the adaptive inverse scan and the operation of carrying out no adaptive inverse scan, according to prescribed control signals.

Figure 13:
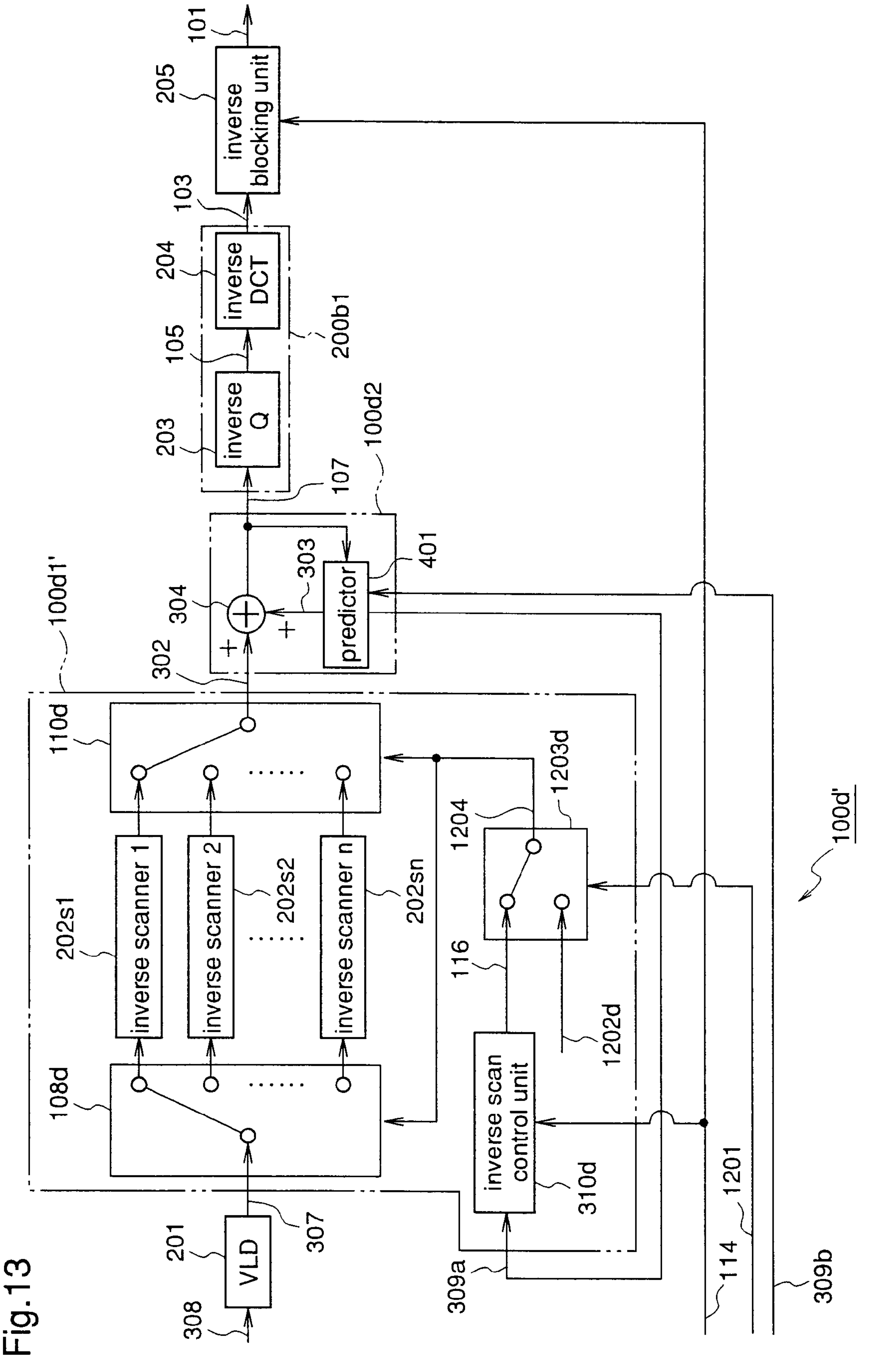
FIG. 13 is a block diagram illustrating a construction of an image decoding apparatus as an image processing apparatus according to a modification of the fourth embodiment of the invention.

FIG. 13 is a block diagram illustrating an image decoding apparatus according to a modification of the fourth embodiment of the invention. In FIG. 13, reference numeral 100*d*' designates the image decoding apparatus according to the modification of the fourth embodiment. This image decoding apparatus 100*d*' has an inverse scanning unit 100*d*1' which performs switching between a scan mode for performing the adaptive inverse scan operation and a scan mode for performing no adaptive inverse scan operation according to a scan mode switching signal 1201, in place of the inverse scanning unit 100*d*1 which always performs the adaptive inverse scan operation in decoding, in the image decoding apparatus 100*d* according to the fourth embodiment.

The inverse scanning unit 100*d*1' includes the inverse scanning unit 100*d*1 according to the fourth embodiment, and a mode switch 1203*d* which selects one of the control signal 116 from the inverse scan control unit 310*d* and a preset inverse scan selecting signal 1202*d* for selecting a specific one from among plural inverse scanners, according to the scan mode switching signal 1201, and outputs the selected signal as a control signal 1204 for the switches 108*d* and 110*d.*

Herein, like the scan selecting signal 1202 in the image coding apparatus 100*c*', the inverse scan selecting signal 1202*d* selects a specific inverse scan suitable for an interlaced image, for example, an inverse scan corresponding to a scan shown in FIG. 31(*c*).

In the construction according to the modification of the fourth embodiment, in decoding, an adaptive inverse scan is switched to OFF to execute a specific inverse scan when required. Therefore, when an adaptive scan is switched to OFF to execute a specific scan in the image coding apparatus, a coded image signal can be accurately decoded.

In any of the fourth embodiment and its modification, a description is given of the image decoding apparatus corresponding to the image coding apparatus which performs switching between frame DCT processing and field DCT processing in coding of an interlaced image signal. However, the image decoding apparatus may have a construction corresponding to an image coding apparatus which performs, in coding a progressive image, switching between frame DCT and field DCT according to the content of the image.

In this case, a coded image signal obtained by coding of a specific progressive image, in which switching-between frame DCT and field DCT is performed according to the content of the image, can be accurately decoded.

[Embodiment 5]

Figure 14:
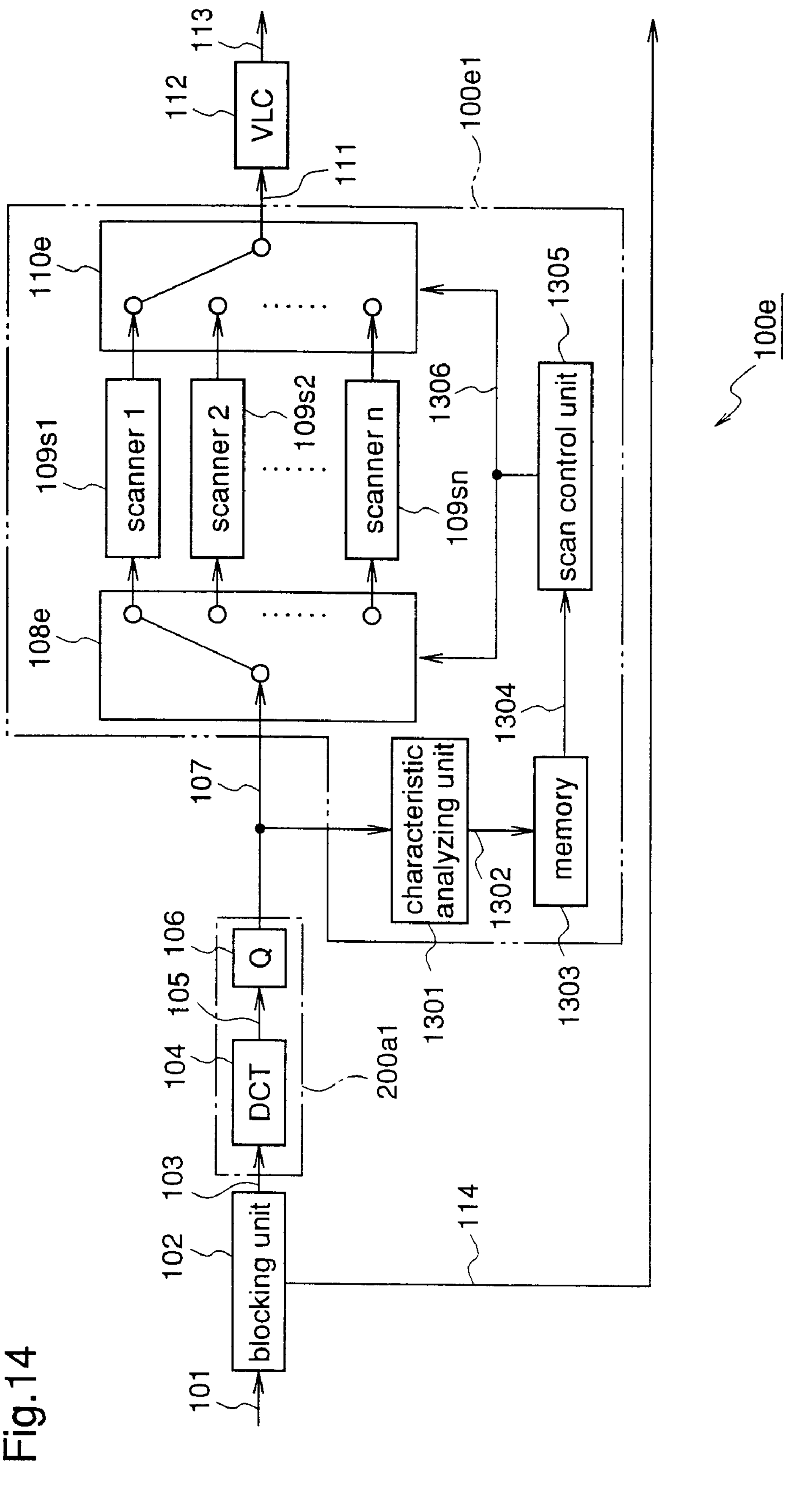
FIG. 14 is a block diagram illustrating a construction of an image coding apparatus as an image processing apparatus in accordance with a fifth embodiment of the present invention.

FIG. 14 is a block diagram illustrating a construction of an image processing apparatus according to a fifth embodiment of the present invention. In FIG. 14, reference numeral 100*e* designates the image processing apparatus (image coding apparatus) according to the fifth embodiment of the invention. This image coding apparatus 100*e* includes the construction of the conventional image coding apparatus 200*a* shown in FIG. 26, and a circuit construction for performing adaptive scan changing processing in which a scan method for a coding target block is changed according to the optimum scan method for at least one already coded block which is positioned in the vicinity of the coding target block.

That is, the image coding apparatus 100*e* according to the fifth embodiment of the invention has a scanning unit 100*e*1 for performing the above-mentioned adaptive scan changing processing, in place of the scanner 109 in the conventional image coding apparatus 200*a,* and the other construction of the image coding apparatus 100*e* is the same as the image coding apparatus 200*a*.

This scanning unit 100*e*1 consists of n pieces of scanners 109*s*1~109*sn* having different scan methods, i.e., each setting the different processing order to quantized values, a first switch 108*e* for selecting one of the scanners 109*s*1~109*sn* on the basis of a control signal 1306 and supplying an output 107 of the quantization unit 106 to the selected scanner, and a second switch 110*e* for selecting one of the scanners 109*s*1~109*sn* on the basis of the control signal 1306 and supplying an output 111 of the selected scanner to the variable-length coding unit (hereinafter referred to as VLC unit) 112.

The scanning unit 100*e*1 further consists of a characteristic analyzing unit 1301 for deciding the optimum scan (the processing order for coding) for the output 107 of the quantization unit 106, a memory 1303 for storing the decision result as information 1302 indicating the optimum scan, and a scan control unit 1305 for controlling the switches 108*e* and 110*e* according to the control signal 1306 so that the optimum scan is performed to quantized values of a coding target block on the basis of information stored in the memory 1303, i.e., information 1304 about the optimum scans for already coded blocks.

A description is given of the operation.

When an interlaced image signal 101 is input to the image coding apparatus 100*e,* the blocking unit 102 blocks the interlaced image signal 101 frame by frame or field by field, and outputs an image signal (plural pixel values) 103 corresponding to each block. Further, the blocking unit 102 outputs a DCT type signal 114 indicating a blocking unit of the image signal 103. The DCT unit 104 transforms the image signal 103 into DCT coefficients 105 by DCT, and outputs the DCT coefficients 105 corresponding to each block. The quantization unit 106 converts the DCT coefficients 105 into quantized values 107 by quantization.

At this time, the characteristic analyzing unit 1301 decides the optimum scan for the quantized values 107 of the coding target block, and outputs information 1302 indicating the optimum scan to the memory 1303. The scan control unit 1305 outputs a control signal 1306 for controlling the switches 108*e* and 110*e,* according to information 1304 about the optimum scans of already coded blocks which are stored in the memory 1303. Then, one of the scanners 109*s*1~109*sn* is selected on the basis of the control signal 1306, and the quantized values 107 are scanned by the selected scanner. Thereby, the processing order for coding is set to the quantized values 107. The quantized values 111 to which the processing order has been set are output to the VLC unit 112. The VLC unit 112 performs variable-length coding to the quantized values 111 according to the set order, and outputs a resulting bit stream 113.

Figure 15:
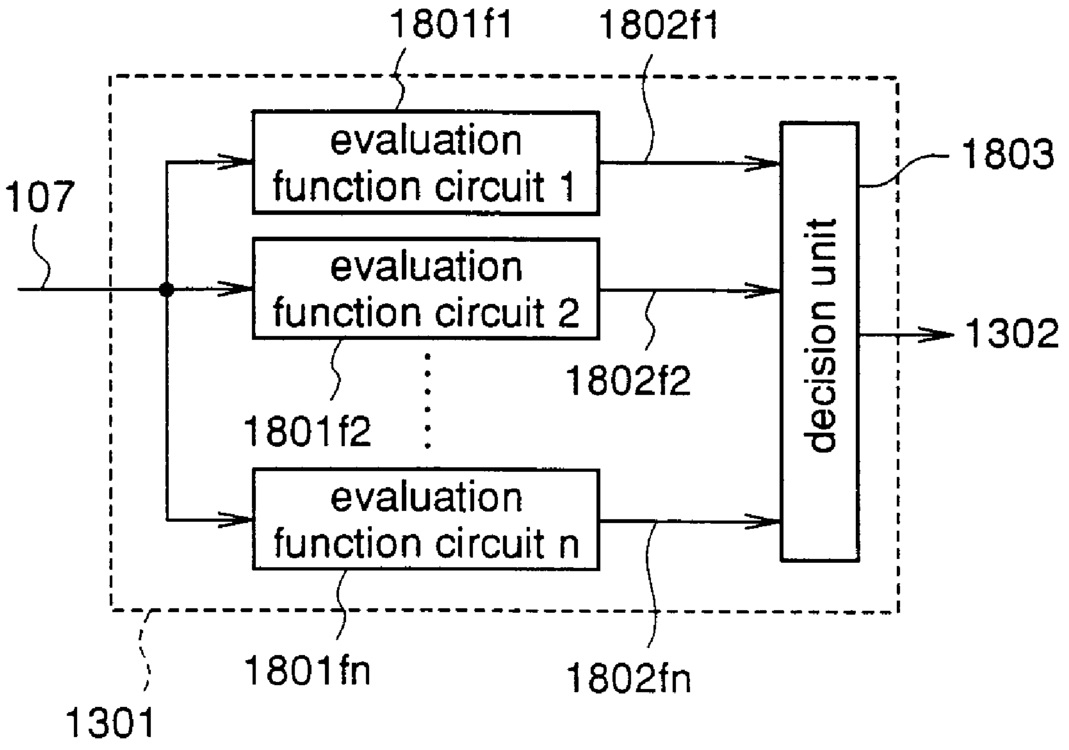
FIG. 15 is a diagram illustrating a construction of a characteristic analyzing unit which is used in any of the fifth and sixth embodiments of the invention.

FIG. 15 shows a detailed circuit construction of the characteristic analyzing unit 1301 in the image coding apparatus 100*e.*

As shown in FIG. 15, the characteristic analyzing unit 1301 consists of n pieces of evaluation function circuits 1801*f*1~1801*fn* respectively having n pieces of evaluation functions corresponding to the scanning orders of the scanners 109*s*1~109*sn* and outputting evaluation values 1802*f*1~1802*fn* when the quantized values 107 are scanned by the respective scanners 109*s*1~109*sn,* and a decision unit 1803 which performs decision on the basis of the outputs of the evaluation function circuits 1801*f*1~1801*fn.* Herein, the decision unit 1803 compares the evaluation values 1802*f*1~1802*fn* with each other, decides the scan having the highest evaluation as the optimum scan for the quantized values 107, and outputs the information 1302 indicating the optimum scan. In other words, the decision unit 1803 decides a distribution of the DCT coefficients (frequency transformation) corresponding to each block which are obtained in the information source coding unit 200*a*1, on the basis of the evaluation values output from the evaluation function circuits 1801*f*1~1801*fn,* and outputs the information 1302 indicating the optimum scan on the basis of the result of the decision.

In addition, in each of the above-mentioned evaluation functions, the sum of plural (for example, 10) DCT coefficients which are selected in the scanning order of the corresponding scanner is used as the evaluation value. However, any function may be employed as long as an evaluation value of the function is higher as a corresponding scan produces higher variable-length coding efficiency.

Figure 16:
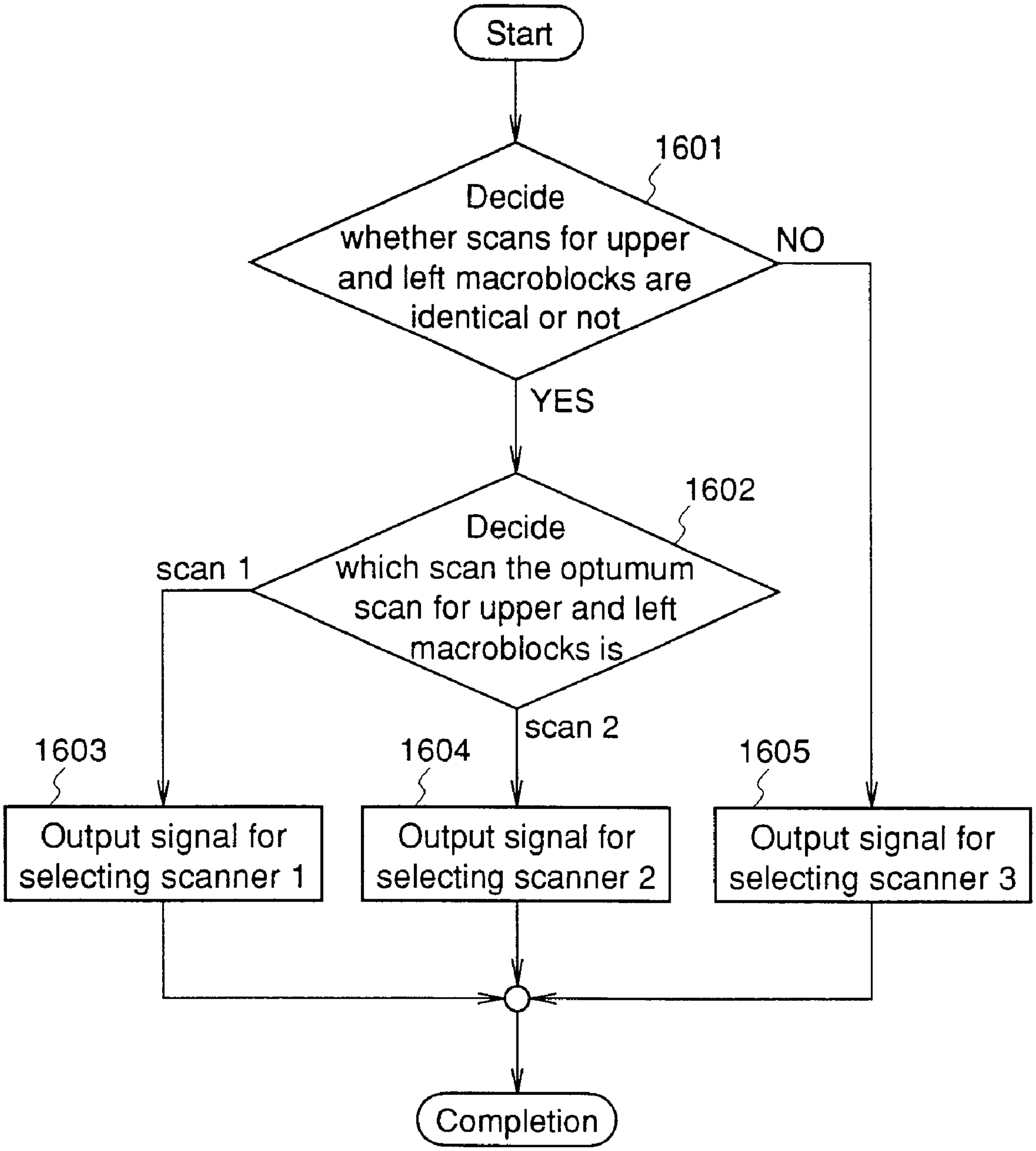
FIG. 16 is a flowchart showing a flow of an adaptive scan changing method according to any of the fifth and sixth embodiments of the invention.

A processing method by the scan control unit 1305 is described using a flowchart shown in FIG. 16.

In step 1601, the scan control unit 1305 decides whether the optimum scans for an upper macroblock just above the coding target block and for a left macroblock on the left side of the coding target block are identical or not, on the basis of the information 1304 about the optimum scans of the already coded blocks which are stored in the memory 1303. As the result of the decision, when the optimum scan for the upper macroblock and that for the left macroblock are different, the scan control unit 1305 outputs the control signal 1306 for selecting the scanner 109*s*3 (3) (step 1605).

Meanwhile, when the optimum scan for the upper macroblock and that for the left macroblock are identical, the scan control unit 1305 decides which of the scans (1)~(n) the optimum scan for the upper and left macroblocks is (step 1602). When the optimum scan for the upper and left macroblocks is the scan (1), the scan control unit 1305 outputs the control signal 1306 for selecting the scanner 109*s*1 (1) (step 1603). When the optimum scan for the upper and left macroblocks is the scan (2), the scan control unit 1305 outputs the control signal 1306 for selecting the scanner 109*s*2 (2) (step 1604).

In the above-mentioned construction, a suitable scan is selected according to the optimum scans for already coded blocks in the vicinity of a coding target block. Therefore, in interlaced image coding in which frame DCT blocks and field DCT blocks coexist, a run length is increased, thereby improving coding efficiency.

In addition, although in the fifth embodiment of the invention, the adaptive scan operation is always performed in coding, the coding may be switched between the operation of carrying out the adaptive scan and the operation of carrying out no adaptive scan, according to prescribed control signals.

Figure 17:
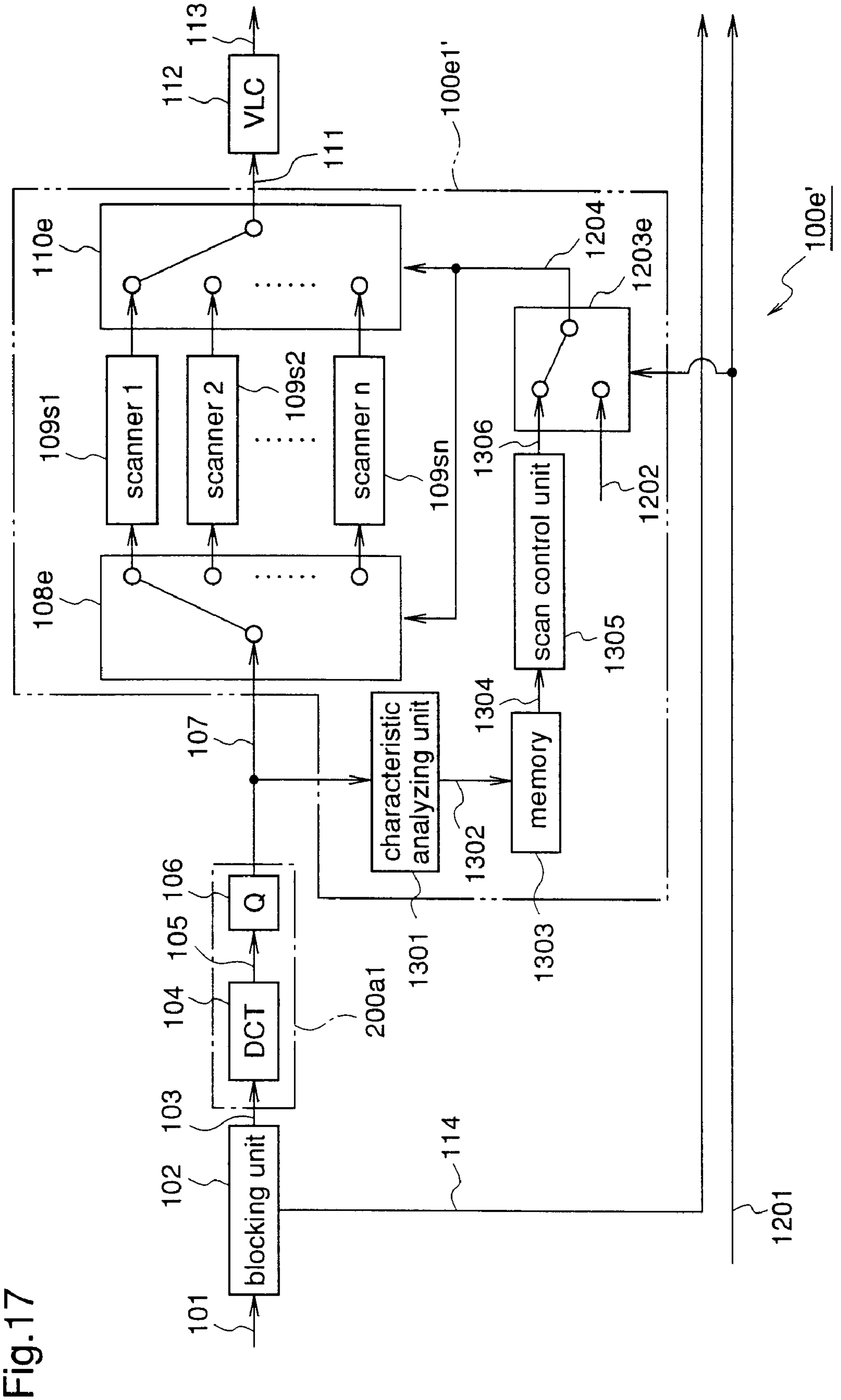
FIG. 17 is a block diagram illustrating a construction of an image coding apparatus as an image processing apparatus according to a modification of the fifth embodiment of the invention.

FIG. 17 is a block diagram illustrating an image coding apparatus according to a modification of the fifth embodiment of the invention. In FIG. 17, reference numeral 100*e*' designates the image coding apparatus according to the modification of the fifth embodiment. This image coding apparatus 100*e*' has a scanning unit 100*e*1' which performs switching between a scan mode for performing the adaptive scan operation and a scan mode for performing no adaptive scan operation according to a scan mode switching signal 1201, in place of the scanning unit 100*e*1 which always performs the adaptive scan operation, in the image coding apparatus 100*e* according to the fifth embodiment.

The scanning unit 100*e*1' includes the scanning unit 100*e*1 according to the fifth embodiment, and a mode switch 1203*e* which selects one of the control signal 116 from the scan control unit 1305 and a preset scan selecting signal 1202 for selecting a specific one from among plural scanners, according to the scan mode switching signal 1201, and outputs the selected signal as a control signal 1204 for the switches 108*e* and 110*e*.

Herein, the scan mode switching signal 1201 is supplied, by manual operation, from the outside of the system (image coding apparatus). The scan selecting signal 1202 selects a specific scan suitable for an interlaced image, for example, a scan in the order shown in FIG. 31(*c*). In addition, the scan mode switching signal 1201 may be output according to the result which is obtained by monitoring the coding efficiency on the basis of the output 113 of the VLC unit 112.

In the construction according to the modification of the fifth embodiment, an adaptive scan is switched to OFF to execute a specific scan when required, whereby coding can be efficiently simplified.

In any of the fifth embodiment and its modification, a description is given of the image coding apparatus which performs switching between frame DCT processing and field DCT processing in coding of an interlaced image signal. However, the image coding apparatus may have a construction for performing, in coding a progressive image, switching between frame DCT and field DCT according to the content of the image.

In this case, in coding of a specific progressive image, in which switching between frame DCT and field DCT is performed according to the content of the image, the efficiency of variable-length coding can be improved.

[Embodiment 6]

Figure 18:
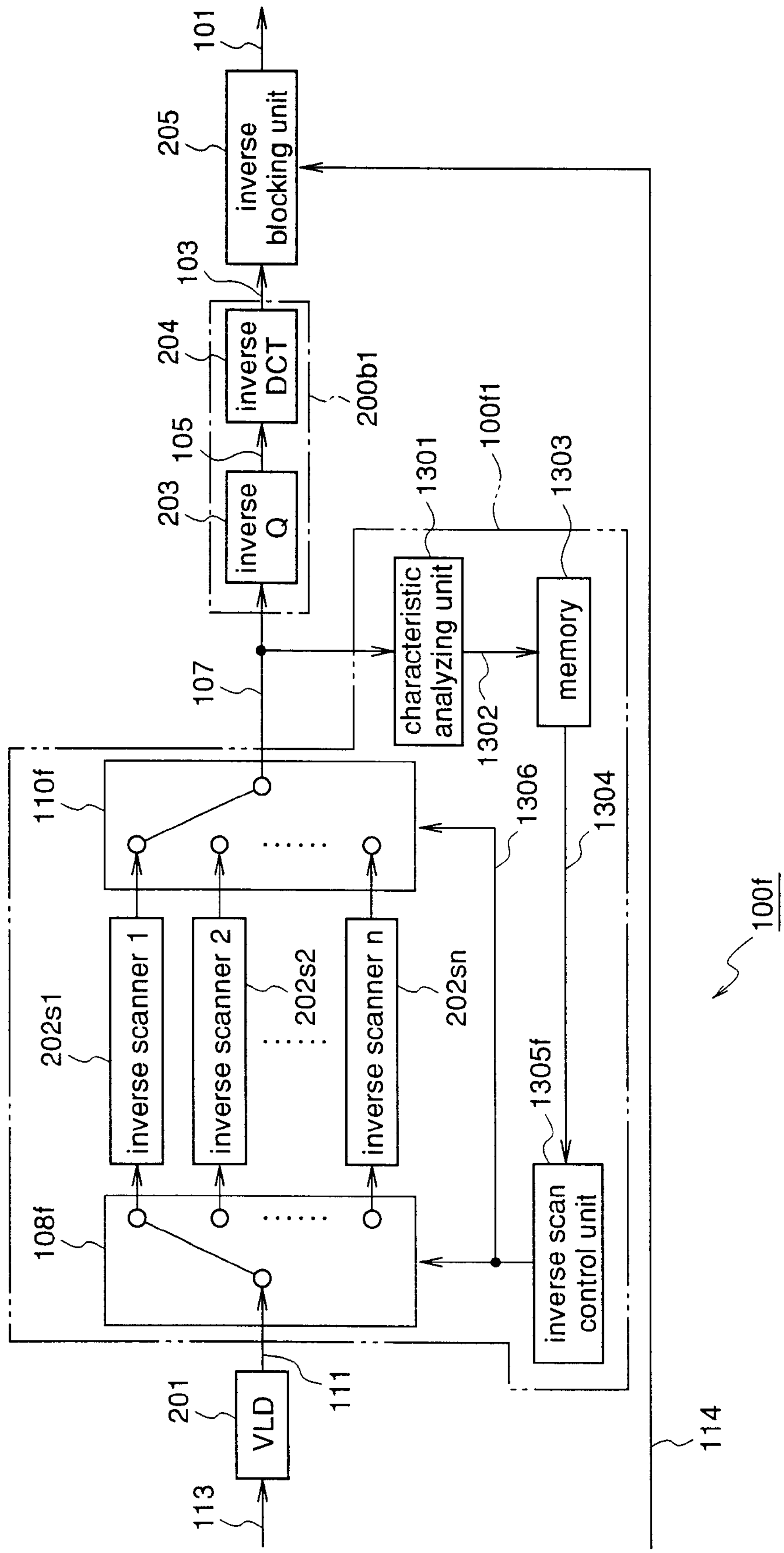
FIG. 18 is a block diagram illustrating a construction of an image decoding apparatus as an image processing apparatus in accordance with a sixth embodiment of the present invention.

FIG. 18 is a block diagram illustrating a construction of an image processing apparatus according to a sixth embodiment of the present invention. In FIG. 18, reference numeral 100*f* designates the image processing apparatus (image decoding apparatus) according to the sixth embodiment of the invention. This image decoding apparatus 100*f* includes the construction of the conventional image decoding apparatus 200*b* shown in FIG. 28, and a circuit construction for performing adaptive inverse scan changing processing in which an inverse scan method for a decoding target block is changed according to the optimum inverse scan method for at least one already decoded block which is positioned in the vicinity of the decoding target block.

That is, the image decoding apparatus 100*f* according to the sixth embodiment of the invention has an inverse scanning unit 100*f*1 for performing the above-mentioned adaptive inverse scan changing processing, in place of the inverse scanner 202 in the conventional image decoding apparatus 200*b*, and the other construction of the image decoding apparatus 100*f* is the same as the conventional image decoding apparatus 200*b*.

This inverse scanning unit 100*f*1 consists of n pieces of inverse scanners 202*s*1~202*sn* having different inverse scan methods, i.e., each performing different rearrangement for returning quantized values which have been rearranged to the original order, a first switch 108*f* for selecting one of the inverse scanners 202*s*1~202*sn* on the basis of a control signal 1306 and supplying an output 111 of the variable-length decoding unit (hereinafter referred to as VLD unit) 201 to the selected inverse scanner, and a second switch 110*f* for selecting one of the inverse scanners 202*s*1~202*sn* on the basis of the control signal 1306 and supplying an output 107 of the selected inverse scanner to the inverse quantization unit 203.

The inverse scanning unit 100*f*1 further consists of a characteristic analyzing unit 1301 for deciding the optimum inverse scan for the output 107 of the inverse scanner, a memory 1303 for storing the decision result as information 1302 indicating the optimum inverse scan, and an inverse scan control unit 1305*f* for generating the control signal 1306 for selecting the optimum inverse scan for a decoding target block, on the basis of information about the optimum inverse scans for already decoded blocks, which are stored in the memory 1303. Herein, the characteristic analyzing unit 1301 has the same construction as in the fifth embodiment.

A description is given of the operation.

When a bit stream 113 output from the image coding apparatus 100*e* is input to the image decoding apparatus 100*f*, the VLD unit 201 converts the bit stream 113 into quantized values 111 by variable-length decoding, and outputs the quantized values 111. At this time, the inverse scan control unit 1305*f* outputs a control signal 1306 for selecting one of the plural inverse scanners 202*s*1~202*sn* to the switches 108*f* and 110*f*, on the basis of information 1304 about the optimum inverse scans of already decoded blocks which are stored in the memory 1303.

The quantized values 111 are inverse-scanned by the inverse scanner which is selected according to the control signal 1306, thereby outputting quantized values 107 in the order before rearrangement in coding. Then, the inverse quantization unit 203 inverse-quantizes the quantized values 107, and outputs DCT coefficients 105 corresponding to a decoding target block. The inverse DCT unit 204 transforms the DCT coefficients 105 into an image signal (plural pixel values) 103 corresponding to the decoding target block by inverse DCT. The inverse blocking unit 205 inverse-blocks the image signals 103 according to the DCT type signal 114, thereby outputting an image signal 101 corresponding to a single display screen. In addition, the characteristic analyzing unit 1301 decides the optimum inverse scan for the quantized values 107 of the decoding target block, and outputs information 1302 indicating the optimum inverse scan to the memory 1303.

In the image decoding apparatus 100*f* thus constructed, decoding using an adaptive inverse scan changing method is performed. Therefore, in variable-length decoding of DCT coefficients of a progressive image or an interlaced image, accurate and efficient decoding can be carried out to a bit stream which has been coded using the adaptive scan changing method according to the fifth embodiment, thereby regenerating an image signal.

In addition, although in the sixth embodiment of the invention, the adaptive inverse scan operation is always performed in decoding, the decoding may be switched between the operation of carrying out the adaptive inverse scan and the operation of carrying out no adaptive inverse scan, according to prescribed control signals.

Figure 19:
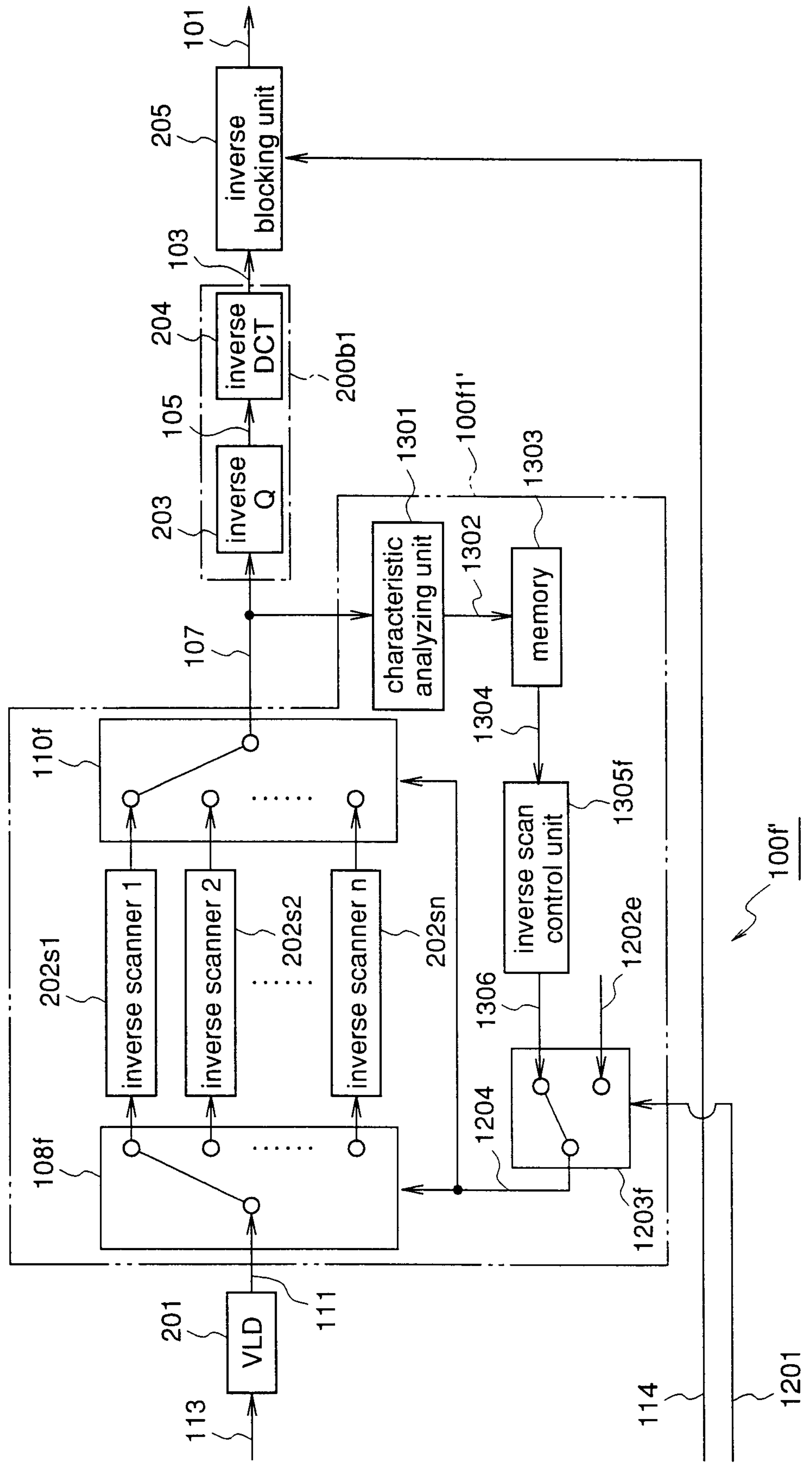
FIG. 19 is a block diagram illustrating a construction of an image decoding apparatus as an image processing apparatus according to a modification of the sixth embodiment of the invention.

FIG. 19 is a block diagram illustrating an image decoding apparatus according to a modification of the sixth embodiment of the invention. In FIG. 19, reference numeral 100*f*' designates the image decoding apparatus according to the modification of the sixth embodiment. This image decoding apparatus 100*f*' has an inverse scanning unit 100*f*1' which performs switching between a scan mode for performing the adaptive inverse scan operation and a scan mode for performing no adaptive inverse scan operation according to a scan mode switching signal 1201, in place of the inverse scanning unit 100*f*1 which always performs the adaptive inverse scan operation in decoding, in the image decoding apparatus 100*f* according to the sixth embodiment.

The inverse scanning unit 100*f*1' includes the inverse scanning unit 100*f*1 according to the sixth embodiment, and a mode switch 1203*f* which selects one of the control signal 1306 from the inverse scan control unit 1305*f* and a preset inverse scan selecting signal 1202*e* for selecting a specific one from among plural inverse scanners, according to the scan mode switching signal 1201, and outputs the selected signal as a control signal 1204 for the switches 108*f* and 110*f*.

In the construction according to the modification of the sixth embodiment, in decoding, an adaptive inverse scan is switched to OFF to execute a specific inverse scan when required. Therefore, when an adaptive scan is switched to OFF to execute a specific scan in the image coding apparatus, a coded image signal can be accurately decoded.

In any of the sixth embodiment and its modification, a description is given of the image decoding apparatus corresponding to the image coding apparatus which performs switching between frame DCT processing and field DCT processing in coding of an interlaced image signal. However, the image decoding apparatus may have a construction corresponding to an image coding apparatus which performs, in coding a progressive image, switching between frame DCT and field DCT according to the content of the image.

In this case, a coded image signal obtained by coding of a specific progressive image, in which switching between frame DCT and field DCT is performed according to the content of the image, can be accurately decoded.

[Embodiment 7]

Figure 20:
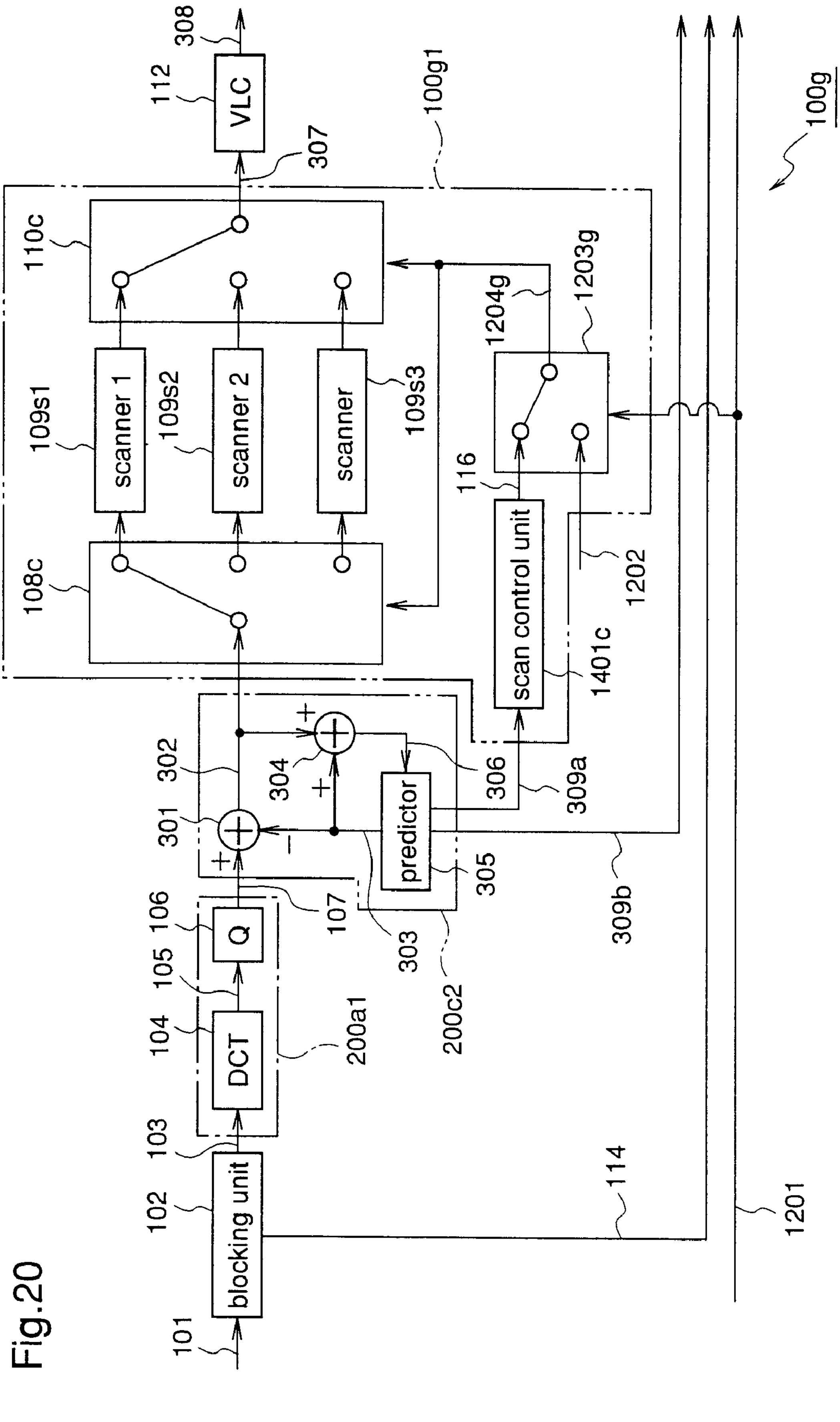
FIG. 20 is a block diagram illustrating a construction of an image coding apparatus as an image processing apparatus in accordance with a seventh embodiment of the present invention.

FIG. 20 is a block diagram illustrating a construction of an image processing apparatus according to a seventh embodiment of the present invention. In FIG. 20, reference numeral 100*g* designates the image processing apparatus (image coding apparatus) according to the seventh embodiment of the invention. This image coding apparatus 100*g* has a scanning unit 100*g*1 which performs switching between a scan mode for performing the adaptive scan operation and a scan mode for performing no adaptive scan operation, when required, in place of the scanning unit 200*c*1 which always performs the adaptive scan operation in coding, in the conventional image coding apparatus 200*c* shown in FIG. 29.

This scanning unit 100*g*1 includes the scanning unit 200*c*1 in the conventional image coding apparatus 200*c*, and a mode switch 1203*g* which selects one of a control signal 116 from the scan control unit 1401*c* and a preset scan selecting signal 1202 for selecting a specific one from among plural scanners, according to a scan mode switching signal 1201, and outputs the selected signal as a control signal 1204*g* for the switches 108*c* and 110*c*. The other construction of the image coding apparatus 100*g* is the same as the conventional image coding apparatus 200*c*.

In the image coding apparatus 100*g* thus constructed, the mode switch 1203*g* selects one of the control signal 116 for adaptively selecting one of plural scans and the scan selecting signal 1202 for selecting a specific scan suitable for an interlaced image, according to the scan mode switching signal 1201 which is supplied, by manual operation, from the outside of the system (image coding apparatus), and supplies the selected signal to the switches 108*c* and 110*c*.

At this time, when the mode switch 1203*g* selects the scan selecting signal 1202, the switches 108*c* and 110*c* select the scanner 109*s*3 which is to perform a scan shown in FIG. 31(*c*), on the basis of the scan selecting signal 1202, and the quantized values 107 are scanned by the selected scanner 109*s*3, regardless of the first prediction information 309*a*.

Figure 29:
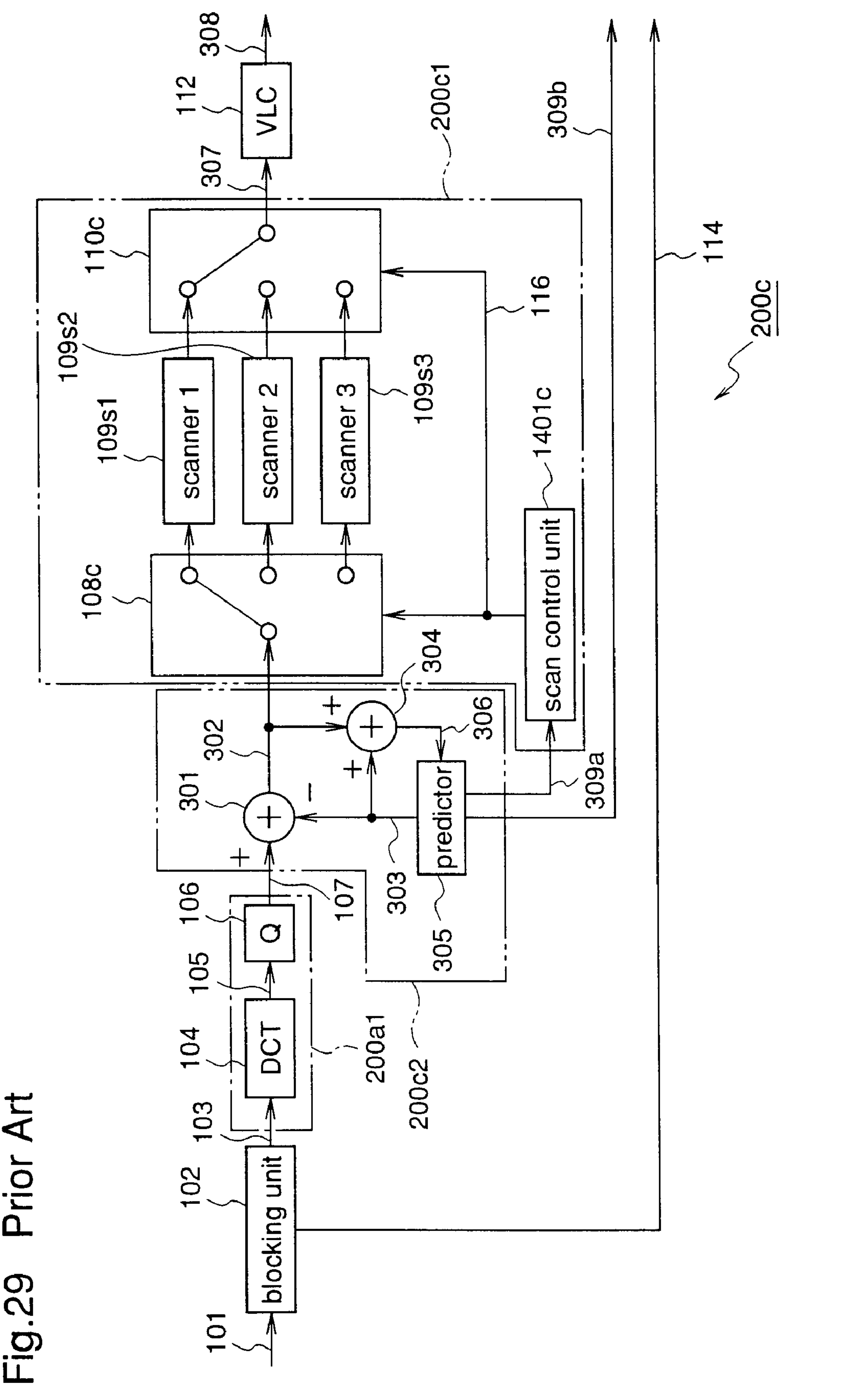
FIG. 29 is a block diagram illustrating a construction of another image coding apparatus as a conventional image processing apparatus.

Meanwhile, when the mode switch 1203*g* selects the control signal 116, the scanning unit 100*g*1 performs scanning processing in the same manner as the scanning unit 200*c*1 in the conventional image coding apparatus 200*c* shown in FIG. 29.

The other operation is performed as in the conventional image coding apparatus 200*c*.

In the construction according to the seventh embodiment of the invention, an adaptive scan is switched to OFF to execute a specific scan suitable for an interlaced image when required, whereby coding of an interlaced image signal can be efficiently simplified.

In addition, although the scan mode switching signal 1201 is supplied by manual operation, it may be output according to the result which is obtained by monitoring the coding efficiency on the basis of the output 308 of the VLC unit 112.

Although in the seventh embodiment of the invention, a description is given of coding of an interlaced image signal, an image signal to be subjected to coding is not limited thereto. For example, it may be a progressive image of a lateral stripe pattern or the like, the image having high pixel value correlations between odd scan lines or even scan lines, like an interlaced image. Also in this case, the same effects as in the seventh embodiment are obtained.

[Embodiment 8]

Figure 21:
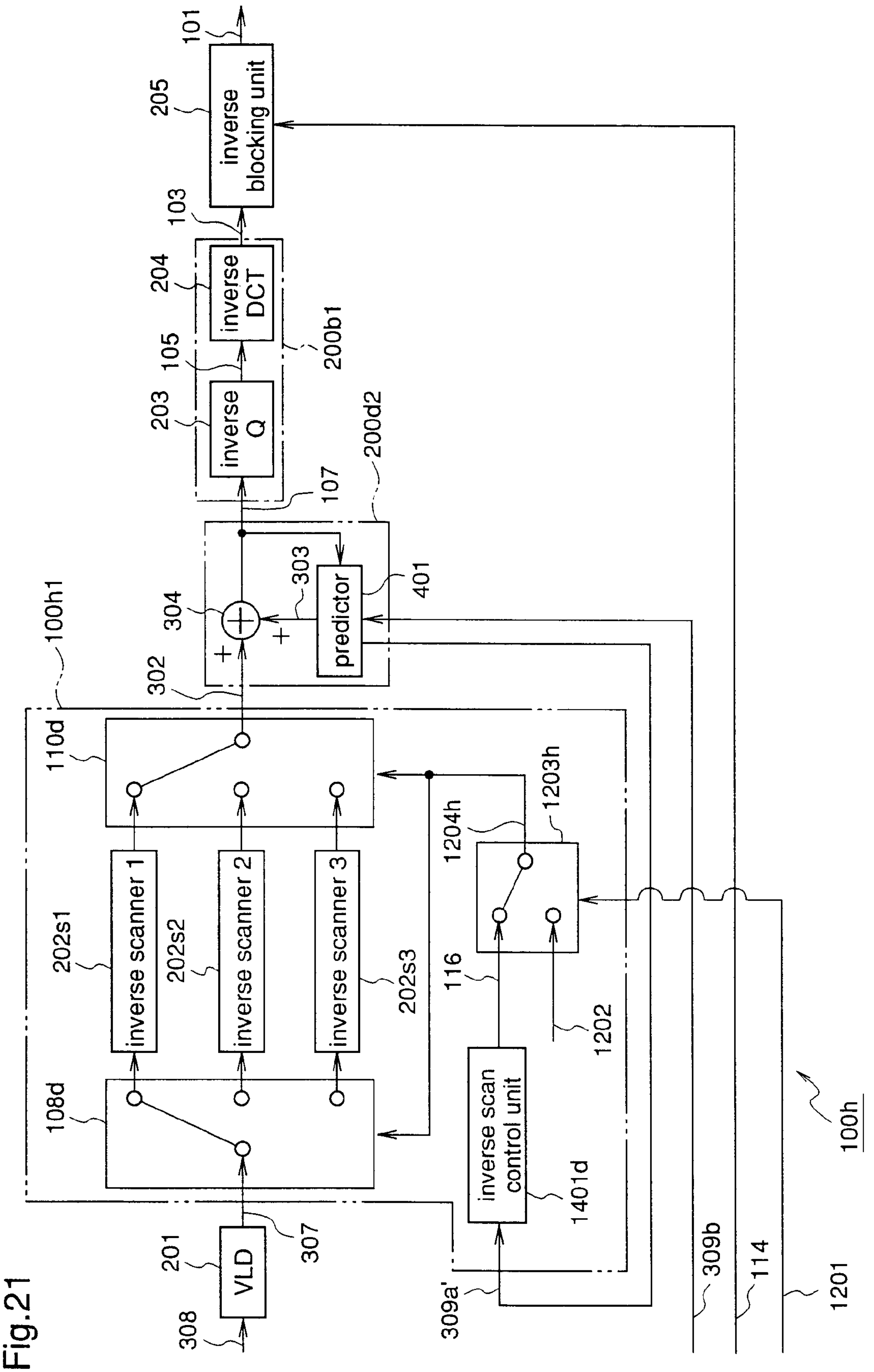
FIG. 21 is a block diagram illustrating a construction of an image decoding apparatus as an image processing apparatus in accordance with an eighth embodiment of the present invention.

FIG. 21 is a block diagram illustrating a construction of an image processing apparatus according to an eighth embodiment of the present invention. In FIG. 21, 22 reference numeral 100*h* designates the image processing apparatus (image decoding apparatus) according to the eighth embodiment of the invention. This image decoding apparatus 100*h* has an inverse scanning unit 100*h*1 which performs switching between an inverse scan mode for performing the adaptive inverse scan operation and an inverse scan mode for performing no adaptive inverse scan operation, when required, in place of the inverse scanning unit 200*d*1 which always performs the adaptive inverse scan operation in decoding, in the conventional image decoding apparatus 200*d* shown in FIG. 32.

This inverse scanning unit 100*h*1 includes the inverse scanning unit 200*d*1 in the conventional image decoding apparatus 200*d*, and a mode switch 1203*h* which selects one of a control signal 116 from the inverse scan control unit 1401*d* and a preset inverse scan selecting signal 1202 for selecting a specific one from among plural inverse scanners, according to a scan mode switching signal 1201, and outputs the selected signal as a control signal 1204*h* for the switches 108*d* and 110*d*. The other construction of the image decoding apparatus 100*h* is the same as the conventional image decoding apparatus 200*d*.

In the image decoding apparatus 100*h* thus constructed, the mode switch 1203*h* selects one of the control signal 116 for adaptively selecting one of plural inverse scans and the inverse scan selecting signal 1202 for selecting a specific inverse scan suitable for an interlaced image, according to the scan mode switching signal 1201 which is supplied, by manual operation, from the outside of the system (image decoding apparatus), and supplies the selected signal to the switches 108*d* and 110*d*.

At this time, when the mode switch 1203*h* selects the inverse scan selecting signal 1202, the switches 108*d* and 110*d* select the inverse scanner 202*s*3 which is to perform an inverse scan corresponding to a scan shown in FIG. 31(*c*), on the basis of the inverse scan selecting signal 1202, and the quantized values 307 are inverse-scanned by the selected inverse scanner 202*s*3, regardless of the control prediction information 309*a'*.

Figure 32:
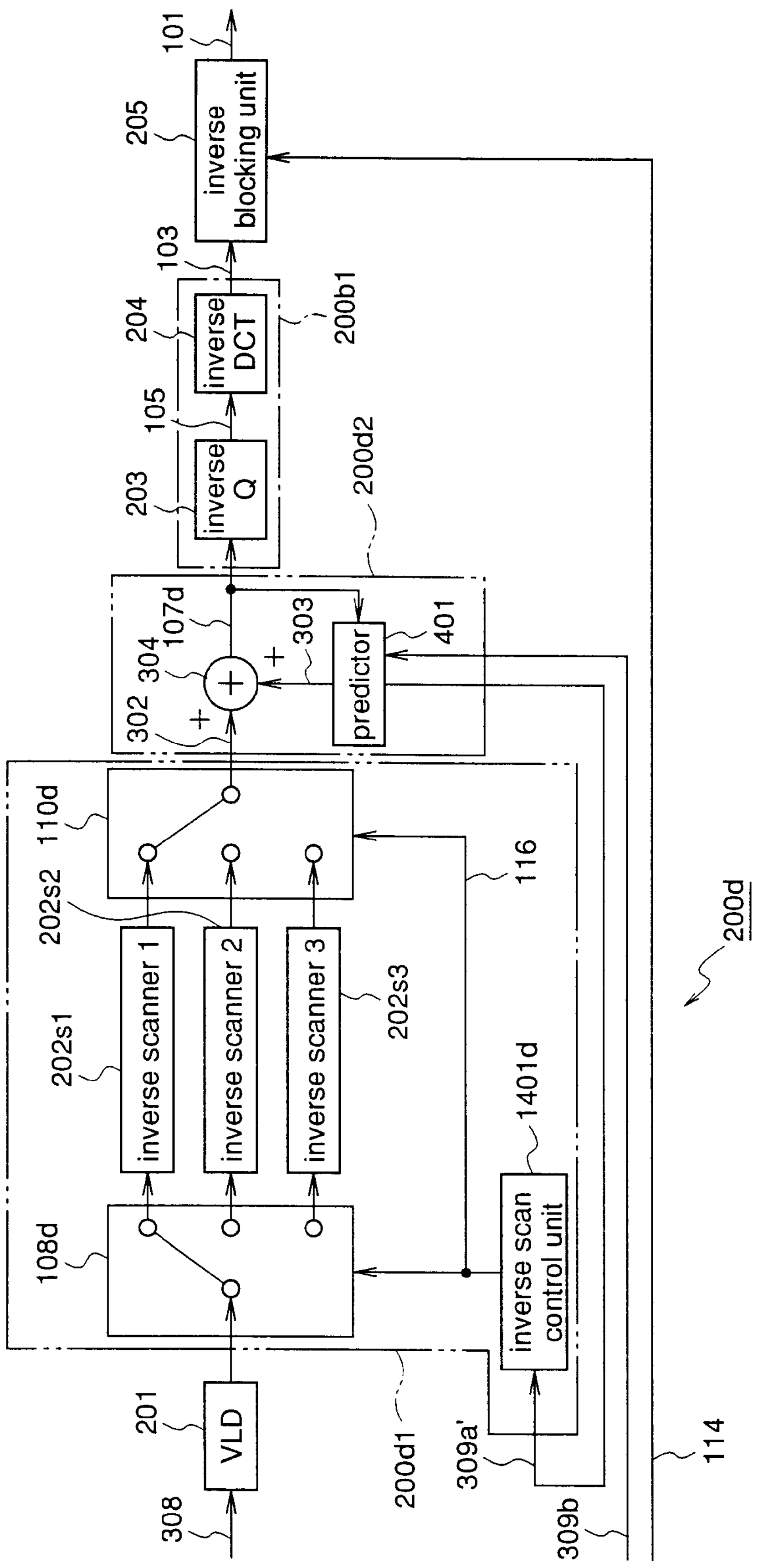
FIG. 32 is a block diagram illustrating a construction of another image decoding apparatus as a conventional image processing apparatus.

Meanwhile, when the mode switch 1203*h* selects the control signal 116, the inverse scanning unit 100*h*1 performs inverse-scanning processing in the same manner as the inverse scanning unit 200*d*1 in the conventional image decoding apparatus 200*d* shown in FIG. 32.

The other operation is performed as in the conventional image decoding apparatus 200*d*.

In the construction according to the eighth embodiment of the invention, an adaptive inverse scan is switched to OFF to execute a specific inverse scan suitable for an interlaced image when required, whereby decoding of a coded interlaced image signal can be efficiently simplified.

In addition, although in the eighth embodiment of the invention, a description is given of decoding of an interlaced image, an image to be subjected to decoding is not limited thereto. For example, it may be a progressive image of a lateral stripe pattern or the like, the image having high pixel value correlations between odd scan lines or even scan lines, like an interlaced image. Also in this case, the same effects as in the eighth embodiment are obtained.

[Embodiment 9]

Figure 22:
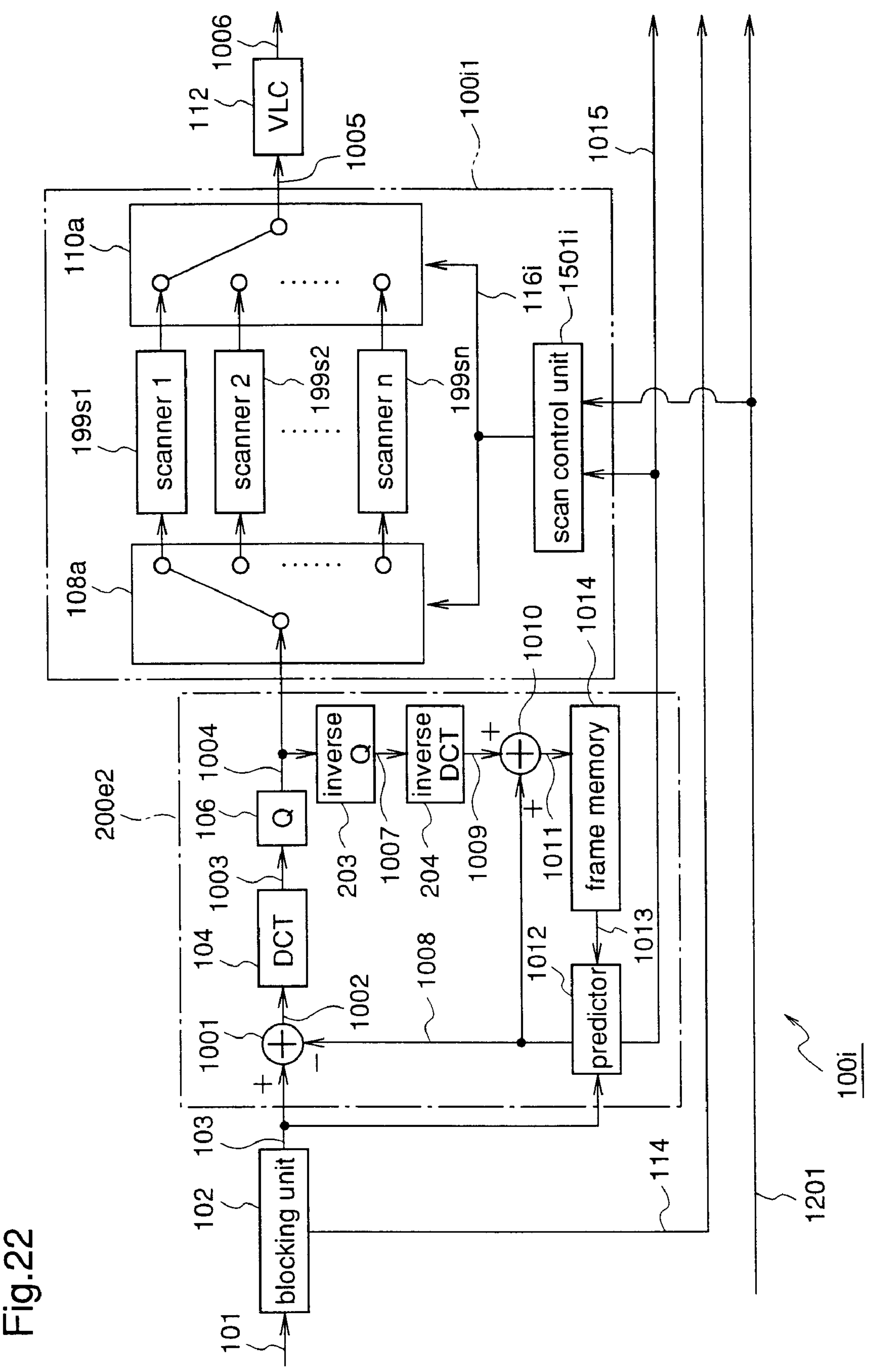
FIG. 22 is a block diagram illustrating a construction of an image coding apparatus as an image processing apparatus in accordance with a ninth embodiment of the present invention.

FIG. 22 is a block diagram illustrating a construction of an image processing apparatus according to a ninth embodiment of the present invention. In FIG. 22, reference numeral 100*i* designates the image processing apparatus (image coding apparatus) according to the ninth embodiment of the invention. This image coding apparatus 100*i* has a scanning unit 100*i*1 which adaptively changes a scan method on the basis of both prediction information (a parameter) 1015, and a scan mode switching signal 1201 which is supplied, by manual operation, from the outside of the system (image coding apparatus), in place of the scanning unit 200*e*1 in the conventional image coding apparatus 200*e* shown in FIG. 33.

This scanning unit 100*i*1 consists of n pieces of scanners 199*s*1~199*sn* having different scan methods, i.e., each setting the different processing order to quantized values, a first switch 108*a* for selecting one of the scanners 199*s*1~199*sn* on the basis of a control signal 116*i* and supplying an output 107 of the quantization unit 106 to the selected scanner, a second switch 110*a* for selecting one of the scanners 199*s*1~199*sn* on the basis of the control signal 116*i* and supplying an output 1005 of the selected scanner to the variable-length coding (VLC) unit 112, and a scan control unit 1501*i* for generating the control signal 116*i* on the basis of the parameter 1015 concerning prediction from the prediction unit 200*e*2 and the scan mode switching signal 1201 from the outside.

Herein, more specifically, the scanner 199*s*1 (1) is constituted by the respective elements 301, 304 and 305 in the prediction unit 200*c*2 shown in FIG. 29, and the respective elements 108*c*, 110*c*, 109*s*1~109*s*3 and 1401*c* in the scanning unit 200*c*1 shown in FIG. 29. That is, the scanner (1) performs intra-frame prediction to a block to which no inter-frame prediction has been performed in coding (hereinafter referred to as an intra-coded block) and selects one of the scanners 109*s*1~109*s*3 constituting the scanner (1) on the basis of prediction information concerning generation of predicted values. In addition, one of the scanners 109*s*1~109*s*3 constituting the scanner (1) performs a scan of quantized values in the order shown in FIG. 31(*a*).

The scanner 199*s*2 (2) performs a scan in the order shown in FIG. 31(*a*), the scanner 199*s*3 (3) performs a scan in the order shown in FIG. 31(*c*), and the scanner 199*s*4 (4) performs a scan in the order shown in FIG. 31(*a*) or FIG. 31(*c*).

Figure 33:
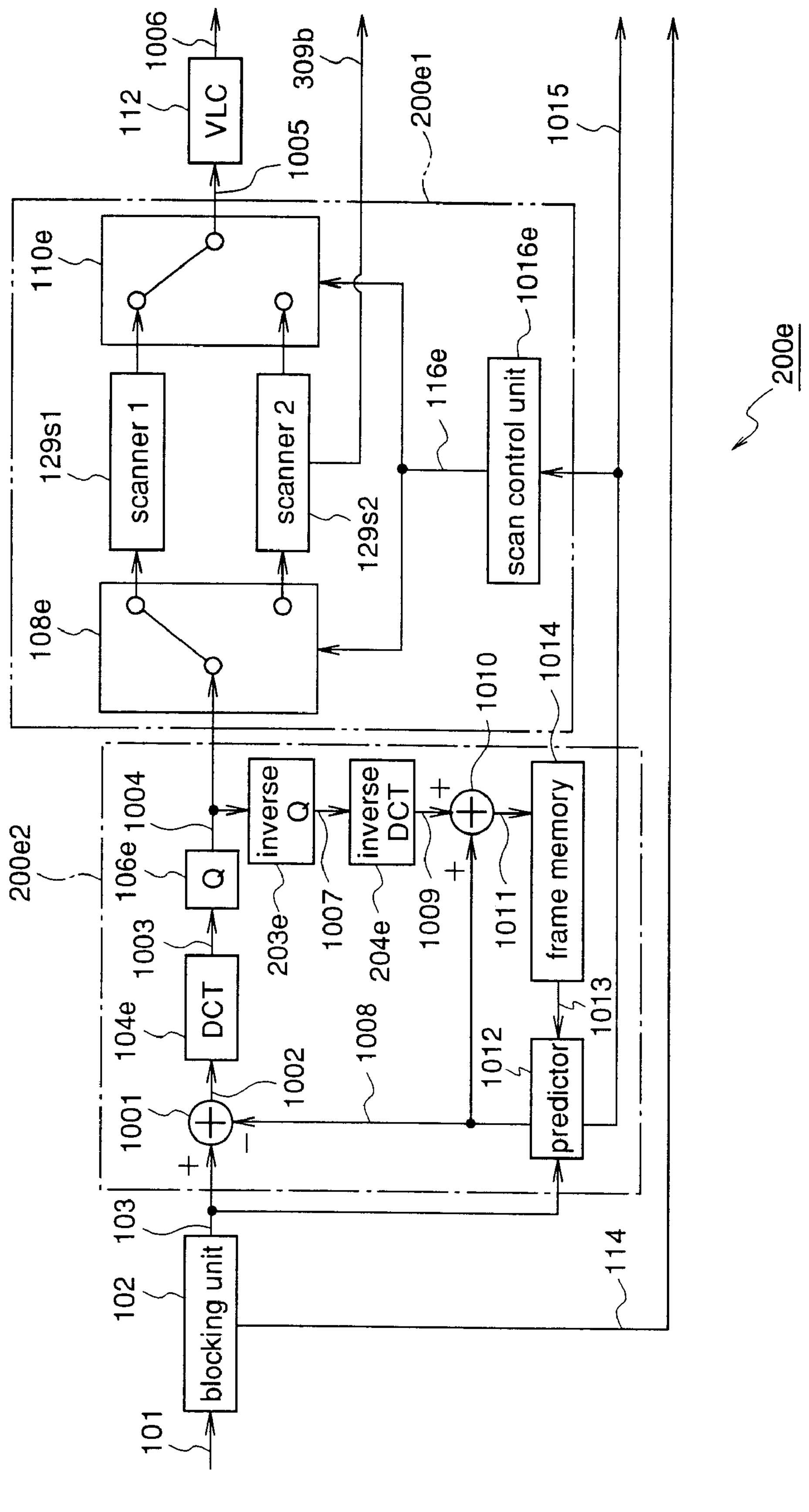
FIG. 33 is a block diagram illustrating a construction of still another image coding apparatus as a conventional image processing apparatus.

The other construction of the image coding apparatus 100*i* is the same as in the conventional image coding apparatus 200*e* shown in FIG. 33.

A description is given of the operation. The same operation as in the conventional image coding apparatus 200*e* shown in FIG. 33 is not described.

Figure 23:
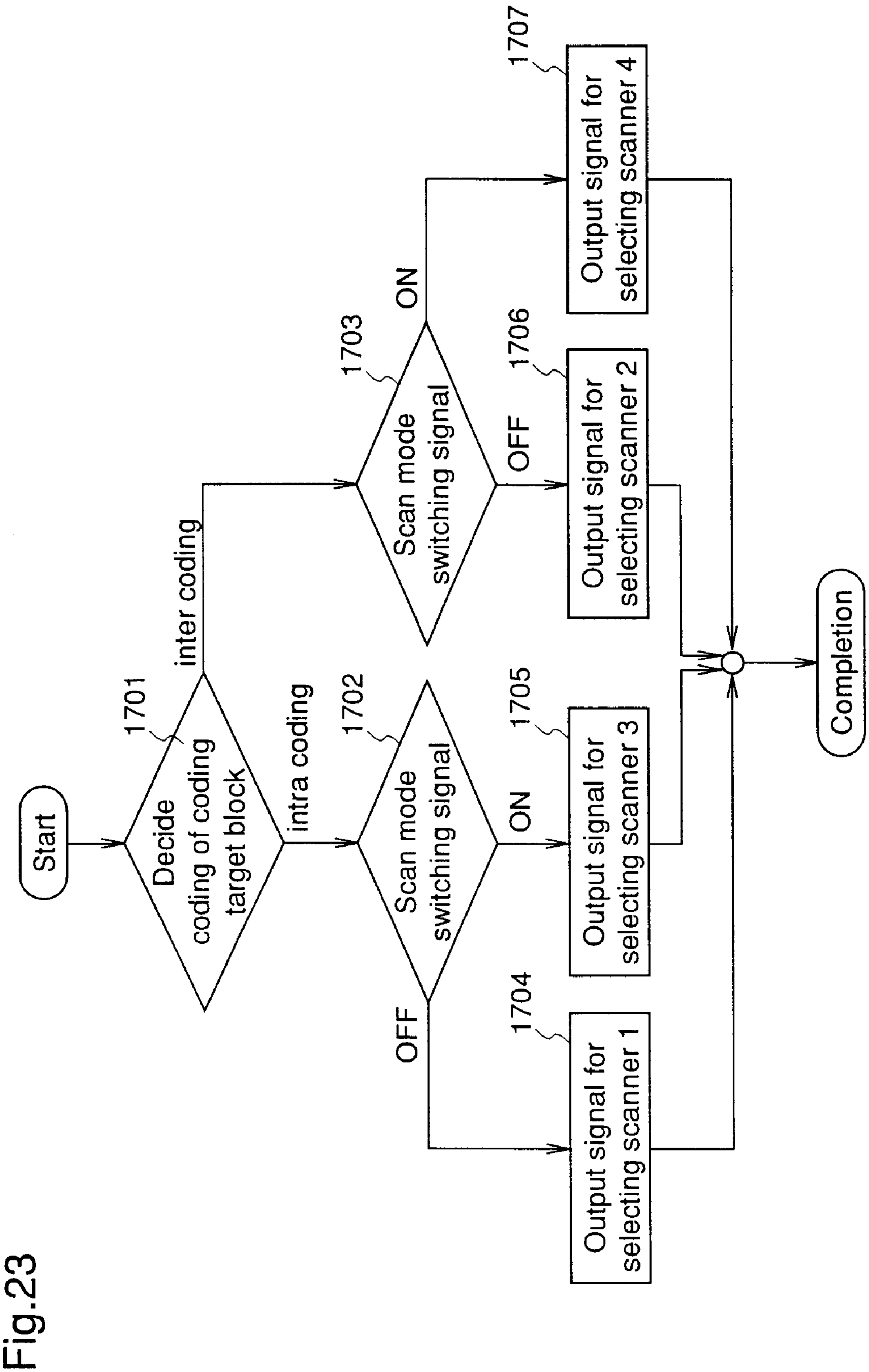
FIG. 23 is a flowchart showing a flow of an adaptive scan changing method according to any of the ninth and tenth embodiments of the invention.

A processing method by the scan control unit 1501*i* is described using a flowchart shown in FIG. 23.

In step 1701, the scan control unit 1501*i* decides an inter-frame prediction parameter 1015 indicating information about coding of a coding target block. As the result of the decision, when the coding target block is an intra-coded block, decision of the scan mode switching signal 1201 is performed (step 1702). As the result of the decision at step 1702, when the scan mode switching signal 1201 is in the OFF state, the scan control unit 1501*i* outputs the control signal 116*i* for selecting the scanner (1) (step 1704). On the other hand, when the scan mode switching signal 1201 is in the ON state, the scan control unit 1501*i* outputs the control signal 116*i* for selecting the scanner (3) (step 1705).

Meanwhile, as the result of the decision at step 1701, when the coding target block is an inter-coded block, decision of the scan mode switching signal 1201 is performed (step 1703). As the result of the decision at step 1703, when the scan mode switching signal 1201 is in the OFF state, the scan control unit 1501*i* outputs the control signal 116*i* for selecting the scanner (2) (step 1706). On the other hand, when the scan mode switching signal 1201 is in the ON state, the scan control unit 1501*i* outputs the control signal 116*i* for selecting the scanner (4) (step 1707).

In the image coding apparatus 100*i* thus constructed, since for each of intra-coded macroblocks and inter-coded macroblocks, one of plural scans is selected according to a parameter concerning prediction and a scan mode switching signal, a scan suitable for each coding method is performed. Therefore, in inter coding of an interlaced image signal in which inter-coded macroblocks and intra-coded macroblocks having different frequency component distributions coexist, a run length is increased, thereby improving coding efficiency.

In the ninth embodiment of the invention, a description is given of the image coding apparatus which performs switching between frame DCT processing and field DCT processing in coding of an interlaced image signal. However, the image coding apparatus may have a construction for performing, in coding a progressive image, switching between frame DCT and field DCT according to the content of the image.

In this case, in coding of a specific progressive image, in which switching between frame DCT and field DCT is performed according to the content of the image, the efficiency of variable-length coding can be improved.

[Embodiment 10]

Figure 24:
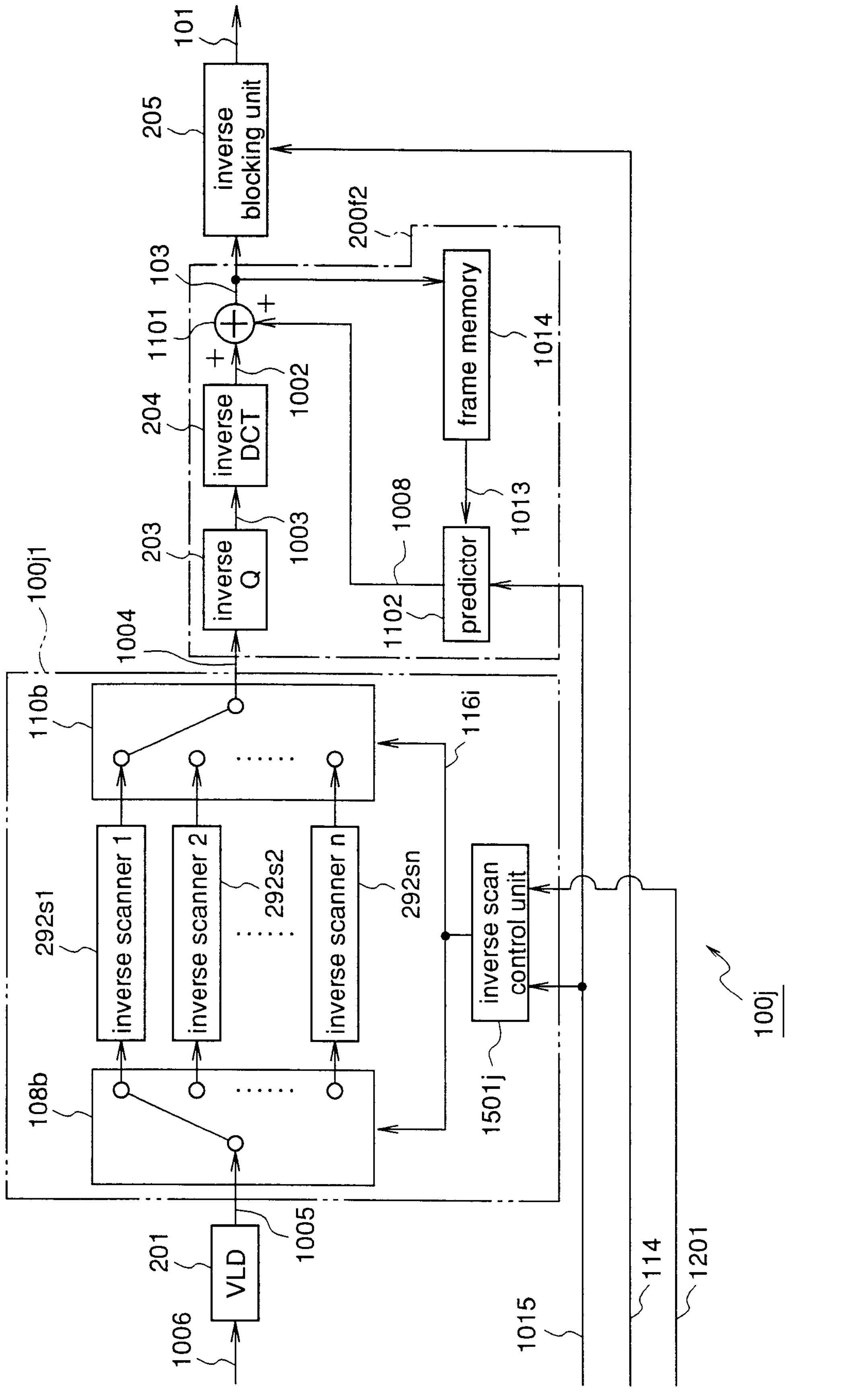
FIG. 24 is a block diagram illustrating a construction of an image decoding apparatus as an image processing apparatus in accordance with a tenth embodiment of the present invention.

FIG. 24 is a block diagram illustrating a construction of an image processing apparatus according to a tenth embodiment of the present invention. In FIG. 24, reference numeral 100*j* designates the image processing apparatus (image decoding apparatus) according to the tenth embodiment of the invention. This image decoding apparatus **100*j* has an inverse scanning unit 100*j*1 which adaptively changes an inverse scan method on the basis of both a prediction parameter 1015 and a scan mode switching signal 1201, in place of the inverse scanning unit 200*f*1 in the conventional image decoding apparatus 200*f* shown in FIG. 34**.

This inverse scanning unit **100*j*1 consists of n pieces of inverse scanners 292*s*1~292*sn* having different inverse scan methods, i.e., each performing different rearrangement for returning quantized values which have been rearranged to the original order, a first switch 108*b* for selecting one of the inverse scanners 292*s*1~292*sn* on the basis of a control signal 116*i* and supplying an output 1005 of the variable-length decoding unit 201 to the selected inverse scanner, a second switch 110*b* for selecting one of the inverse scanners 292*s*1~292*sn* on the basis of the control signal 116*i* and supplying an output 1004 of the selected inverse scanner to the inverse quantization unit 203, and an inverse scan control unit 1501*j* for generating the control signal 116*i* on the basis of the parameter 1015 concerning prediction from the prediction unit 200*e*2 and the scan mode switching signal 1201 from the outside. Herein, the inverse scanners 292*s*1~292*sn* correspond to the scanners 199*s*1~199*sn* in the image coding apparatus 100*i***.

Figure 34:
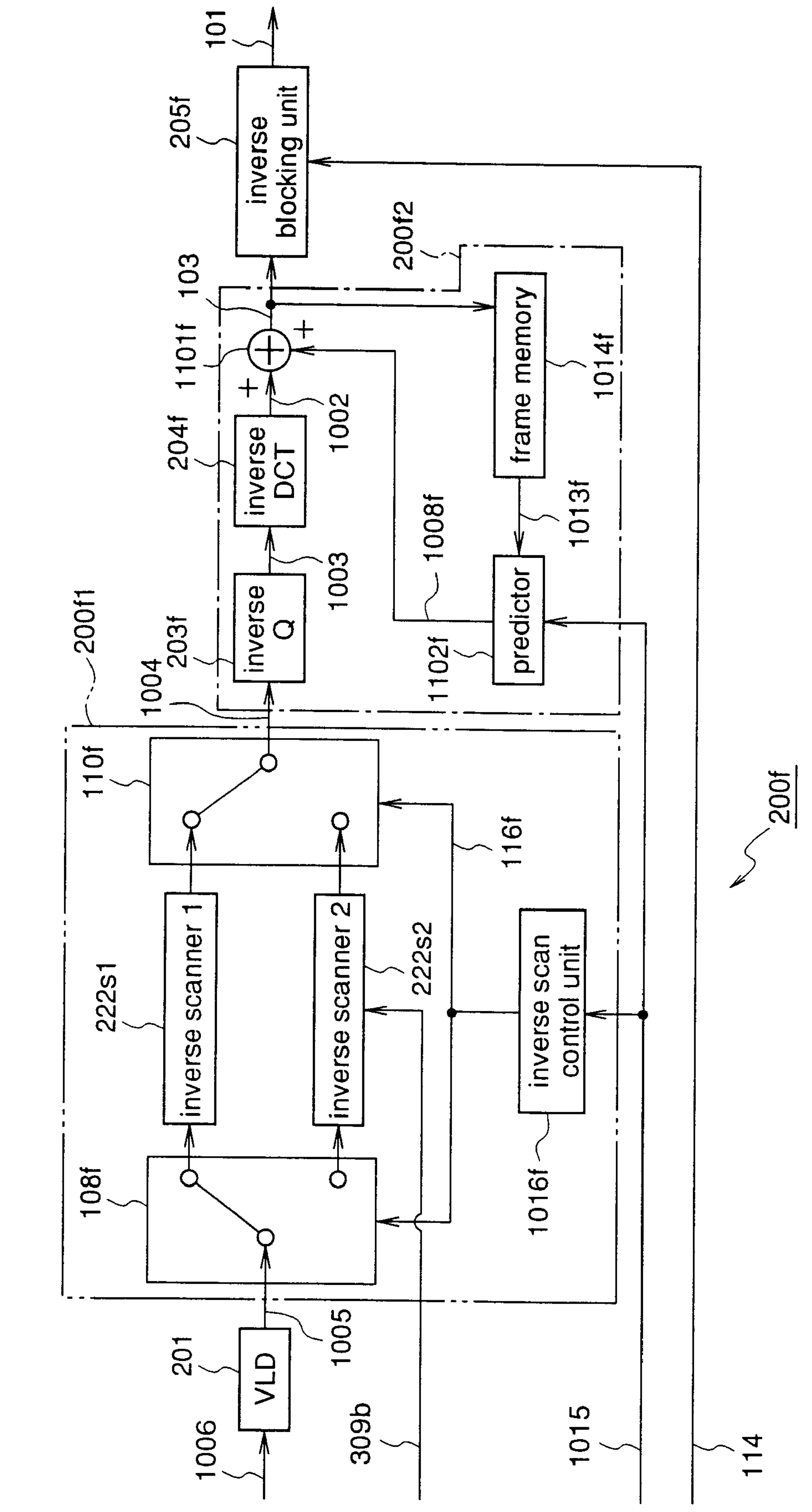
FIG. 34 is a block diagram illustrating a construction of still another image decoding apparatus as a conventional image processing apparatus.

The other construction of the image decoding apparatus **100*j* is the same as in the conventional image decoding apparatus 200*f* shown in FIG. 34**.

The image decoding apparatus **100*j* is different from the conventional image decoding apparatus 200*f* in that the inverse scan control unit 1501*j* outputs the control signal 116*i* on the basis of the parameter 1015 concerning prediction and the scan mode switching signal 1201, using the same method as the scan control unit 1501*i*** according to the ninth embodiment.

In the image decoding apparatus **100*j*** thus constructed, decoding is performed by adaptively changing a scan according to a parameter concerning prediction and a scan mode switching signal. Therefore, in variable-length decoding of DCT coefficients of a progressive image or an interlaced image, accurate and efficient decoding can be carried out to a bit stream which has been coded using the scan changing method according to the ninth embodiment, thereby regenerating an image signal corresponding to the bit stream.

In the tenth embodiment of the invention, a description is given of the image decoding apparatus corresponding to the image coding apparatus which performs switching between frame DCT processing and field DCT processing in coding of an interlaced image signal. However, the image decoding apparatus may have a construction corresponding to an image coding apparatus which performs, in coding a progressive image, switching between frame DCT and field DCT according to the content of the image.

In this case, a coded image signal obtained by coding of a specific progressive image, in which switching between frame DCT and field DCT is performed according to the content of the image, can be accurately decoded.

[Embodiment 11]

Figure 35:
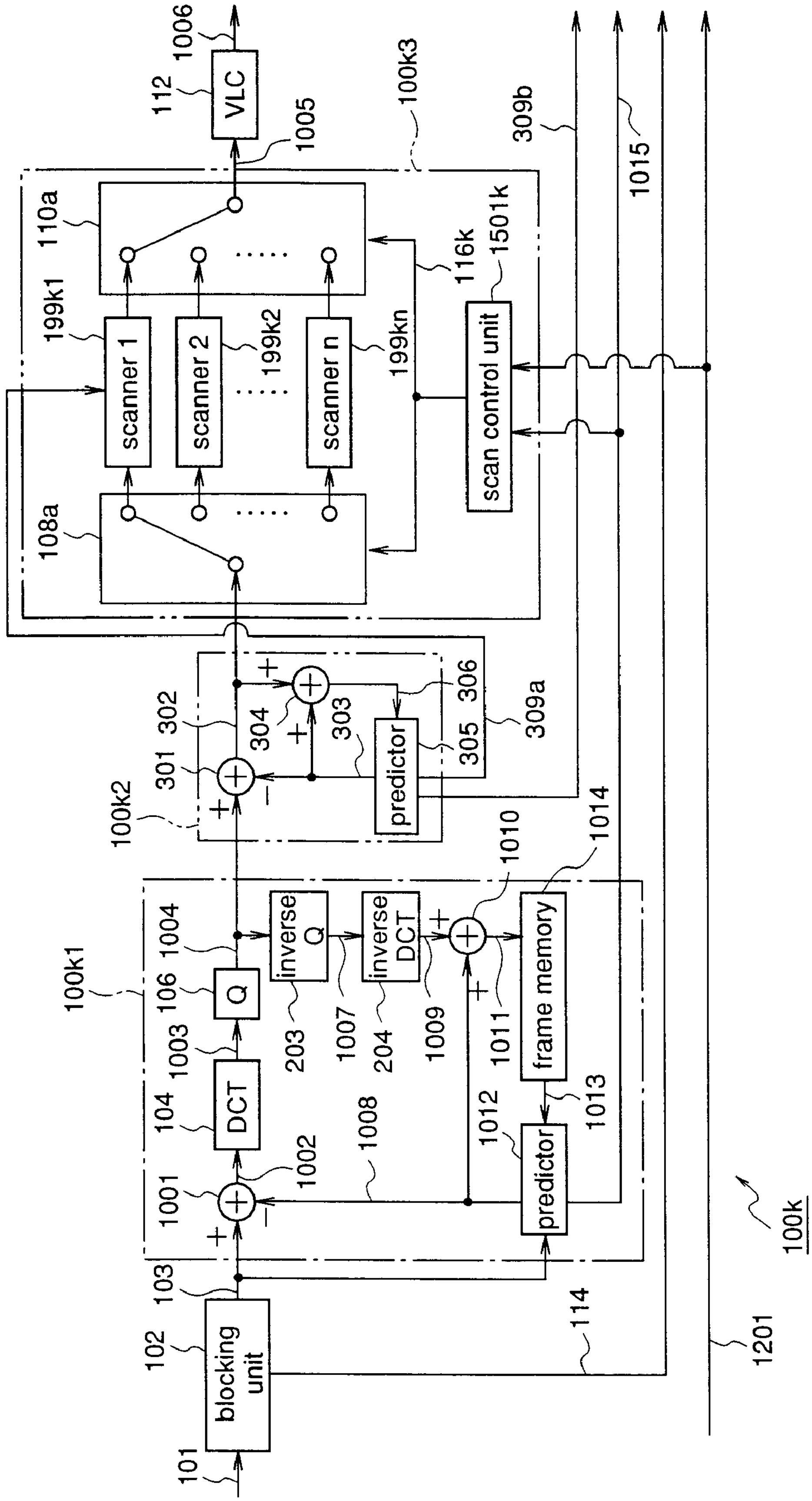
FIG. 35 is a block diagram illustrating a construction of an image coding apparatus as an image processing apparatus in accordance with an eleventh embodiment of the present invention.

FIG. 35 is a block diagram illustrating a construction of an image processing apparatus according to an eleventh embodiment of the present invention. In FIG. 35, reference numeral **100*k* designates the image processing apparatus (image coding apparatus) according to the eleventh embodiment of the invention. This image coding apparatus 100*k* consists of a blocking unit 102, an information source coding unit 100*k*1, a prediction unit 100*k*2, a scanning unit 100*k*3, and a variable-length coding (VLC) unit 112. The blocking unit 102 is for dividing an input image signal 101 correspondingly to plural blocks constituting a single display screen to generate an image signal (plural pixel values) 103 corresponding to each block. The information source coding unit 100*k*1 is for performing information source coding to inter-frame difference values 1002 between the image signal (pixel values) 103 and inter-frame predicted values 1008 of the image signal 103. The prediction unit 100*k*2 is for performing intra-frame prediction to an output (quantized values) 1004 of the information source coding unit 100*k*1 to generate intra-frame predicted values 303, and outputting intra-frame difference values 302 between the quantized values 1004 and intra-frame predicted values 303 of the quantized values 1004 and outputting first prediction information 309*a* and second prediction information 309*b*. Herein, the first prediction information 309*a* includes ON/OFF information indicating ON/OFF of AC prediction and prediction direction information indicating a reference direction for AC prediction, and the second prediction information 309*b* includes only the ON/OFF information of AC prediction. The scanning unit 100*k*3 is for changing a scan method for the intra-frame difference values 302, on the basis of a parameter concerning generation of the predicted values (inter-frame prediction information) 1015 from the information source coding unit 100*k*1, a scan mode switching signal 1201 which is supplied, by manual operation, from the outside of the system (image coding apparatus). The variable-length coding (VLC) unit 112 is for performing variable-length coding to an output 1005 of the scanning unit 100*k*3 according to the order which has been set in the scanning unit 100*k*3, to generate a bit stream 1006** corresponding to the image signal of each block.

In the eleventh embodiment of the invention, the information source coding unit **100*k*1 has the same construction as the information source coding unit 200*e*2 in the conventional image coding apparatus 200*e* shown in FIG. 33, and the prediction unit 100*k*2 has the same construction as the prediction unit 200*c*2 in the conventional image coding apparatus 200*c* shown in FIG. 29**.

The scanning unit **100*k*3 according to the eleventh embodiment of the invention consists of n pieces of scanners 199*k*1~199*kn* having different scan methods, i.e., each setting the different processing order to quantized values, a first switch 108*a* for selecting one of the scanners 199*k*1~199*kn* on the basis of a control signal 116*k* and supplying the output 302 of the prediction unit 100*k*2 to the selected scanner, a second switch 110*a* for selecting one of the scanners 199*k*1~199*kn* on the basis of the control signal 116*k* and supplying the output 1005 of the selected scanner to the VLC unit 112, and a scan control unit 1501*k* for generating the control signal 116*k* on the basis of the parameter concerning the prediction (inter-frame prediction information) 1015 from the predictor 1012 in the information source coding unit 100*k*1, and the scan mode switching signal 1201** from the outside.

That is, the scanning unit **100*k*3 is constructed so as to perform switching between the first scan operation and the second scan operation according to the scan mode switching signal 1201. In the first scan operation, an intra-coded block is subjected to adaptive scanning by the scanner 199*k*1, and an inter-coded block is subjected to zigzag scanning by the scanner 199*k*2. In the second scan operation, an intra-coded block is subjected to scanning which gives a priority to a vertical direction, by the scanner 199*k*3, and an inter-coded block is subjected to scanning which gives a priority to a vertical direction in the order different from the order of the scan by the scanner 199*k*3, by the scanner 199*k*4**.

Herein, more specifically, the scanner **199*k*1 (1) is constituted by the respective elements 108*c*, 110*c*, 109*s*1~109*s*3 and 1401*c* in the scanning unit 200*c*1 shown in FIG. 29. That is, the scanner (1) selects one of the scanners 109*s*1~109*s*3 constituting the scanner (1) on the basis of first intra-frame prediction information 309*a* concerning generation of predicted values for an intra-coded block. In addition, one of the scanners 109*s*1~109*s*3 constituting the scanner (1) performs a zigzag scan of quantized values in the order shown in FIG. 31**(*a*).

The scanner **199*k*2 (2) performs a zigzag scan in the order shown in FIG. 31**(*a*). The scanner **199*k*3 (3) performs a scan which gives a priority to a vertical direction in the order shown in FIG. 31**(*c*). The scanner **199*k*4 (4) performs a scan which gives a priority to a vertical direction in the order different from the order shown in FIG. 31**(*c*).

The scan which gives a priority of a vertical direction is of setting the processing order in which quantized values arranged along a vertical direction corresponding to a vertical direction of a display screen are continuous by a prescribed number, to quantized values arranged in the form of a 8×8 matrix, which are obtained by information source coding of an image signal corresponding to each block.

A description is given of the operation.

When an interlaced image signal 101 is input to the image coding apparatus **100*k*, the blocking unit 102 blocks the interlaced image signal 101 frame by frame or field by field, and outputs an image signal (plural pixel values) 103 corresponding to each block to the information source coding unit 100*k*1. Further, the blocking unit 102 outputs a DCT type signal 114 indicating a blocking unit of the image signal 103**.

In the information source coding unit **100*k*1, inter-frame predictive coding is carried out to the image signal (pixel values) 103 which is obtained by blocking. Specifically, the DCT unit 104 transforms difference values 1002 between the image signal (pixel values) 103 and inter-frame predicted values 1008 of the image signal 103 into DCT coefficients 1003 by DCT, and outputs the DCT coefficients 1003. The quantization unit 106 converts the DCT coefficients 1003 into quantized values 1004 by quantization, and outputs the quantized values 1004 to the prediction unit 100*k*2**.

At this time, in the information source coding unit lookl, the inverse quantization unit 203 converts the quantized values 1004 into DCT coefficients 1007 corresponding to the DCT coefficients 1003. The inverse DCT unit 204 transforms the DCT coefficients 1007 into difference signals 1009 corresponding to the difference values 1002. The adder 1010 adds the inter-frame predicted values 1008 to the difference signals 1009, and the result of the addition 1011 is stored in the frame memory 1014, as a reference image signal. In the predictor 1012, the above-mentioned inter-frame predicted values 1008 are generated on the basis of a reference image signal 1013 of an already coded block which is stored in the frame memory 1014, and the image signal 103 which is obtained by blocking.

In the image coding apparatus **100*k*, when intra-coding processing is performed to a coding target block, the predictor 1012 in the information source coding unit 100*k*1 outputs values at "0" level as the inter-frame predicted values 1008. When inter-coding processing is performed thereto, the predictor 1012 outputs the inter-frame predicted values 1008** at the level corresponding to each block.

Figure 30:
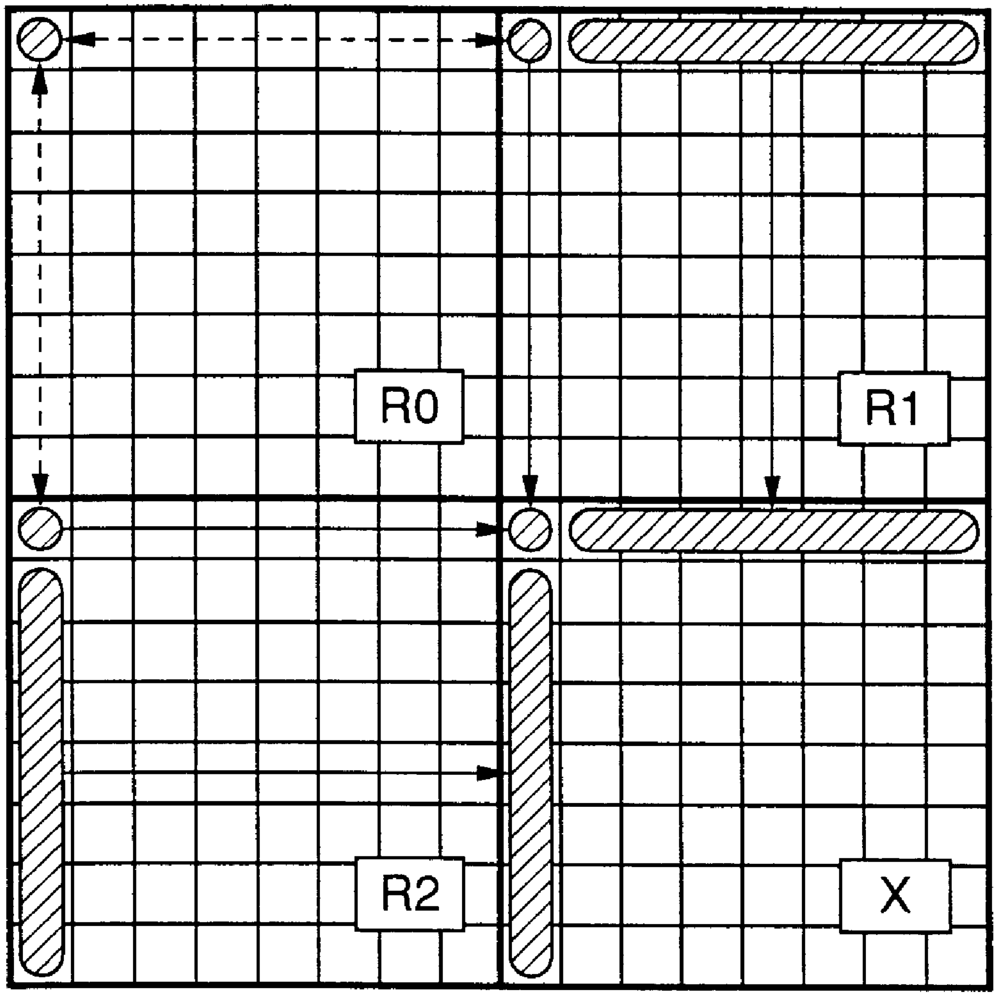
FIG. 30 is a diagram for conceptually explaining an intra-frame prediction method.

Next, in the prediction unit **100*k*2, intra-frame prediction is carried out to the quantized values 1004 as the output of the information source coding unit 100*k*1. Specifically, the adder 301 subtracts inter-frame predicted values 303 of the quantized values 1004 from the quantized values 1004, and outputs resulting difference values 302 to the scanning unit 100*k*3. At this time, in the prediction unit 100*k*2, the adder 304 adds the intra-frame predicted values 303 to the difference values 302, and outputs the result of the addition 306 to the predictor 305. In the predictor 305, the above-mentioned intra-frame predicted values 303 are generated on the basis of the result of addition 306 of an already coded block, using the method which has been described in FIG. 30, and first and second parameters (first intra-frame prediction information and second intra-frame prediction information) 309*a* and 309*b* concerning generation of the predicted values, are output from the predictor 305**.

Then, in the scanning unit **100*k*3, the output 302 of the prediction unit 100*k*2 is subjected to prescribed scanning on the basis of the intra-frame prediction information 309*a*, inter-frame prediction information 1015, and a scan mode switching signal 1201**.

Figure 36:
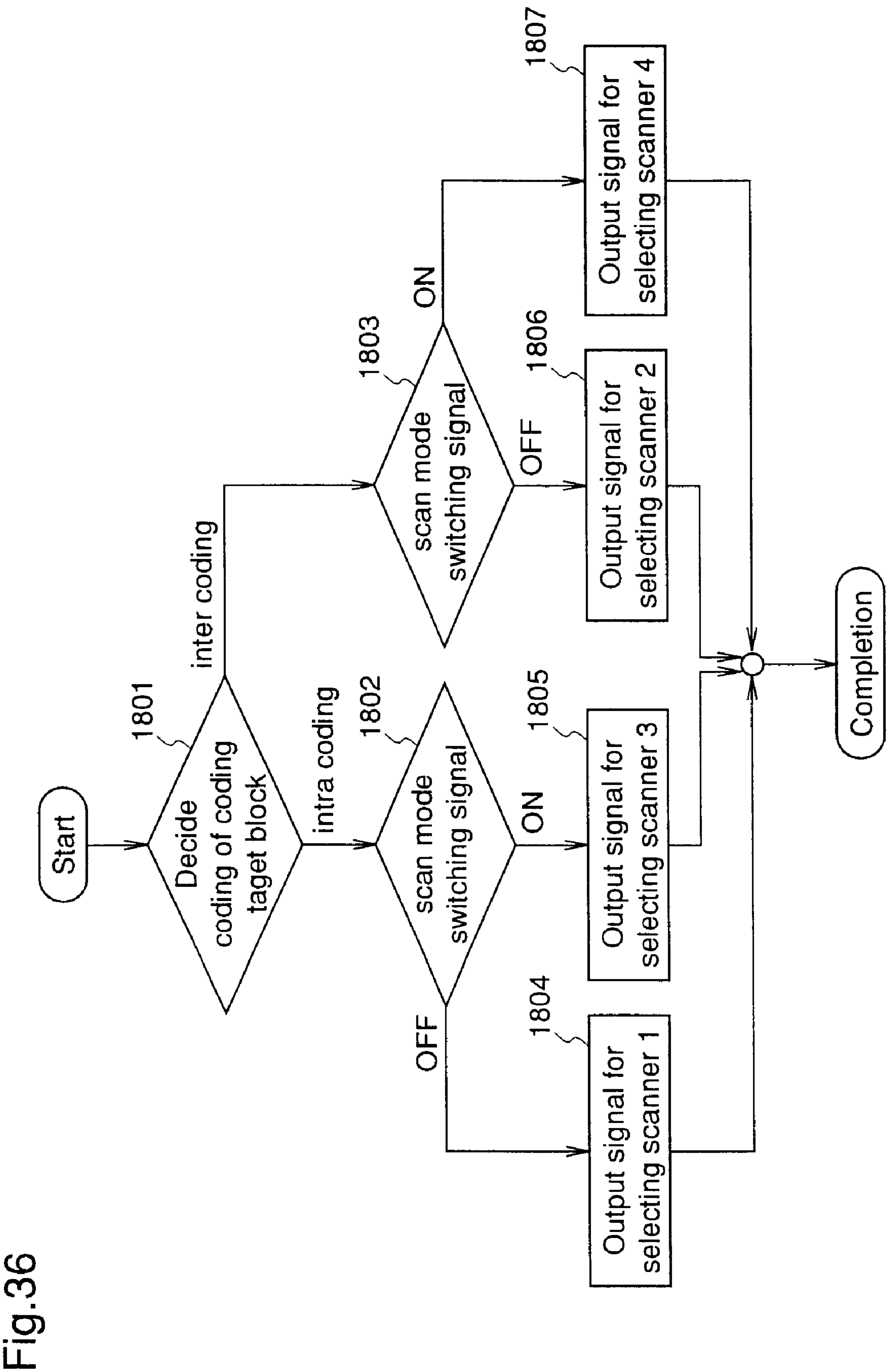
FIG. 36 is a flowchart showing a flow of a scan changing method according to the eleventh embodiment of the invention.

A processing method by the scan control unit **1501*k* in the scanning unit 100*k*3 is described using a flowchart shown in FIG. 36**.

In step 1801, the scan control unit **1501*k* decides whether the coding target block is subjected to intra coding or inter coding, on the basis of the inter-frame prediction information 1015 concerning generation of the predicted values in inter-frame predictive coding of the coding target block. As the result of the decision, when the coding target block is an intra-coded block, decision of the scan mode switching signal 1201 is performed (step 1802). As the result of the decision at step 1802, when the scan mode switching signal 1201 is in the OFF state, the scan control unit 1501*k* outputs the control signal 116*k* for selecting the scanner 199*k*1 (1) (step 1804). Thereby, the difference values 302 which are obtained by performing intra-frame prediction to the quantized values 1004 corresponding to the intra-coded block, are subjected to adaptive scanning on the basis of the first intra-frame prediction information 309*a*, by the scanner (1)**.

On the other hand, when the scan mode switching signal 1201 is in the ON state, the scan control unit **1501*k* outputs the control signal 116*k* for selecting the scanner 199*k*3 (3) (step 1805). Thereby, the difference values 302 which are obtained by performing intra-frame prediction to the quantized values 1004 corresponding to the intra-coded block, are subjected to scanning which gives a priority to a vertical direction, by the scanner (3)**.

As the result of the decision at step 1801, when the coding target block is an inter-coded block, decision of the scan mode switching signal 1201 is performed (step 1803). As the result of the decision at step 1803, when the scan mode switching signal 1201 is in the OFF state, the scan control unit **1501*k* outputs the control signal 116*k* for selecting the scanner 199*k*2 (2) (step 1806). Thereby, the difference values 302 which are obtained by performing intra-frame prediction to the quantized values 1004 corresponding to the inter-coded block, are subjected to zigzag scanning, by the scanner (2)**.

On the other hand, when the scan mode switching signal 1201 is in the ON state, the scan control unit **1501*k* outputs the control signal 116*k* for selecting the scanner 199*k*4 (4) (step 1807). Thereby, the difference values 302 which are obtained by performing intra-frame prediction to the quantized values 1004 corresponding to the inter-coded block, are subjected to scanning which gives a priority to a vertical direction different from the vertical direction of the scanner (3), by the scanner (4)**.

Then, the VLC unit 112 codes the quantized values of the coding target block, according to the prescribed order which has been set in the scanning unit **110*k*3, to output a bit stream (coded image signal) 1006**.

In the image coding apparatus **100*k*** thus constructed, in coding of an interlaced image signal, switching is performed between a first coding mode and a second coding mode according to a scan mode switching signal, wherein the first coding mode comprises performing an adaptive scan to quantized values of an intra-coded block, and performing a zigzag scan to quantized values of an inter-coded block, and the second coding mode comprises performing a scan which gives a priority to a first vertical direction to the quantized values of the intra-coded block, and performing a scan which gives a priority to a second vertical direction to the quantized values of the inter-coded block. Therefore, in coding of an interlaced image signal in which inter-coded blocks and intra-coded blocks having different frequency component distributions coexist, coding efficiency can be further improved.

In addition, in the image coding apparatus **100*k* according to the eleventh embodiment of the invention, the first intra-frame prediction information 309*a* includes ON/OFF information and prediction direction information of AC prediction, and the second intra-frame prediction information 309*b* includes only the ON/OFF information of AC prediction, as in the conventional image coding apparatus 200*c*. That is, unlike the first intra-frame prediction information 309*a* used for scan control in the image coding apparatus, the second intra-frame prediction information 309*b* transmitted to the decoding side includes no prediction direction information. Accordingly, even when a prediction method is changed, it is not required to change the content of the second intra-frame prediction information 309*b* to be output to the decoding side, thereby easily dealing with the changed prediction method. However, the second intra-frame prediction information 309*b* may include not only the ON/OFF information of AC prediction but the prediction direction information, like the first intra-frame prediction information 309*a***.

Although in the eleventh embodiment of the invention, a description is given of coding of an interlaced image signal, a digital image signal to be subjected to coding is not limited thereto. For example, in an image coding apparatus in which, in coding a progressive image, switching is performed between frame DCT processing and field DCT processing according to the content of the image, the efficiency of variable-length coding in coding a progressive image can be improved using a construction similar to the construction according to the eleventh embodiment.

Although in the eleventh embodiment of the invention, the scanner **199*k*3 (3) and the scanner 199*k*4 (4) perform different scans which give a priority to a vertical direction, both the scanners may perform a scan which gives a priority to a vertical direction in the order shown in FIG. 31**(*c*).

[Embodiment 12]

Figure 37:
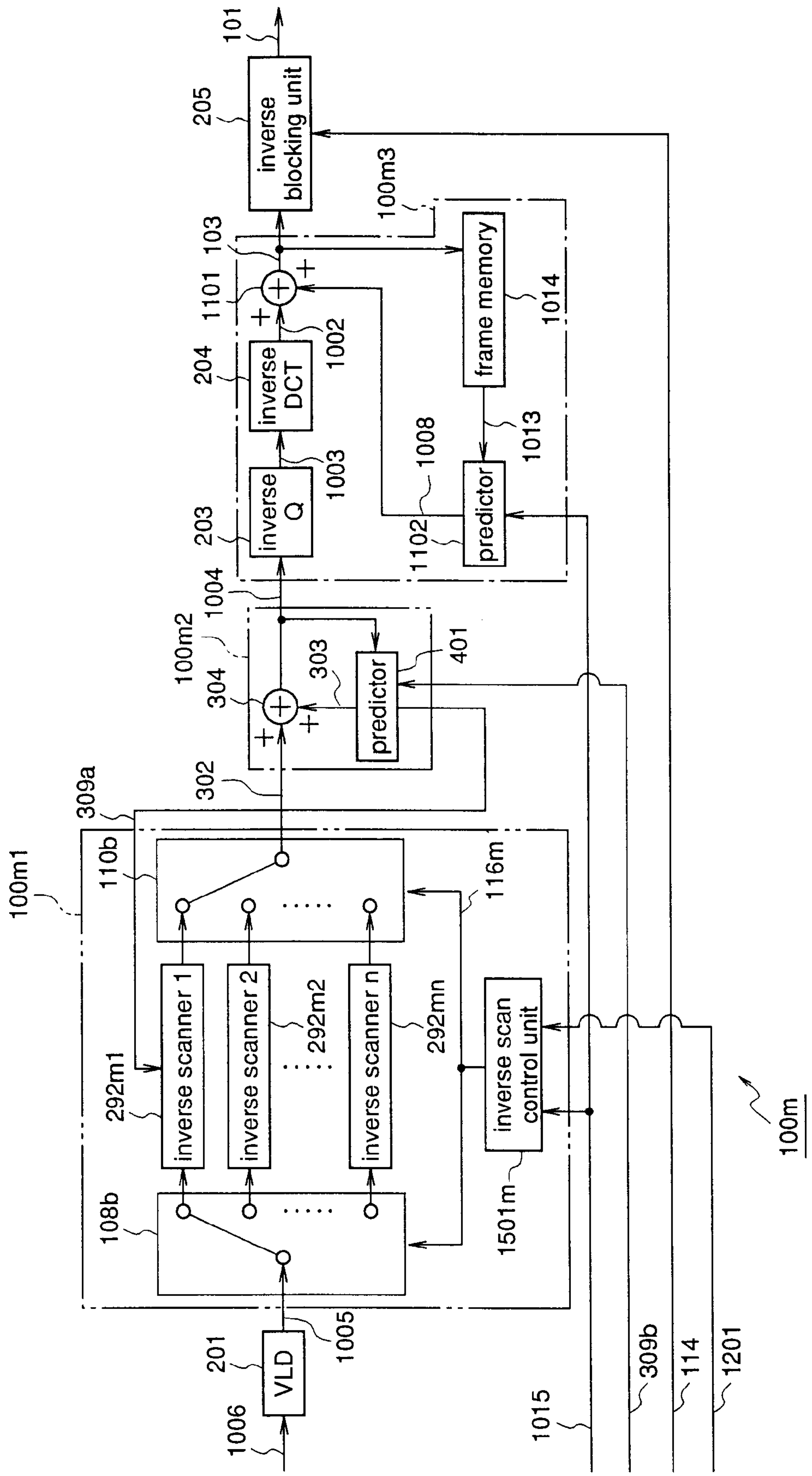
FIG. 37 is a block diagram illustrating a construction of an image decoding apparatus as an image processing apparatus in accordance with a twelfth embodiment of the present invention.

FIG. 37 is a block diagram illustrating a construction of an image processing apparatus according to a twelfth embodiment of the present invention. In FIG. 37, reference numeral **100*m* designates the image processing apparatus (image decoding apparatus) according to the twelfth embodiment of the invention, which decodes a coded image signal that has been coded in the image coding apparatus 100*k***.

This image decoding apparatus **100*m* consists of a variable-length decoding (VLD) unit 201, an inverse scanning unit 100*m*1, a prediction unit 100*m*2, an information source decoding unit 100*m*3, and an inverse blocking unit 205. The variable-length decoding (VLD) unit 201 is for performing variable-length decoding to a coded image signal 1006. The inverse scanning unit 100*m*1 is for performing an inverse scan to quantized values 1005 which are obtained by decoding so that the order of the quantized values 1005 is returned to the order before rearrangement in coding. The prediction unit 100*m*2 is for adding quantized values (intra-frame predicted values) 303 of a decoding target block which are predicted from quantized values of an already decoded block in the vicinity of the decoding target block, to quantized values 302 corresponding to the decoding target block which have been subjected to inverse scanning. The information source decoding unit 100*m*3 is for performing information source decoding to quantized values 1004 as an output of the prediction unit 100*m*2. The inverse blocking unit 205 is for inverse-blocking image signals (plural pixel values) 103 as outputs of the information source decoding unit 100*m*3, on the basis of DCT type information 114 from the image coding apparatus 100*k*, thereby regenerating an image signal 101** corresponding to one frame screen.

In the twelfth embodiment of the invention, the information source decoding unit **100*m*3 has the same construction as the information source decoding unit 200*f*1 in the conventional image decoding apparatus 200*f* shown in FIG. 34, and the prediction unit 100*m*2 has the same construction as the prediction unit 200*d*2 in the conventional image decoding apparatus 200*d* shown in FIG. 32**.

The inverse scanning unit **100*m*1 according to the twelfth embodiment of the invention is constructed so as to return quantized values which have been rearranged on the basis of first intra-frame prediction information 309*a*, inter-frame prediction information 1015, and a scan mode switching signal 1201 in the scanning unit 100*k*3 in the image coding apparatus 100*k* according to the eleventh embodiment, to the original order. That is, the inverse scanning unit 100*m*1 consists of n pieces of inverse scanners 292*m*1~292*mn* each performing rearrangement for returning quantized values which have been scanned by the scanners 199*k*~199*kn* in the scanning unit 100*k*3, to the original order. Further, the inverse scanning unit 100*m*1 consists of a first switch 108*b* for selecting one of the inverse scanners 292*m*1~292*mn* on the basis of a control signal 116*m* and supplying the output 1005 of the VLD unit 201 to the selected inverse scanner, a second switch 110*b* for selecting one of the inverse scanners 292*m*1~292*mn* on the basis of the control signal 116*m* and supplying the output 302 of the selected inverse scanner to the prediction unit 100*m*2, and an inverse scan control unit 1501*m* for generating the control signal 116*m* on the basis of the parameter 1015 concerning prediction from the image coding apparatus 100*k* and the scan mode switching signal 1201** from the outside.

Herein, the inverse scanners **292*m*1~292*mn* correspond to the scanners 199*k*1~199*kn* in the image coding apparatus 100*k*, respectively. More specifically,. the inverse scanner 292*m*1 (1) is constituted by the respective elements 108*d*, 110*d*, 202*s*1~202*s*3 and 1401*d* in the. inverse scanning unit 200*d*1 shown in FIG. 32. That is, the inverse scanner (1) selects one of the inverse scanners 202*s*1~202*s*3 constituting the inverse scanner (1) on the basis of control prediction information 309*a*' corresponding to the first intra-frame prediction information 309*a* concerning generation of intra-frame predicted values for an intra-coded block. In addition, one of the inverse scanners 202*s*1~202*s*3 constituting the inverse scanner (1) performs an inverse scan corresponding to a zigzag scan of quantized values in the order shown in FIG. 31**(*a*). The inverse scanner **292*m*2 (2) performs an inverse scan corresponding to a zigzag scan in the order shown in FIG. 31**(*a*). The inverse scanner **292*m*3 (3) performs an inverse scan corresponding to a scan which gives a priority to a vertical direction in the order shown in FIG. 31**(*c*). The inverse scanner 292*m*4 (4) performs an inverse scan corresponding to a scan which gives a priority to a vertical direction in the order different from the order shown in FIG. 31(*c*).

A description is given of the operation.

In the image decoding apparatus 100*m,* inverse converting processes corresponding to the respective converting processes in the image coding apparatus 100*k* shown in FIG. 35 are carried out to a coded image signal, in the reverse order of the order in coding, thereby accurately decoding the coded image signal.

More specifically, the VLD unit 201 converts a coded image signal 1006 into quantized values 1005 by variable-length decoding. Then, in the inverse scanning unit 100*m*1, the quantized values 1005 are subjected to inverse scanning.

Figure 38:
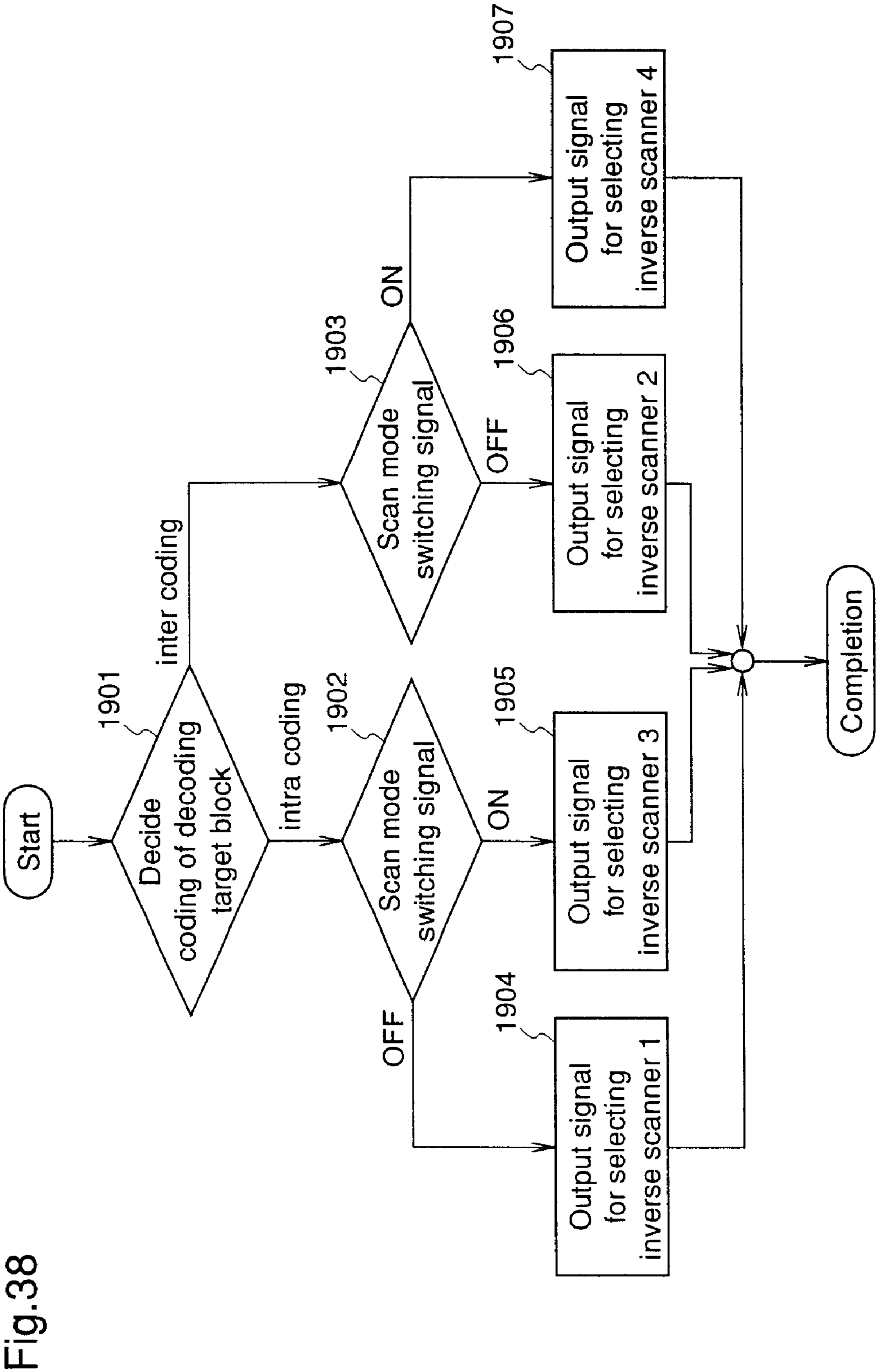
FIG. 38 is a flowchart showing a flow of a scan changing method according to the twelfth embodiment of the invention.

A processing method by the inverse scan control unit 1501*m* in the inverse scanning unit 100*m*1 is described using a flowchart shown in FIG. 38.

In step 1901, the inverse scan control unit 1501*m* decides whether the decoding target block is subjected to intra coding or inter coding, on the basis of inter-frame prediction information 1015 concerning generation of predicted values in inter-frame predictive decoding of the decoding target block. As the result of the decision, when the decoding target block is an intra-coded block, decision of a scan mode switching signal 1201 is performed (step 1902). As the result of the decision at step 1902, when the scan mode switching signal 1201 is in the OFF state, the inverse scan control unit 1501*m* outputs the control signal 116*m* for selecting the inverse scanner 292*m*1 (1) (step 1904). Thereby, the inverse scanner (1) executes inverse scanning corresponding to adaptive scanning for the quantized values 1005 corresponding to the intra-coded block, according to control prediction information 309*a*' which is generated in the predictor 401 on the basis of second intra-frame prediction information 309*b* from the image coding apparatus 100*k.*

On the other hand, when the scan mode switching signal 1201 is in the ON state, the inverse scan control unit 1501*m* outputs the control signal 116*m* for selecting the inverse scanner 202*m*3 (3) (step 1905). Thereby, the inverse scanner (3) executes inverse scanning corresponding to scanning which gives a priority to a vertical direction, for the quantized values 1005 corresponding to the intra-coded block.

As the result of the decision at step 1901, when the decoding target block is an inter-coded block, decision of the scan mode switching signal 1201 is performed (step 1903). As the result of the decision at step 1903, when the scan mode switching signal 1201 is in the OFF state, the inverse scan control unit 1501*m* outputs the control signal 116*m* for selecting the inverse scanner 292*m*2 (2) (step 1906). Thereby, the inverse scanner (2) executes inverse scanning corresponding to zigzag scanning for the quantized values 1005 corresponding to the inter-coded block.

On the other hand, when the scan mode switching signal 1201 is in the ON state, the inverse scan control unit 1501*m* outputs the control signal 116*m* for selecting the inverse scanner 292*m*4 (4) (step 1907). Thereby, the inverse scanner (4) executes inverse scanning corresponding to scanning which gives a priority to a vertical direction different from the vertical direction of the inverse scanner (3), for the quantized values 1005 corresponding to the inter-coded block.

Next, the prediction unit 100*m*2 adds quantized values 302 as an output of the inverse scanning unit 100*m*1 to intra-frame predicted values 303 of the quantized values 302, and outputs the result of the addition 1004 to the information source decoding unit 100*m*3. At this time, in the prediction unit 100*m*2, the above-mentioned intra-frame predicted values 303 are generated on the basis of the result of addition 1004 of an already decoded block and the second intra-frame prediction information 309*b* from the image coding apparatus 100*k,* using the method which has been described in FIG. 30.

Then, in the information source decoding unit 100*m*3, decoding is carried out to the quantized values 1004 as the output of the prediction unit 100*m*2. Specifically, the inverse quantization unit 203 converts the quantized values 1004 into DCT coefficients 1003 by inverse quantization. The inverse DCT unit 204 transforms the DCT coefficients 1003 into difference signals 1002 by inverse DCT. The adder 1101 adds inter-frame predicted values 1008 of the difference signals 1002 to the difference signals 1002, to convert the difference signals 1002 into an image signal (plural pixel values) 103. At this time, the image signal 103 is stored in the frame memory 1014. In the predictor 1102, the above-mentioned inter-frame predicted values 1008 are generated on the basis of an image signal 1013 of an already decoded block which is stored in the frame memory 1014 and the prediction parameter 1015 from the image coding apparatus 100*k.*

Finally, the inverse blocking unit 205 inverse-blocks the image signals 103 according to DCT type information 114 from the image coding apparatus 100*k,* thereby regenerating an image signal 101 corresponding to one frame screen.

In the image decoding apparatus 100*m* thus constructed, in decoding of a coded image signal which is obtained by coding an interlaced image signal, switching is performed between a first decoding mode and a second decoding mode according to a scan mode switching signal, wherein the first decoding mode comprises performing an inverse scan corresponding to an adaptive scan to quantized values of an intra-coded block, and performing an inverse scan corresponding to a zigzag scan to quantized values of an inter-coded block, and the second decoding mode comprises performing an inverse scan corresponding to a scan which gives a priority to a first vertical direction, to the quantized values of the intra-coded block, and performing an inverse scan corresponding to a scan which gives a priority to a second vertical direction, to the quantized values of the inter-coded block. Therefore, decoding can be accurately carried out to a coded image signal that is obtained by performing highly efficient coding of an interlaced image signal in which inter-coded blocks and intra-coded blocks having different frequency component distributions coexist, with changing a scan method.

In addition, although in the twelfth embodiment of the invention, a description is given of decoding of an interlaced image signal, a digital image signal to be subjected to decoding is not limited thereto. For example, in an image decoding apparatus corresponding to an image coding apparatus in which, in coding a progressive image, switching is performed between frame DCT processing and field DCT processing according to the content of the image, decoding can be accurately carried out to a coded image signal that is obtained by coding a progressive image signal at high coding efficiency, using a construction similar to the construction according to the twelfth embodiment.

In the image decoding apparatus 100*m* according to the twelfth embodiment of the invention, the control prediction information 309*a*' corresponding to the first intra-frame prediction information 309*a* includes ON/OFF information and prediction direction information of AC prediction, and the second intra-frame prediction information 309*b* from the image coding apparatus 100*k* includes only the ON/OFF information of AC prediction, as in the conventional image decoding apparatus 200*d*. That is, unlike the control prediction information 309*a*' used for scan control in the image decoding apparatus, the second intra-frame prediction information 309*b* transmitted to the decoding side includes no prediction direction information. Accordingly, even when a prediction method is changed, it is not required to change the content of the second intra-frame prediction information 309*b* to be input to the decoding side, thereby easily dealing with the changed prediction method. However, the second intra-frame prediction information 309*b* may include not only the ON/OFF information of AC prediction but the prediction direction information, like the control prediction information 309*a*'.

Although in the twelfth embodiment of the invention, the inverse scanner 292*m*3 (3) and the inverse scanner 292*m*4 (4) perform different inverse scans corresponding to scans which give a priority to a vertical direction, both the inverse scanners may perform an inverse scan corresponding to a scan which gives a priority to a vertical direction in the order shown in FIG. 31(*c*).

[Embodiment 13]

Coding or decoding programs for implementing the image processes by the image processing apparatuses described in the aforementioned embodiments are recorded on data recording media such as floppy disks, whereby the processes according to these embodiments can be easily executed in individual computer systems.

Figure 25:
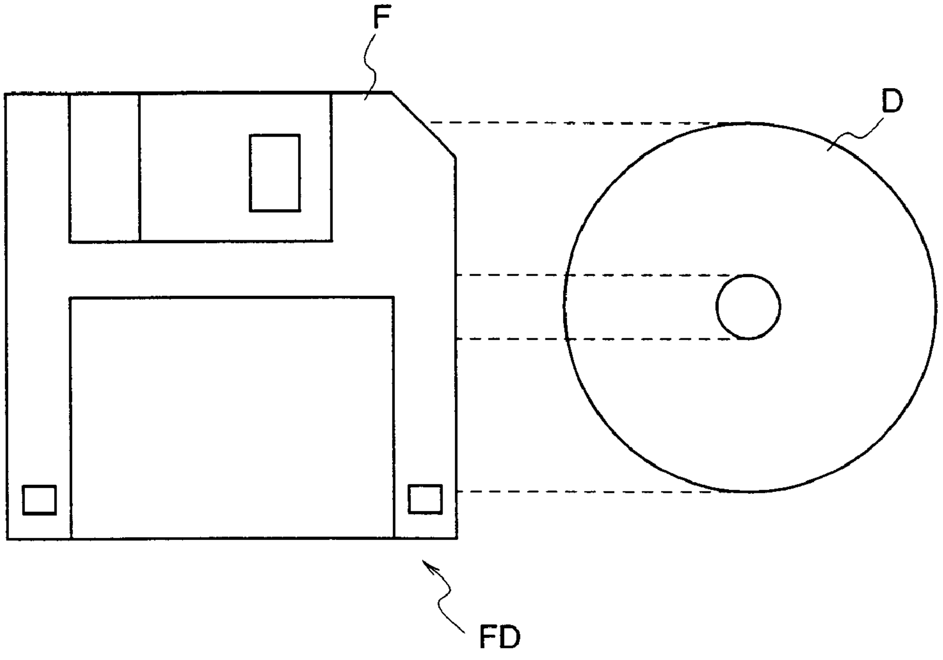
FIG. 25 is a diagram illustrating a construction of a data recording medium in accordance with a thirteenth embodiment of the present invention.

FIG. 25 is a diagram for explaining a case where an image coding or image decoding process according to any of the aforementioned embodiments is executed in a computer system using a floppy disk in which the coding or decoding program is contained.

FIG. 25 shows a front view of a floppy disk FD, and a floppy disk body D as a magnetic recording medium. The floppy disk FD is contained in a case F. Plural tracks are concentrically formed on the surface of the disk body D from the outer circumference toward the inner circumference. Each track is divided into 16 sectors in the angular direction. Therefore, in the floppy disk containing the above-mentioned program, in a region allocated on the floppy disk body D, data as the program is recorded.

What is claimed is:

1. An image processing method for performing block-by-block decoding of a coded image signal that is obtained by performing a coding process including frequency transformation to a digital image signal, for each of blocks constituting a single display screen, said method comprising:

performing rearrangement to an input signal of a decoding target block to be subjected to decoding that is obtained by coding various frequency components which have been subjected to an inter-frame prediction process and an intra-frame prediction process in a prescribed order, with switching, on the basis of flag information indicating switching of rearrangement, which information is input together with the input signal, between the first rearrangement operation in which the input signal is subjected to adaptive rearrangement in an order according to the kinds of both the prediction processes, and the second rearrangement operation in which the input signal is subjected to rearrangement in a specific order, regardless of the kinds of both the prediction processes;

generating intra-frame predicted values of frequency components corresponding to the decoding target block from frequency components corresponding to an already decoded block located in the vicinity of the decoding target block, by the intra-frame prediction process;

generating frequency components corresponding to the decoding target block on the basis of the input signal after the rearrangement and the intra-frame predicted values;

performing inverse frequency transformation to the frequency components corresponding to the decoding target block to generate one of an image signal corresponding to the decoding target block and a difference signal corresponding to the same block; and adding, to the difference signal corresponding to the decoding target block, inter-frame predicted values of an image signal of the decoding target block, which are generated from an image signal corresponding to an already decoded display screen different from a display screen including the decoding target block by the inter-frame prediction process, thereby generating an image signal corresponding to the decoding target block.

2. The image processing method as defined in claim 1 wherein:

a coded interlaced image signal, which is obtained by coding an interlaced image signal block by block, is received as the coded image signal to be subjected to decoding;

in the first rearrangement operation, concerning an inter-coded block in which frequency components obtained by frequency transformation of the interlaced image signal correspond to inter-frame difference values of a coding target block, the frequency components to which the processing order from the side of low-frequency components toward the side of high-frequency components has been uniformly set so that the components arranged along a horizontal direction of a display screen and the components arranged along a vertical direction have uniform priorities, are rearranged according to the processing order which has been uniformly set; and concerning an intra-coded block in which frequency components obtained by frequency transformation of the interlaced image signal correspond to an image signal of a coding target block, the frequency components to which the processing order from the side of low-frequency components toward the side of high-frequency components has been adaptively set according to the kind of the intra-frame prediction process, are rearranged according to the processing order which has been adaptively set; and in the second rearrangement operation, concerning both the inter-coded block and intra-coded block, the frequency components to which the processing order from the side of low-frequency components toward the side of high-frequency components has been set so that the components arranged along a vertical direction of a display screen have priority over the components arranged along a horizontal direction, are rearranged according to the processing order which has been set with a priority given to a vertical direction.

3. A data recording medium containing an image processing program, which makes a computer execute image processing in the image processing method defined in claim 1.

4. An image processing apparatus for performing block-by-block decoding of a coded image signal that is obtained by performing a coding process including frequency transformation to a digital image signal, for each of blocks constituting a single display screen, said apparatus comprising:

a variable-length decoding unit for performing variable-length decoding to a coded string that is obtained by performing inter-frame prediction, intra-frame prediction, frequency transformation, quantization, rearrangement, and variable-length coding to an image signal corresponding to each block;

inverse scanning means including plural inverse scanners having different orders of rearrangement, and each rearranging quantized values which have been rearranged in coding so that the order of the quantized values is returned to the order before the rearrangement, the inverse scanning means selecting an inverse scanner to be used for rearranging the quantized values, according to a scan changing signal which is generated outside/inside a system, and inter-frame prediction information indicating the kind of inter-frame prediction and intra-frame prediction information indicating the kind of intra-frame prediction in coding;

intra-frame prediction means for generating intra-frame predicted values of quantized values corresponding to a decoding target block from quantized values corresponding to an already decoded block located in the vicinity of the decoding target block, according to the intra-frame prediction information, and outputting the result of addition between the output of the inverse scanning means and the intra-frame predicted values;

inter-frame prediction means for performing inter-frame prediction to the output of the intra-frame prediction means on the basis of the inter-frame prediction information, to generate an image signal corresponding to each block; and an inverse blocking unit for inverse-blocking the image signals of the respective blocks according to frequency transformation type information indicating a processing unit of frequency transformation in coding, to output a digital image signal; and said inverse scanning means being constructed so that switching is performed, on the basis of flag information indicating switching of rearrangement, which information is input together with an input signal of the decoding target block that is obtained by coding various frequency components which have been subjected to the inter-frame prediction process and the intra-frame prediction process in a prescribed order, between the first rearrangement operation in which the input signal is subjected to adaptive rearrangement in an order according to the kinds of both the prediction processes, and the second rearrangement operation in which the input signal is subjected to rearrangement in a specific order, regardless of the kinds of both the prediction processes.

5. The image processing apparatus as defined in claim 4 wherein said intra-frame prediction means comprises:

an intra-frame predictor for generating intra-frame predicted values of quantized values corresponding to a decoding target block from quantized values corresponding to an already decoded block located in the vicinity of the decoding target block, according to intra-frame prediction information; and a first adder for adding the intra-frame predicted values to the output of the selected inverse scanner; and said inter-frame prediction means comprises:

an inverse quantization unit for inverse-quantizing the output of the first adder to output frequency components of a difference signal corresponding to each block;

an inverse frequency transformation unit for performing inverse frequency transformation to the frequency components to output a difference signal corresponding to each block;

a second adder for adding inter-frame predicted values of an image signal corresponding to each block to the difference signal to output an image signal corresponding to each block;

a frame memory for storing the output of the second adder, as an image signal of an already decoded block as a constituent of an already decoded display screen; and an inter-frame predictor for generating the inter-frame predicted values on the basis of inter-frame prediction information and an image signal of an already coded block.

* * * * *